US008644197B2

(12) United States Patent
Lee et al.

(10) Patent No.: US 8,644,197 B2
(45) Date of Patent: Feb. 4, 2014

(54) RF FRONT-END MODULE AND ANTENNA SYSTEMS

(75) Inventors: Cheng-Jung Lee, San Diego, CA (US); Woo Yong Lee, San Diego, CA (US); Ajay Gummalla, San Diego, CA (US); Nhan Duc Nguyen, Oceanside, CA (US); Vladimir Penev, San Diego, CA (US); Maha Achour, Enicinitas, CA (US); Gregory Poilasne, El Cajon, CA (US)

(73) Assignee: Hollinworth Fund, L.L.C., Dover, DE (US)

( * ) Notice: Subject to any disclaimer, the term of this patent is extended or adjusted under 35 U.S.C. 154(b) by 720 days.

(21) Appl. No.: 12/640,969

(22) Filed: Dec. 17, 2009

(65) Prior Publication Data

US 2010/0157858 A1 Jun. 24, 2010

Related U.S. Application Data

(60) Provisional application No. 61/140,816, filed on Dec. 24, 2008, provisional application No. 61/229,657, filed on Jul. 29, 2009.

(51) Int. Cl.
*H04L 5/14* (2006.01)
*H04M 1/00* (2006.01)

(52) U.S. Cl.
USPC ............. 370/275; 340/572.7; 455/562.1; 455/575.7

(58) Field of Classification Search
USPC ............. 370/275, 276, 278, 297; 455/562.1, 455/33.3, 121, 575.7; 340/572.7
See application file for complete search history.

(56) References Cited

U.S. PATENT DOCUMENTS

| 7,592,957 | B2 | 9/2009 | Achour et al. | |
|---|---|---|---|---|
| 2007/0176827 | A1* | 8/2007 | Itoh et al. | 343/700 MS |
| 2008/0204327 | A1* | 8/2008 | Lee et al. | 343/700 MS |
| 2008/0258981 | A1 | 10/2008 | Achour et al. | |
| 2009/0008753 | A1* | 1/2009 | Rofougaran | 257/660 |
| 2009/0016548 | A1* | 1/2009 | Monat et al. | 381/111 |
| 2009/0128446 | A1 | 5/2009 | Gummalla et al. | |
| 2009/0135087 | A1 | 5/2009 | Gummalla et al. | |
| 2009/0160578 | A1 | 6/2009 | Achour | |
| 2009/0219213 | A1* | 9/2009 | Lee et al. | 343/700 MS |

(Continued)

FOREIGN PATENT DOCUMENTS

| JP | 2000-357917 A | 12/2000 |
|---|---|---|
| JP | 2003-174383 A | 6/2003 |

(Continued)

OTHER PUBLICATIONS

Caloz, et al., "Electromagnetic Metamaterials: Transmission Line Theory and Microwave", John Wiley & Sons. 2006.

(Continued)

*Primary Examiner* — Andrew Lee
(74) *Attorney, Agent, or Firm* — Novak Druce Connolly Bove + Quigg LLP

(57) ABSTRACT

Architectures and implementations of a transceiver system for wireless communications are presented, the system including one or more antennas supporting a single frequency band or multiple frequency bands, a transmit circuit, a receive circuit, and an isolation circuit that is coupled to the one or more antennas and the transmit and receive circuits and provides adequate isolation between the transmit circuit and the receive circuit.

46 Claims, 36 Drawing Sheets

(56) References Cited

U.S. PATENT DOCUMENTS

| | | |
|---|---|---|
| 2009/0295473 A1* | 12/2009 | Dupuy et al. ............. 330/124 R |
| 2009/0295660 A1 | 12/2009 | Xu et al. |
| 2010/0283705 A1* | 11/2010 | Achour et al. ................ 343/844 |
| 2011/0140982 A1* | 6/2011 | Ozden et al. ................ 343/852 |
| 2011/0260946 A1* | 10/2011 | Dandekar et al. ............ 343/893 |

FOREIGN PATENT DOCUMENTS

| | | |
|---|---|---|
| JP | 2004-312255 A | 11/2004 |
| JP | 2005-269305 A | 9/2005 |
| JP | 2006-310968 A | 11/2006 |
| JP | 2007-036315 A | 2/2007 |
| JP | 2007-174519 A | 7/2007 |
| WO | WO-2005-039060 A2 | 4/2005 |
| WO | WO-2007/025309 A1 | 3/2007 |
| WO | WO-2007/127955 A2 | 11/2007 |
| WO | WO-2008-085283 A1 | 7/2008 |
| WO | WO-2008/111460 A1 | 9/2008 |

OTHER PUBLICATIONS

Itoh, T., "Invited paper: Prospects for Metamaterials", Electronics Letters, vol. 40(16). Aug. 5, 2004. pp. 972-973.

U.S. Appl. No. 61/140,816 entitled "Antenna Duplexer Front End Architecture Based on Metamaterial Structure," filed Dec. 24, 2008.

U.S. Appl. No. 61/229,657 entitled "Multi-Antenna RF Front-End Modules," filed Jul. 29, 2009.

U.S. Appl. No. 61/153,398 entitled "A Metamaterial Power Amplifier System and Method for Generating Highly Efficient and Linear Multi-Band Power Amplifiers," filed Feb. 18, 2009.

U.S. Appl. No. 61/259,589 entitled "Multi-Port Frequency Band Coupled Antennas," filed Nov. 9, 2009.

International Preliminary Report on Patentability and Written Opinion of the International Searching Authority dated Jun. 29, 2011.

C. Caloz, et al., "Composite right/left-handed transmission line materials", IEEE Microwave Magazine, vol. 5, Nr. 3, pp. 34-50. Sep. 2004.

Japanese Office Action dated Nov. 26, 2013.

* cited by examiner

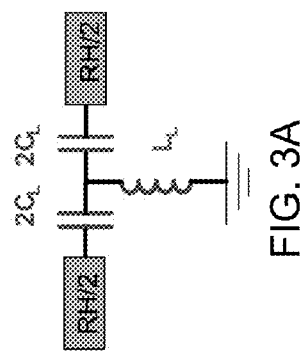
FIG. 3A
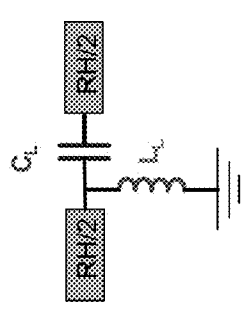
FIG. 3C
FIG. 3E
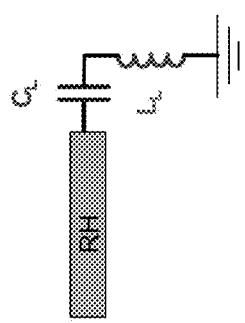
FIG. 3B
FIG. 3D
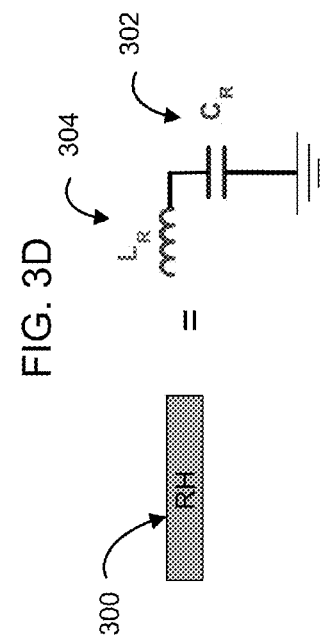
FIG. 3F

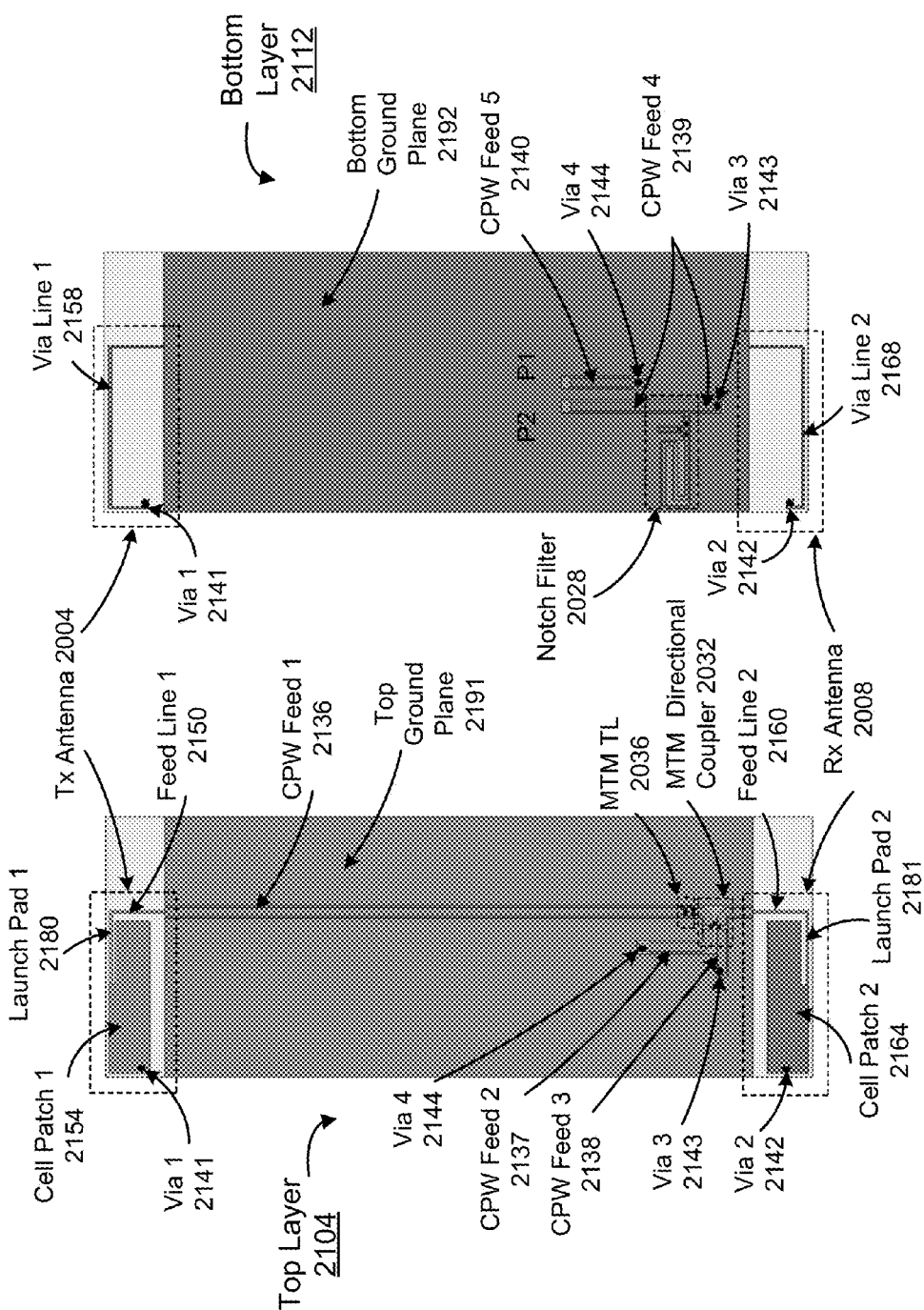

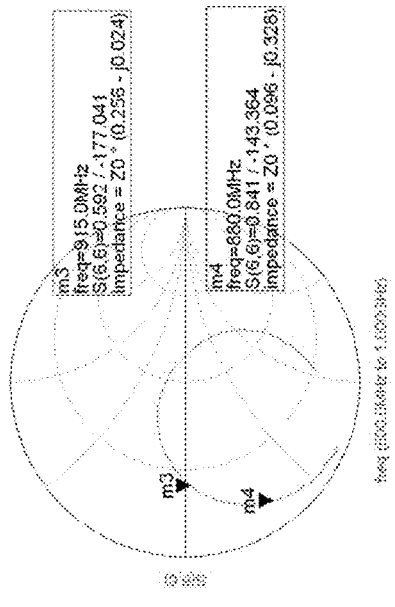
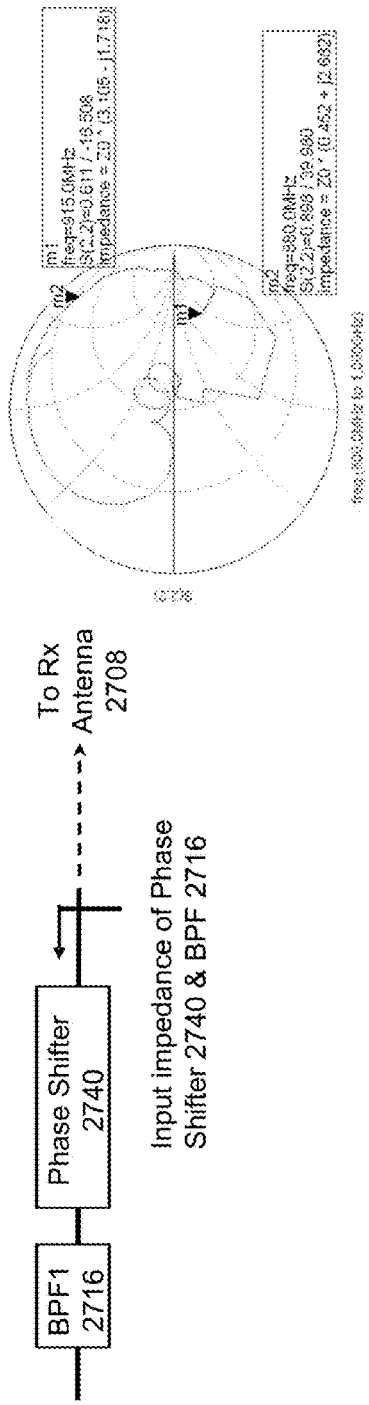
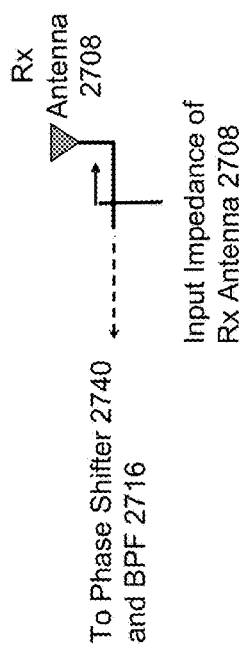
FIG. 28A
FIG. 28B

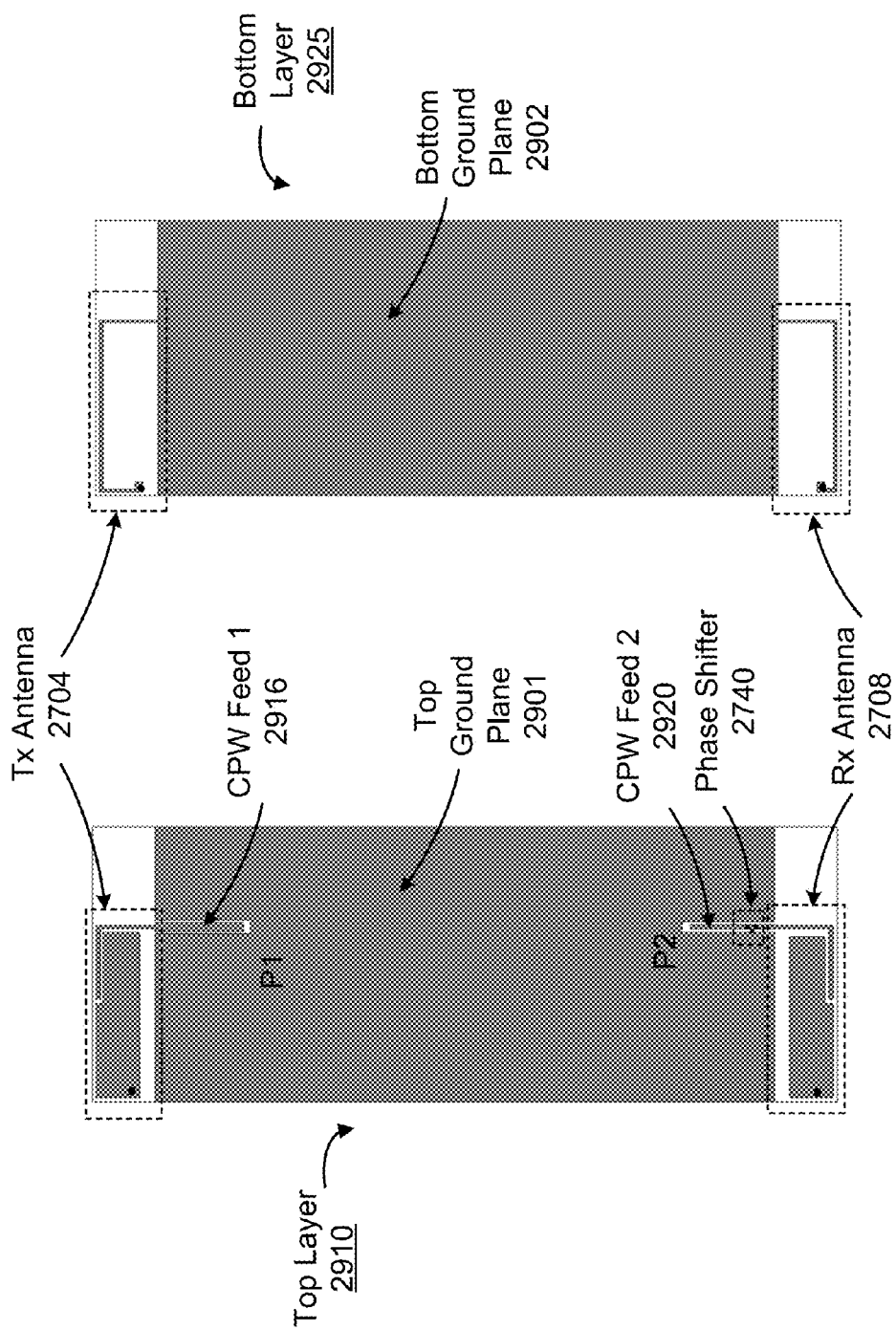

RF FRONT-END MODULE AND ANTENNA SYSTEMS

PRIORITY CLAIM AND RELATED APPLICATIONS

This patent document claims the benefit of the U.S. Provisional Patent Application Ser. No. 61/140,816 entitled "Antenna Duplexer Front End Architecture Based on Metamaterial Structure," filed on Dec. 24, 2008; and the U.S. Provisional Patent Application Ser. No. 61/229,657 entitled "Multi-Antenna RF Front-End Modules," filed on Jul. 29, 2009. The disclosures of the above provisional applications are incorporated herein by reference. This patent document is related to U.S. patent application Ser. No. 11/741,674 entitled "Antennas, Devices and Systems based on Metamaterial Structures," filed on Apr. 27, 2007, now U.S. Pat. No. 7,764,232; U.S. Pat. No. 7,592,952 entitled "Antennas Based on Metamaterial Structures," issued on Sep. 22, 2009; U.S. patent application Ser. No. 12/340,657 entitled "Multi-Metamaterial-Antenna Systems with Directional Couplers," filed on Dec. 20, 2008, now abandoned; U.S. patent application Ser. No. 12/272,781 entitled "Filter Design Methods and Filters Based on Metamaterial Structures," filed on Nov. 17, 2008, now U.S. Pat. No. 8,237,519; U.S. Provisional Patent Application Ser. No. 61/153,398 entitled "A Metamaterial Power Amplifier System and Method for Generating Highly Efficient and Linear Multi-Band Power Amplifiers," filed on Feb. 18, 2009; U.S. patent application Ser. No. 12/250,477 entitled "Single-Layer Metallization and Via-Less Metamaterial Structures," filed on Oct. 13, 2008, now abandoned; U.S. patent application Ser. No. 12/270,410 entitled "Metamaterial Structures with Multilayer Metallization and Via," filed on Nov. 13, 2008, now abandoned; U.S. patent application Ser. No. 12/465,571 entitled "Non-Planar Metamaterial Antenna Structures," filed on May 13, 2009, now U.S. Pat. No. 8,299,967; and U.S. Provisional Patent Application Ser. No. 61/259,589 entitled "Multi-Port Frequency Band Coupled Antennas," filed on Nov. 9, 2009.

BACKGROUND

This document relates to RF front-end module and antenna systems. Metamaterial-based components as well as non-metamaterial-based components may be utilized in the systems.

The propagation of electromagnetic waves in most materials obeys the right-hand rule for the (E,H,β) vector fields, considering the electrical field E, the magnetic field H, and the wave vector β (or propagation constant). The phase velocity direction is the same as the direction of the signal energy propagation (group velocity) and the refractive index is a positive number. Such materials are referred to as Right Handed (RH) materials. Most natural materials are RH materials. Artificial materials can also be RH materials.

A metamaterial has an artificial structure. When designed with a structural average unit cell size much smaller than the wavelength of the electromagnetic energy guided by the metamaterial, the metamaterial can behave like a homogeneous medium to the guided electromagnetic energy. Unlike RH materials, a metamaterial can exhibit a negative refractive index, and the phase velocity direction is opposite to the direction of the signal energy propagation, wherein the relative directions of the (E,H,β) vector fields follow the left-hand rule. Metamaterials which have a negative index of refraction with simultaneous negative permittivity ε and permeability μ are referred to as pure Left Handed (LH) metamaterials.

Many metamaterials are mixtures of LH metamaterials and RH materials and thus are Composite Right and Left Handed (CRLH) metamaterials. A CRLH metamaterial can behave like an LH metamaterial at low frequencies and an RH material at high frequencies. Implementations and properties of various CRLH metamaterials are described in, for example, Caloz and Itoh, "Electromagnetic Metamaterials: Transmission Line Theory and Microwave Applications," John Wiley & Sons (2006). CRLH metamaterials and their applications in antennas are described by Tatsuo Itoh in "Invited paper: Prospects for Metamaterials," Electronics Letters, Vol. 40, No. 16 (August, 2004).

CRLH metamaterials may be structured and engineered to exhibit electromagnetic properties tailored to specific applications and may be used in applications where it may be difficult, impractical or infeasible to use other materials. In addition, CRLH metamaterials may be used to develop new applications and to construct new devices that may not be possible with RH materials.

BRIEF DESCRIPTION OF THE DRAWINGS

FIGS. 3A-3E illustrate CRLH unit cells.

FIG. 3F illustrates an RH transmission line expressed in terms of equivalent circuit parameters.

FIGS. 21A-21C illustrate an implementation example of the system of FIG. 20, illustrating a 3D view, a top view of the top layer and a top view of the bottom layer, respectively.

FIG. 28A illustrates an input impedance for a receive antenna in the system of FIG. 27.

FIG. 28B illustrates an input impedance with respect to the point of looking toward a phase shifter and a BPF in the system of FIG. 27.

FIGS. 29A and 29B illustrate an implementation example of the system of FIG. 27, illustrating a top view of the top layer and a top view of the bottom layer, respectively.

DETAILED DESCRIPTION

According to embodiments described in this document, architectures and implementations of a transceiver system include one or more antennas supporting a single frequency band or multiple frequency bands, a transmit circuit that processes transmit signals, a receive circuit that processes receive signals, and an isolation circuit that is coupled to the one or more antennas and to the transmit and receive circuits and provides adequate electromagnetic isolation between the transmit circuit and the receive circuit. The embodiments of the isolation circuit include passive components without semiconductor switches, with a reduced number of semiconductor switches or with a reduced number of semiconductor switch terminals as compared to conventional systems, thereby leading to cost reduction. Metamaterial (MTM) structures may be employed for at least one of the one or more antennas and the passive components for performance improvements. These embodiments and implementations and their variations are described below.

RF transceiver systems for dual-band transmission and reception can be utilized in dual-band Global System for Mobile communications (GSM) phones and other wireless communication systems. Conventionally, such a dual-band transceiver system is implemented to include an RF front-end module with transmit/receive (Tx/Rx) switches as exemplified in FIGS. 1 and 2 below.

Figure 1:
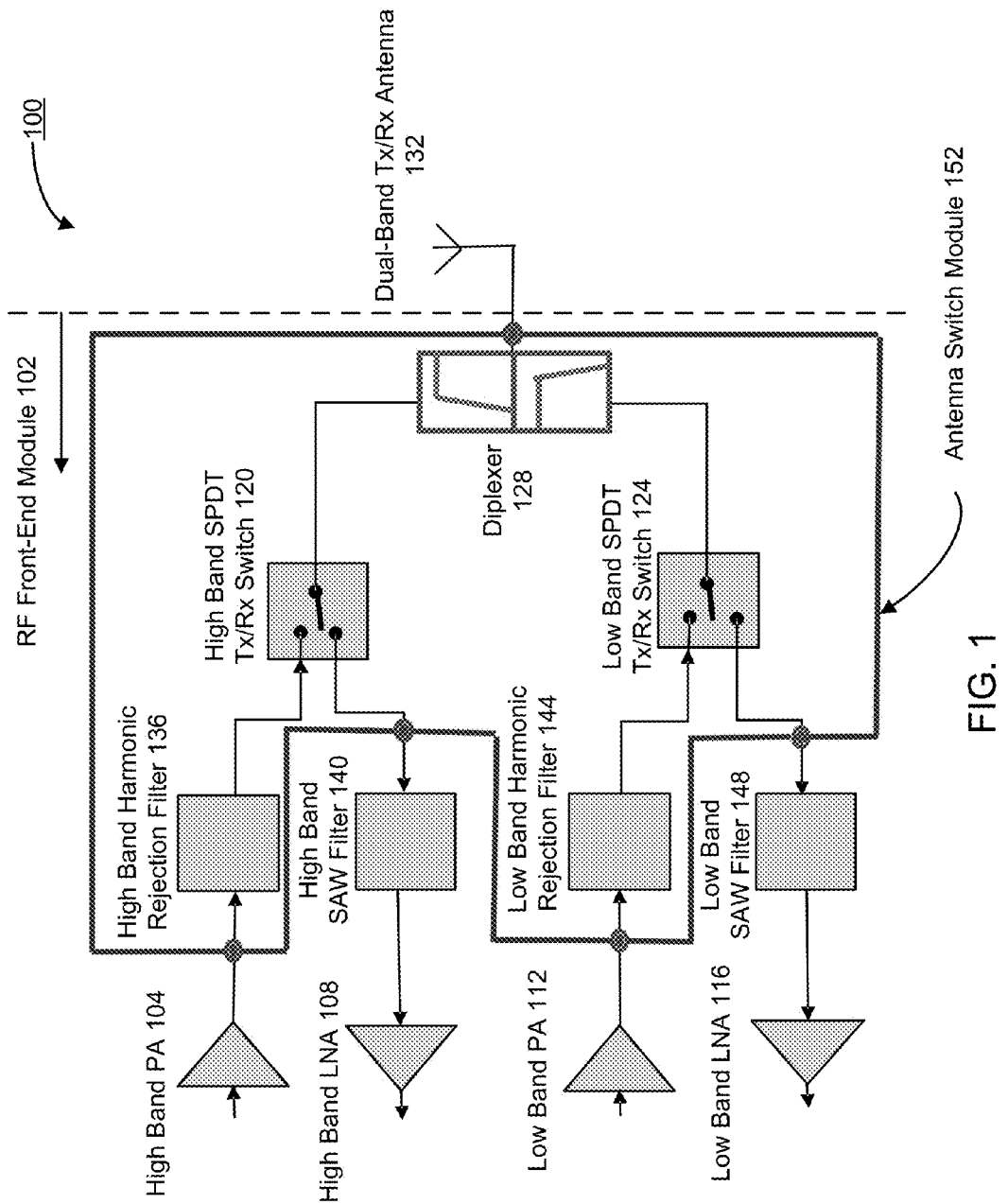
FIG. 1 illustrates a block diagram schematically illustrating an example of a conventional dual-band transceiver system having a switch to isolate transmit and receive signal paths.

FIG. 1 illustrates a block diagram schematically illustrating one example of a dual-band transceiver system 100, e.g., a dual-band GSM900/DCS1800 or GSM850/PCS1900 phone system, which uses a Tx/Rx switch, such as switch 120 and switch 124, to isolate TX and Rx signal paths in each band. In a communication system, frequency bands are allocated according to use and location. For example, the Personal Communication Services (PCS) is a 1900 MHz band used for digital mobile cell phone communications in N. America, while Digital Cellular System (DCS) defines similar bands used outside of N. America, and includes GSM.

In FIG. 1, a high band Power Amplifier (PA) 104 and a high band Low Noise Amplifier (LNA) 108 may be designed for one frequency band, such as the DCS1800 or PCS1900 band; and a low band PA 112 and a low band LNA 116 may be designed for another frequency band, such as the GSM900 or GSM850 band. The system 100 includes an RF front-end module 102 coupled to a single antenna, i.e., dual-band Tx/Rx antenna 132, which serves as both Tx and Rx antennas for dual band. An RF front-end module typically refers to the whole front-end portion of a system coupled to an antenna and includes an Antenna Switch Module (ASM), PAs, LNAs, filters, and other peripheral RF circuitry. Some implementations allow for integration of LNAs in an RF Integrated Circuit (RFIC). An ASM typically refers to a system portion that includes switches and is coupled to the antenna at one module terminal and PAs and Surface Acoustic Wave (SAW) filters at the other module terminals. The RF front-end module 102 of the dual-band communication system 100, such as the one shown in FIG. 1, includes two PAs, i.e., the high band PA 104 and the low band PA 112, two LNAs, i.e., the high band LNA 108 and the low band LNA 116, two Tx/Rx switches 120 and 124, and a diplexer 128. The diplexer 128 separates the high band signals and the low band signals at the feed point of the dual-band Tx/Rx antenna 132 and sends them to the respective Tx/Rx switches 120 and 124 during receive operations. A Single Pole Double Throw (SPDT) switch is used for the Tx/Rx switch in this example having the high band SPDT Tx/Rx switch 120 that separates the Tx and Rx signal paths in the high band and the low band SPDT Tx/Rx switch 124 that separates the TX and Rx signal paths in the low band. Thus, the Tx/Rx switches 120 and 124 provide routing of transmit and receive signals in the respective bands. During transmit operations, the Tx/Rx switches 120 and 124 transfer the signals from the PAs 104 and 112, respectively, to the diplexer 128. During receive operations, the Tx/Rx switches 120 and 124 transfer the high band and low band signals from the diplexer 128 to the high band LNA 108 and the low band LNA 116, respectively. The RF front-end module 102 further includes a SAW filter coupled to an input terminal of the LNA in the receive path of each band to provide band pass filtering with sharp cut-off characteristics. A high band SAW filter 140 and a low band SAW filter 148 are included in this example. The RF front-end module 102 may further include a harmonic rejection filter coupled to an output terminal of the PA in the transmit path of each band to reject harmonics, such as the $2^{nd}$ and $3^{rd}$ harmonics. A high band harmonic rejection filter 136 and a low band harmonic rejection filter 144 are included in this example.

Figure 2:
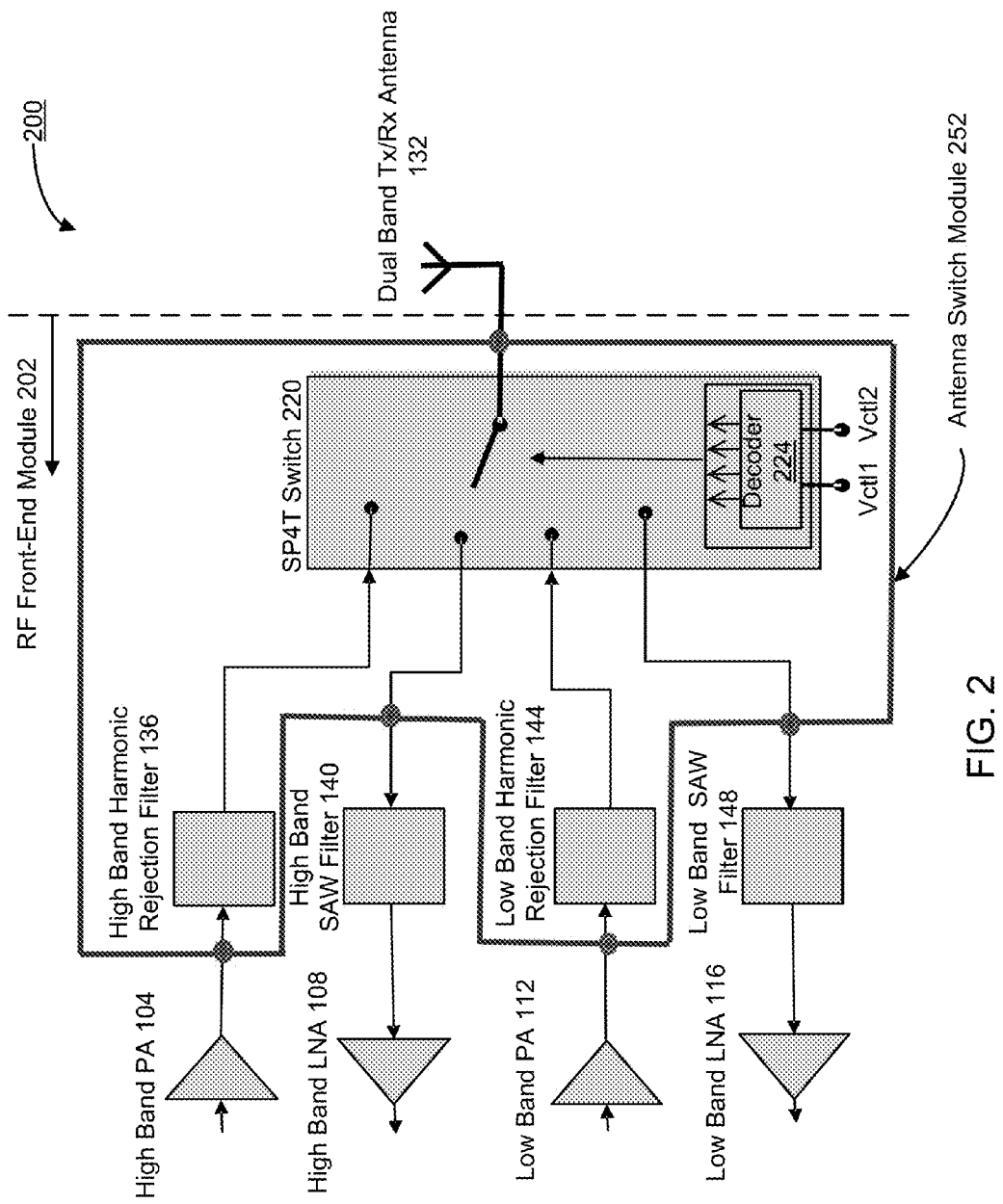
FIG. 2 illustrates a block diagram schematically illustrating an example of a conventional dual-band transceiver system having a single pole 4 throw (SP4T) switch to isolate transmit and receive signal paths.

FIG. 2 illustrates a block diagram schematically illustrating another example of a dual-band transceiver system 200, e.g., a dual-band GSM900/DCS1800 or GSM850/PCS1900 phone system, in which a Single Pole 4 Throw (SP4T) switch 220 is used instead of the combination of two Tx/Rx SPDT switches and a diplexer as in the system 100 of FIG. 1. In this example, an internal decoder 224 receives control signals from an external control circuit to select the specific configuration of the four throws, i.e., select a throw connection. The routing of the signals among the high band Rx, high band Tx, low band Rx, and low band TX paths are thus controlled by the single SP4T switch 220 in this example. The ASM 252 includes one SP4T switch 220 and two harmonic rejection filters, i.e. the high band harmonic rejection filter 136 and the low band harmonic rejection filter 144.

Dual-band transceiver systems are illustrated in the above conventional architectures as examples. Generally, communication systems can be designed to support a single frequency band or multiple frequency bands. In each frequency band, a portion of the bandwidth may be used in the Tx mode and the other portion may be used in the Rx mode, separating the band into the Tx band and the Rx band, respectively. A single antenna is typically used to cover both Tx and Rx bands in a conventional dual-band system. As seen in the above two conventional implementations, the RF front-end module of such a communication system may typically include a Tx/Rx switch, a low pass filter (LPF) such as a harmonic rejection filter, a band pass filter (BPF) such as a SAW filter, a PA, an LNA and other RF circuitry. In the Tx mode, the power amplified and outputted by the PA to the antenna is much larger than the power received by the antenna in the Rx mode. Therefore, in order to protect the receive circuitry, the power coupled to the receive circuitry during the Tx operation should be minimized. Since the frequencies used in the Tx mode and Rx mode are close, a Tx/Rx switch is typically used to isolate the transmit and receive circuitries while sharing the same antenna. For example, the GSM and other standards for portable phones employ Frequency Division Duplex (FDD) Time Division Multiple Access (TDMA), where the transmitter and receiver operate at different frequencies and in different time slots and the Tx/Rx signal routing is carried out by a Tx/Rx switch. However, the use of semiconductor switches for the Tx/Rx signal routing can pose tremendous cost disadvantages. Some applications even require expensive GaAs FETs, for example.

In view of the above disadvantages associated with the conventional ASM scheme using semiconductor switches, this document provides examples and implementations of RF front-end modules based on an isolation scheme using passive components instead of active components, with a reduced number of active components or a reduced number of device terminals. Such an RF front-end module can be configured to couple to one or more antennas and provide proper isolation between the Tx and Rx signal paths. Such a system including passive components can provide cost advantages and performance improvement through elimination or reduction of active components. In addition, elimination or reduction of active components results in elimination or reduction of the drive circuitry. The system may use MTM antennas in combination with MTM passive components such as filters, couplers, transmission lines, and/or diplexers in the RF front-end module to achieve the required transceiver functionality for one or more frequency bands. The use of the MTM-based passive components in place of active components can allow for current savings due to low insertion loss. Non-MTM components and antennas may also be used where the cost and performance targets are met. Specifically, this document describes various architectures and implementations of a transceiver system that includes one or more antennas supporting a single frequency band or multiple frequency bands, a Tx circuit that processes Tx signals, a Rx circuit that processes Rx signals, and an isolation circuit that is coupled to the one or more antennas and to the Tx and Rx circuits and provides adequate electromagnetic isolation between the Tx circuit and the Rx circuit without semiconductor switches, with a reduced number of semiconductor switches or a reduced number of semiconductor switch terminals compared to a conventional system.

MTM structures can be used to construct antennas, transmission lines and other RF components and devices, allowing for a wide range of technology advancements such as functionality enhancements, size reduction and performance improvements. Information on the features and analyses associated with antennas, transmission lines, couplers, filters and other devices/circuits based on the MTM technology can be found in the following patent documents: U.S. patent application Ser. No. 11/741,674 entitled "Antennas, Devices and Systems based on Metamaterial Structures," filed on Apr. 27, 2007; U.S. Pat. No. 7,592,952 entitled "Antennas Based on Metamaterial Structures," issued on Sep. 22, 2009; U.S. patent application Ser. No. 12/340,657 entitled "Multi-Metamaterial-Antenna Systems with Directional Couplers," filed on Dec. 20, 2008; U.S. patent application Ser. No. 12/272,781 entitled "Filter Design Methods and Filters Based on Metamaterial Structures," filed on Nov. 17, 2008; and U.S. Provisional Patent Application Ser. No. 61/153,398 entitled "A Metamaterial Power Amplifier System and Method for Generating Highly Efficient and Linear Multi-Band Power Amplifiers," filed on Feb. 18, 2009. One type of MTM antenna structure is a Single-Layer Metallization (SLM) MTM antenna structure, which has conductive parts of the MTM antenna in a single metallization layer formed on one side of a substrate. A Two-Layer Metallization Via-Less (TLM-VL) MTM antenna structure is of another type characterized by two metallization layers on two parallel surfaces of a substrate without having a conductive via to connect one conductive part in one metallization layer to another conductive part in the other metallization layer. The examples and implementations of the SLM and TLM-VL MTM antenna structures are described in the U.S. patent application Ser. No. 12/250,477 entitled "Single-Layer Metallization and Via-Less Metamaterial Structures," filed on Oct. 13, 2008. Different from the SLM and TLM-VL MTM antenna structures, a multilayer MTM antenna structure has conductive parts in two or more metallization layers which are connected by at least one via. The examples and implementations of such multilayer MTM antenna structures are described in the U.S. patent application Ser. No. 12/270,410 entitled "Metamaterial Structures with Multilayer Metallization and Via," filed on Nov. 13, 2008. In addition, non-planar (three-dimensional) MTM antenna structures can be realized based on a multi-substrate structure. The examples and implementations of such multi-substrate-based MTM antenna structures are described in the U.S. patent application Ser. No. 12/465,571 entitled "Non-Planar Metamaterial Antenna Structures," filed on May 13, 2009. Furthermore, dual and multi-port MTM antennas can also be formed, and the examples and implementations are described in the U.S. Provisional Patent Application Ser. No. 61/259,589 entitled "Multi-Port Frequency Band Coupled Antennas," filed on Nov. 9, 2009. The above references disclose various MTM structures and analyses that can be used for constructing MTM passive components and antennas in the system implementations described in this document.

The MTM-based components and antennas are designed based on CRLH unit cells. FIGS. 3A-3E illustrate examples of CRLH unit cells. As illustrated in FIGS. 3A-3E, the CRLH unit cells are built or designed from electrical elements including an RH series inductance $L_R$, an LH series capacitance $C_L$, an LH shunt inductance $L_L$, and an RH shunt capacitance $C_R$. These elements represent equivalent circuit parameters for a CRLH unit cell. An RH block 300 represents an RH transmission line, which can be equivalently expressed with the RH shunt capacitance $C_R$ 302 and the RH series inductance $L_R$ 304, as illustrated in FIG. 3F. "RH/2" in these figures refers to the length of the RH transmission line being divided by 2. Variations of the CRLH unit cell include a configuration as shown in FIG. 3A but with RH/2 and $C_L$ interchanged; and configurations as shown in FIGS. 3A-3C but with RH/4 on one side and 3RH/4 on the other side instead of RH/2 on both sides. Alternatively, other complementary fractions may be used to divide the RH transmission line. The MTM structures may be implemented based on these CRLH unit cells by using distributed circuit elements, lumped circuit elements or a combination of both. Such MTM structures may be fabricated on various circuit platforms, including circuit boards such as a FR-4 Printed Circuit Board (PCB) or a Flexible Printed Circuit (FPC) board. Examples of other fabrication techniques include thin film fabrication techniques, system on chip (SOC) techniques, low temperature co-fired ceramic (LTCC) techniques, monolithic microwave integrated circuit (MMIC) techniques, and MEMS (Micro-Electro Mechanical System) techniques.

Some of the above fabrication techniques, LTCC for example, may allow for replacement of a pre-LNA SAW filter with a diplexer, LPF, and/or a high pass filter (HPF) to further reduce the overall insertion loss, cost, and integration complexity. In addition, use of certain fabrication techniques may make it possible to design a new type of duplexers to replace the pre-LNA SAW filter and a diplexer or a combination of a diplexer, LPF and HPF to further reduce the overall insertion loss, cost, and integration complexity.

A pure LH metamaterial follows the left-hand rule for the vector trio $(E, H, \beta)$, wherein the phase velocity direction is opposite to the signal energy propagation direction. Both the permittivity $\epsilon$ and permeability $\mu$ of the LH material are simultaneously negative. A CRLH metamaterial can exhibit both LH and RH electromagnetic properties depending on the regime or frequency of operation. The CRLH metamaterial can exhibit a non-zero group velocity when the wavevector (or propagation constant) of a signal is zero. In an unbalanced case, there is a bandgap in which electromagnetic wave propagation is forbidden. In a balanced case, a dispersion curve shows no discontinuity at the transition point of the propagation constant $\beta(\omega_o) = 0$ between the LH and RH regions, where the guided wavelength $\lambda_g$ is infinite, i.e., $\lambda_g = 2\pi/|\beta| \to \infty$, while the group velocity $v_g$ is positive:

$$v_g = \left.\frac{d\omega}{d\beta}\right|_{\beta=0} > 0. \qquad \text{Eq. (1)}$$

This state corresponds to the zeroth order mode in a Transmission Line (TL) implementation.

Figure 4:
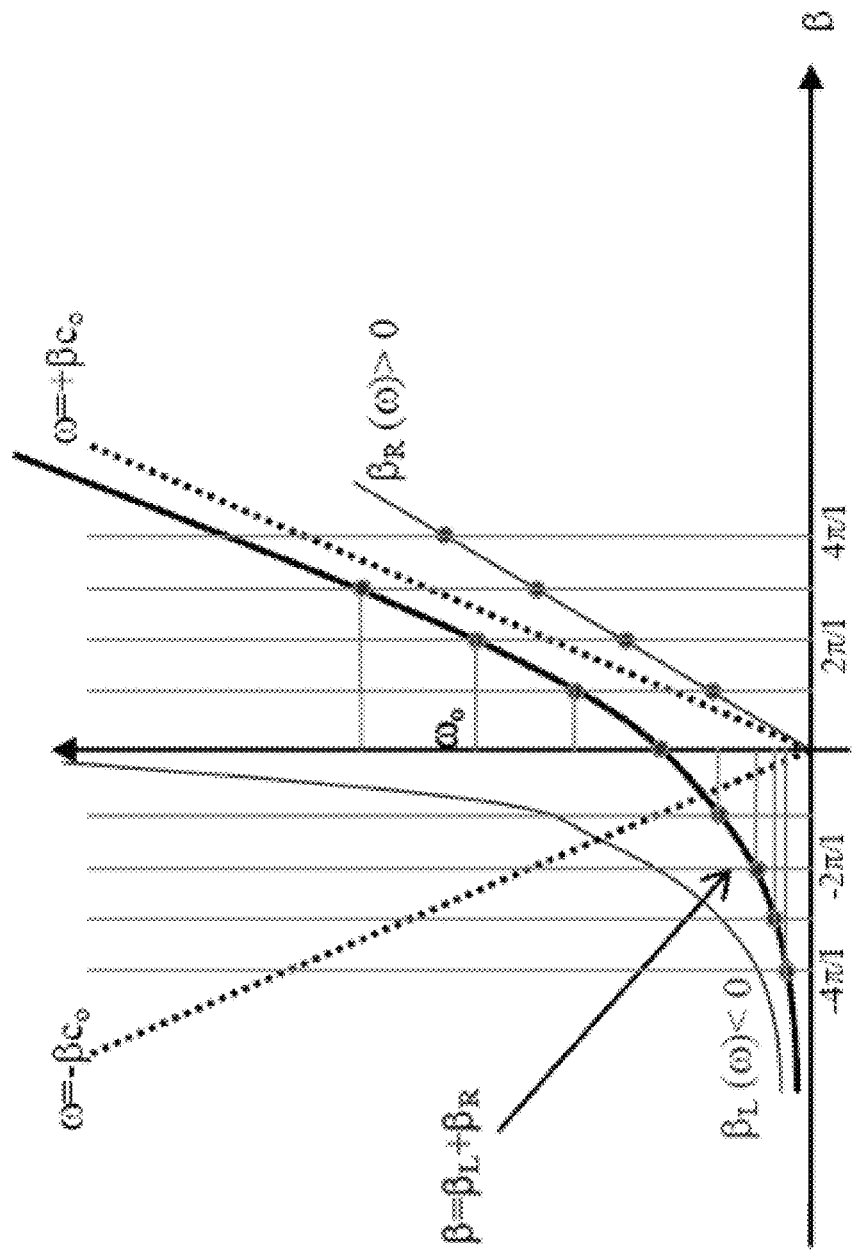
FIG. 4 illustrates RH, LH and CRLH dispersion curves.

FIG. 4 illustrates the RH dispersion curve denoted by $\beta_R$, the LH dispersion curve denoted by $\beta_L$, and the CRLH dispersion curve denoted by $\beta_R + \beta_L$ with a balanced CRLH unit cell. In the unbalanced case, there are two possible zero$^{th}$ order resonances, $\omega_{se}$ and $\omega_{sh}$, which can support an infinite wavelength ($\beta=0$, fundamental mode) and are expressed as:

$$\omega_{sh} = \frac{1}{\sqrt{C_R L_L}} \text{ and } \omega_{se} = \frac{1}{\sqrt{C_L L_R}}, \qquad \text{Eq. (2)}$$

where $C_R L_L \neq C_L L_R$. At $\omega_{se}$ and $\omega_{sh}$, the group velocity ($v_g = d\omega/d\beta$) is zero and the phase velocity ($v_p = \omega/\beta$) is infinite. When the CRLH unit cell is balanced, these resonant frequencies coincide as illustrated in FIG. 4 and are expressed as:

$$\omega_{se} = \omega_{sh} = \omega_0, \qquad \text{Eq. (3)}$$

where $C_R L_L = C_L L_R$, and the positive group velocity ($v_g = d\omega/d\beta$) as in Eq. (1) and the infinite phase velocity ($v_p = \omega/\beta$) can be obtained. For the balanced case, the general dispersion curve can be expressed as:

$$\beta = \frac{1}{p}\left(\omega\sqrt{L_R C_R} - \frac{1}{\omega\sqrt{L_L C_L}}\right), \qquad \text{Eq. (4)}$$

where the period of a CRLH unit cell is denoted by p. The propagation constant $\beta$ is positive in the RH region, and that in the LH region is negative. The first term represents the RH component $\beta_R$ and the second term represents the LH component $\beta_L$, thereby indicating that the LH properties are dominant in the low frequency region, and the RH properties are dominant in the high frequency region. The CRLH dispersion curve $\beta_R + \beta_L$ extends to both the negative and positive $\beta$ regions; thus, the CRLH structure can support a spectrum of resonant frequencies, as indicated by multiple $\omega$ lines intersecting the CRLH dispersion curve in FIG. 4.

Referring back to FIG. 1, the current state of the art involves integration of harmonic rejection filters, Tx/Rx switches and a diplexer in a single ASM. The primary role of the ASM is to connect multiple transmitters and multiple receivers to a single antenna to optimize transmit or receive power on an active path while providing adequate isolation to inactive paths. FIGS. 1 and 2 show two examples of conventional ASMs. The first ASM example in FIG. 1 includes two SPDT Tx/Rx switches 120 and 124, two harmonic rejection filters 136 and 144, and one diplexer 128. The second ASM example in FIG. 2 includes one SP4T switch 220 and two harmonic rejection filters 136 and 144. These architectures perform multiplexing with a single dual-band Tx/Rx antenna 132. Table 1 provides typical considerations for ASMs incorporating device characteristics.

TABLE 1

| Parameter | Conditions | Design Range | Remarks |
|---|---|---|---|
| Insertion Loss | Ant. → Tx L, H band | 1.0-1.2 dB | LPF: 0.3-0.5 dB, SPDT: 0.3-0.4 dB, SP4T: 0.5-0.7 dB, Diplexer: 0.4-0.6 dB |
| | Ant. → Rx L, H band | 0.8-1.0 dB | |
| Isolation | Tx L band → Rx H band, Rx L band | >26 dB | Maintain less than +8 dBm @ Rx RF SAW input from 34 dBm Max Pout of PA, in order to protect the Rx SAW filter and the Rx RFIC during transmissions. |

TABLE 1-continued

| Parameter | Conditions | Design Range | Remarks |
|---|---|---|---|
| | Tx H band→ Rx H band, Rx L band | >24 dB | Maintain less than +8 dBm @ Rx RF SAW input from 31.5 dBm Max Pout of PA, in order to protect the Rx SAW filter and the Rx RFIC during transmissions. |
| Harmonic Rejection (LPF) | Tx L band | $2^{nd}$: 25 dB $3^{rd}$: 20 dB | May be shared by LPF and Diplexer. Spurious emission band and UE co-existence. |
| | Tx H band | $2^{nd}$: 20 dB $3^{rd}$: 20 dB | Spurious emission band. |

In some examples, the isolation desired between the Tx and Rx paths is determined such that the input power to Rx SAW filters and LNAs does not exceed a maximum rating input power. Consider a first scenario where Rx SAW filters have a maximum rating input power of 13 dBm, wherein an LNA may handle the maximum rating input power of around 5 dBm. The LNAs may be located directly after the respective Rx SAW filters in the receive paths. The Rx SAW filters may reject at least 20 dB of the Tx signal, and thus the LNAs receive about −7 dBm at maximum, which is well below the maximum rating input power of the LNAs. This indicates that the Tx leakage power may damage the Rx SAW filters first before the LNAs receive their maximum rating input power at least in this scenario. Therefore, protection of the Rx SAW filters is considered with respect to the maximum rating power level. In the above estimates, the upper limit of a SAW filter input power is assumed at +8 dBm with a 5 dB margin for handset manufacturing. As an example, in a system as in FIG. 1, the low band SPDT Tx/Rx switch 124 would provide at least 26 dB isolation between the Tx and Rx signal paths. The high band SPDT Tx/Rx switch 120 would provide at least 24 dB isolation. Therefore, in this scenario, if the maximum output Tx power at the low band PA 112 is +34 dBm and the insertion loss between the PA output and the antenna port is 1 dB, then the desired Tx path to Rx path isolation between the low band PA 112 output and the low band Rx SAW filter 148 input is about 26 dB, as specified in Table 1. Similarly, isolation for the high band may be estimated to be about 24 dB between the high band PA 104 output and the high band Rx SAW filter 140 input. Here, the maximum output Tx power is assumed to be +31.5 dBm in the high band. Note, however, that the above isolation values are examples and estimates. By using advanced or different filtering techniques or circuit topology, these parameter values may change.

Some of the system architectures incorporate MTM technology which enables miniaturization of antennas with improved efficiency over non-MTM structures and technology. Furthermore, integration of passive components with these antennas may enable the design of new architectures to achieve improved insertion loss and out-of-band rejection. For example, the use of passive components may eliminate the need for one or more control lines in a GSM cellular phone responsible for decoding the antenna switching signals in the μsec timing resolution. Such architectures offer a low cost solution for dual-band systems, such as GSM cellular phone systems in some implementation examples.

Figure 5A:
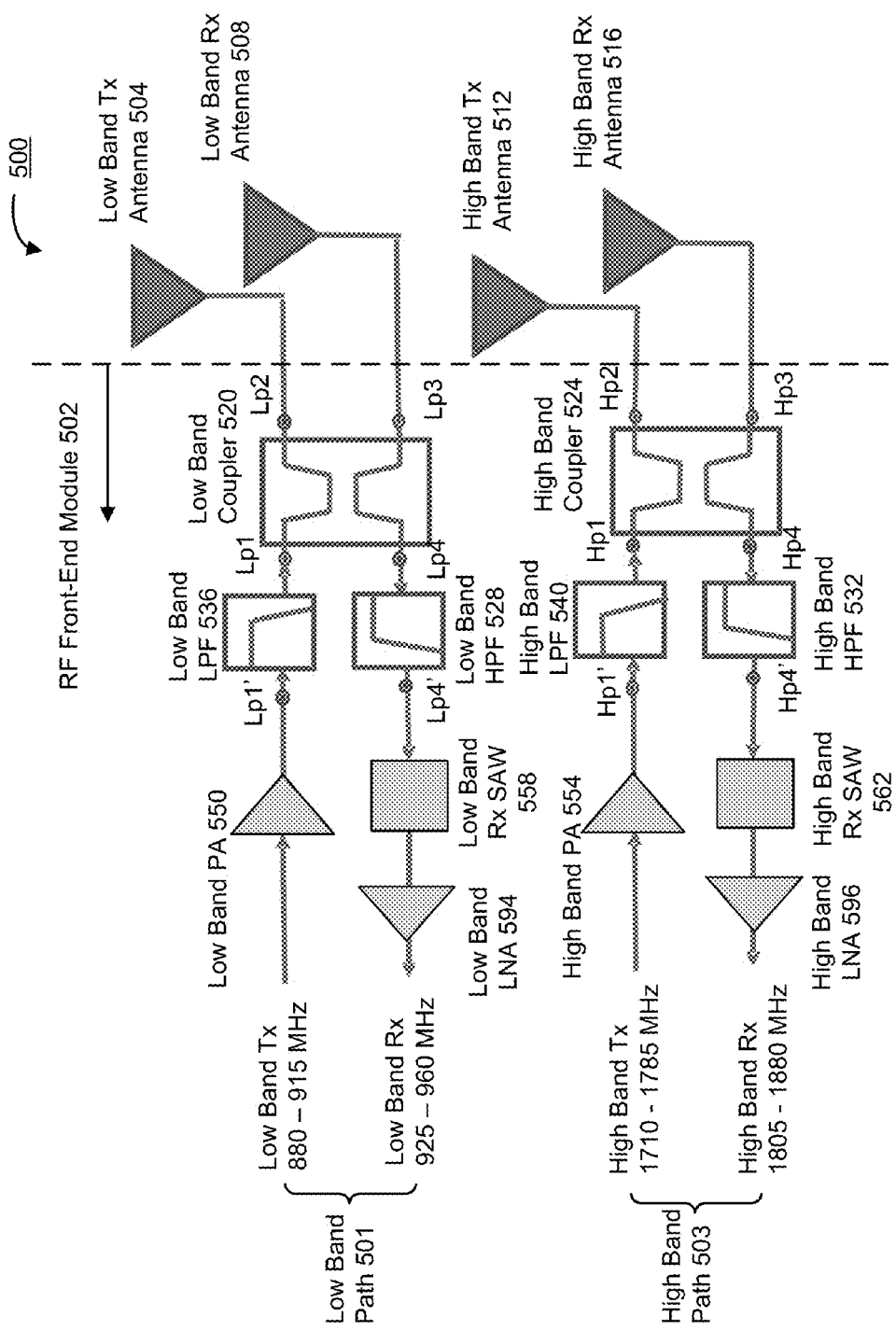
FIG. 5A illustrates, in block diagram form, a four-antenna dual-band transceiver system, according to an example embodiment.

FIG. 5A illustrates an example of a four-antenna dual-band transceiver system 500. The system 500 may support communications in a dual-band GSM900/DCS1800 as an example. The system 500 is a dual band system, meaning that it is able to handle communications in two frequency bands. For clarity, the illustrated example identifies a low band path 501 and a high band path 503. Each band path has a receive antenna and a transmit antenna. In this way, each band path has a receive path and a transmit path, and therefore, the system 500 has 4 communication or transmission paths within an RF front-end module 502. The system 500 includes four single-band antennas 504, 508, 512 and 516 coupled to the RF front-end module 502 that has two couplers 520 and 524, two LPFs 536 and 540, and two HPFs 528 and 532. The module 502 further includes the low band PA 550 coupled to the low band LPF 536, the high band PA 554 coupled to the high band LPF 540, the low band Rx SAW 558 coupled to the low band HPF 528, the high band Rx SAW 562 coupled to the high band HPF 532, and the low band LNA 594 and high band LNA 596 coupled to the low band Rx SAW 558 and high band Rx SAW 562, respectively. The four antennas 504, 508, 512, 516 are tuned to support the low band Tx (880-915 MHz), the low band Rx (925-960 MHz), the high band Tx (1710-1785 MHz), and the high band Rx (1805-1880 MHz), respectively, so as to provide the low band Tx antenna 504, the low band Rx antenna 508, the high band Tx antenna 512, and the high band Rx antenna 516, respectively.

The low band path 501 processes Tx signals received at the Tx PA 550 to the LPF 536, to the coupler 520 and finally to the Tx antenna 504. The low band path 501 processes Rx signals received at the Rx antenna 508 by passing to coupler 520 and then to the HPF 528 and to the Rx SAW 558. The high band path 503 has similar operations for the high band Tx and Rx signals.

These antennas 504, 508, 512, 516 may be designed based on MTM structures. The low band Tx antenna 504 and the low band Rx antenna 508 are coupled to the low band coupler 520 so as to provide isolation between the low band Tx and Rx paths, for example, between points Lp1 and Lp4'. A similar configuration is made in the high band path, wherein the high band Tx antenna 512 and the high band Rx antenna 516 are both coupled to the high band coupler 524 so as to provide isolation between the high band Tx and Rx paths, for example between points Hp1 and Hp4'. MTM couplers may be used for the couplers 520 and 524 to enhance isolation between the transmit and receive paths within respective band paths.

The isolation technique between the Tx and Rx signal paths considers the Tx band with less emphasis on the Rx band, as explained earlier. Therefore, the couplers 520 and 524 may be designed to control decoupling and isolation in the Tx band better than in the Rx band. To further improve isolation, the low band HPF 528 and the high band HPF 532 are added in the respective Rx paths, as illustrated in FIG. 5A. The low band LPF 536 and the high band LPF 540 are placed in the respective Tx paths to reject the $2^{nd}$ and $3^{rd}$ harmonics at the respective PA outputs, mainly performing the function of the harmonic rejection filters 136 and 144 in FIGS. 1 and 2. In one example, by accounting for an insertion loss of about 1 dB through configuration of the components in the Tx path, the minimum isolation in the Tx band is estimated at about 26 dB for the low band and 24 dB for the high band.

In addition to cost reduction, this architecture may provide improved insertion loss and antenna efficiency in both the Tx and Rx bands. The low insertion loss of this architecture results from, at least in part, that the four port coupler has through transmission in the pass bands. A system incorporating an MTM coupler and filters may improve insertion loss between the PA output and the feed point of the antenna, i.e., between Lp1' and Lp2 and between Hp1' and Hp2. Further, such an MTM solution may improve insertion loss between the feed point and the Rx SAW input, i.e., between Lp3 and Lp4' and between Hp3 and Hp4'. The separation of the Tx and Rx antennas, instead of a combined Tx/Rx antenna, in each band as in the four-antenna dual-band transceiver system of FIG. 5A may improve antenna radiation efficiency, since the antenna impedance may be matched to an optimal point for better radiation in each narrower (Tx or Rx) bandwidth instead of the wider (Tx and Rx) combined bandwidth.

Similar isolation schemes may be used for both low and high bands. The following considers an isolation technique in the context of a low band. In this architecture, the number of couplers corresponds to the number of frequency bands supported in the system, wherein each frequency band includes Tx and Rx bands.

Figure 5B:
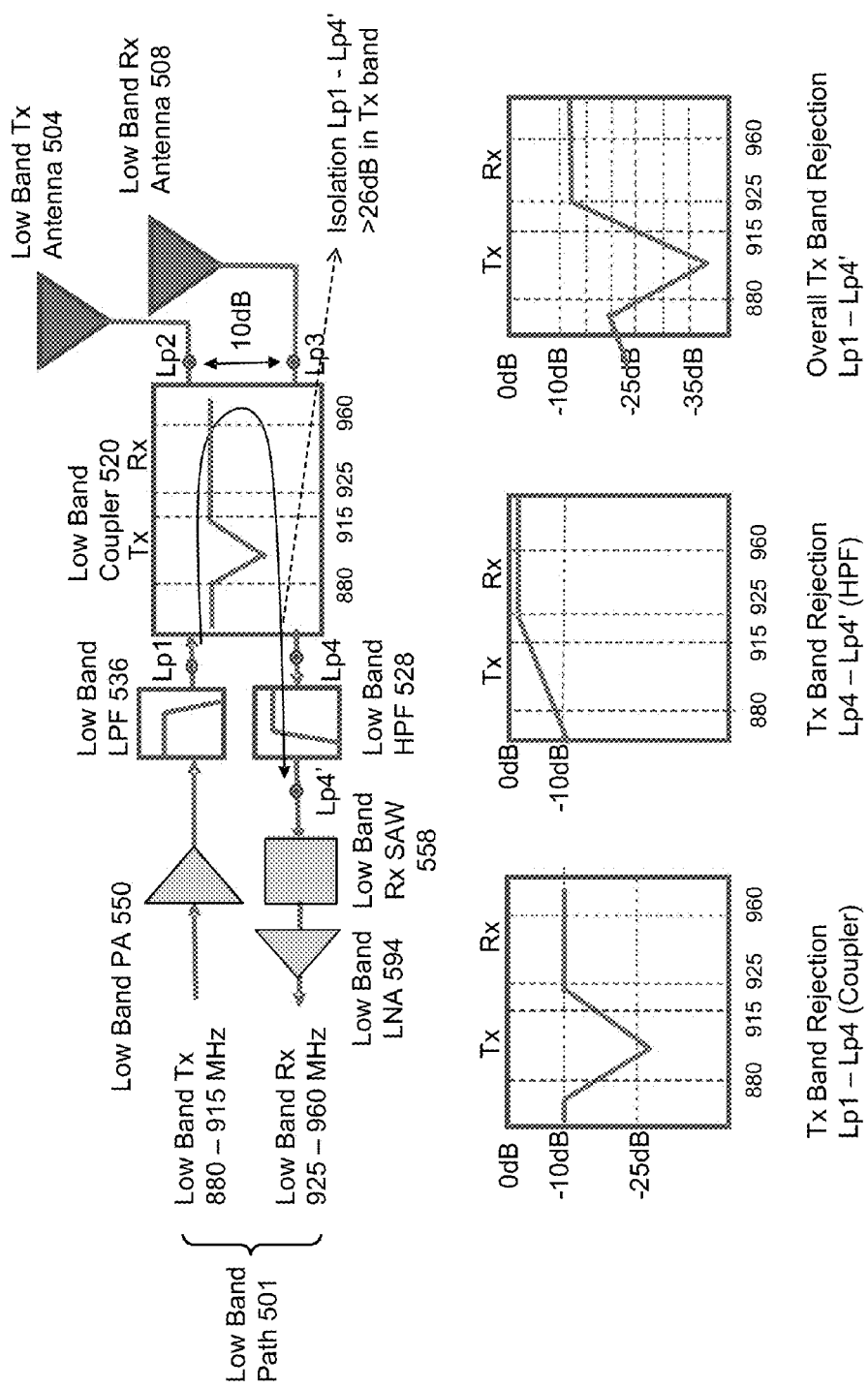
FIG. 5B illustrates an example of an isolation scheme for minimizing the Tx power leakage from the Tx antenna to the Rx path.

FIG. 5B illustrates an isolation scheme for minimizing the Tx power leakage from the Tx antenna 504 to the Rx path for the low band path 501 of the system 500. The coupler 520 is designed to reject the Tx signal in the Rx path according to the following method: (i) estimate the coupling between Lp2 and Lp3, i.e., (between the Tx antenna 504 and the Rx antenna 508); (ii) design the coupler 520 per the same coupling level as the coupling estimated in (i); and (iii) design the coupler 520 such that the sum of the phase between Lp1 and Lp2 of the coupler 520, the phase between Lp2 and Lp3 of the antennas 504 and 508, and the phase between Lp3 and Lp4 of the coupler 520 is 180° off the phase between Lp1 and Lp4 of the coupler 520. Details of MTM coupler designs and implementations are described in U.S. patent application Ser. No. 12/340,657 entitled "Multi-Metamaterial-Antenna Systems with Directional Couplers," filed on Dec. 20, 2008. FIG. 5B illustrates an example of the Tx band rejection considerations between the coupler ports Lp1 and Lp4, between the HPF ports Lp4 and Lp4', as well as overall Tx band rejection. These considerations incorporate device characteristics based on the typical GSM system considerations. As shown in the three plots in the lower portion of FIG. 5B, the HPF 528 in the Rx path helps improve the overall Tx band rejection between Lp1 and Lp4', which is better than the Tx band rejection by the coupler 520 alone.

The considerations on the isolation between the low band Tx and high band Rx paths and the isolation between the high band Tx and low band Rx paths may be less stringent in the four-antenna duplexer architecture because of the large frequency bandgaps that give weak coupling. An architecture such as illustrated in FIG. 5A may be configured to incorporate MTM technology for the filters, couplers, and/or antennas, resulting in improved cost and performance, including improved insertion loss and out-of-band rejection. However, a conventional or non-MTM based technology may also be utilized.

Figure 6A:
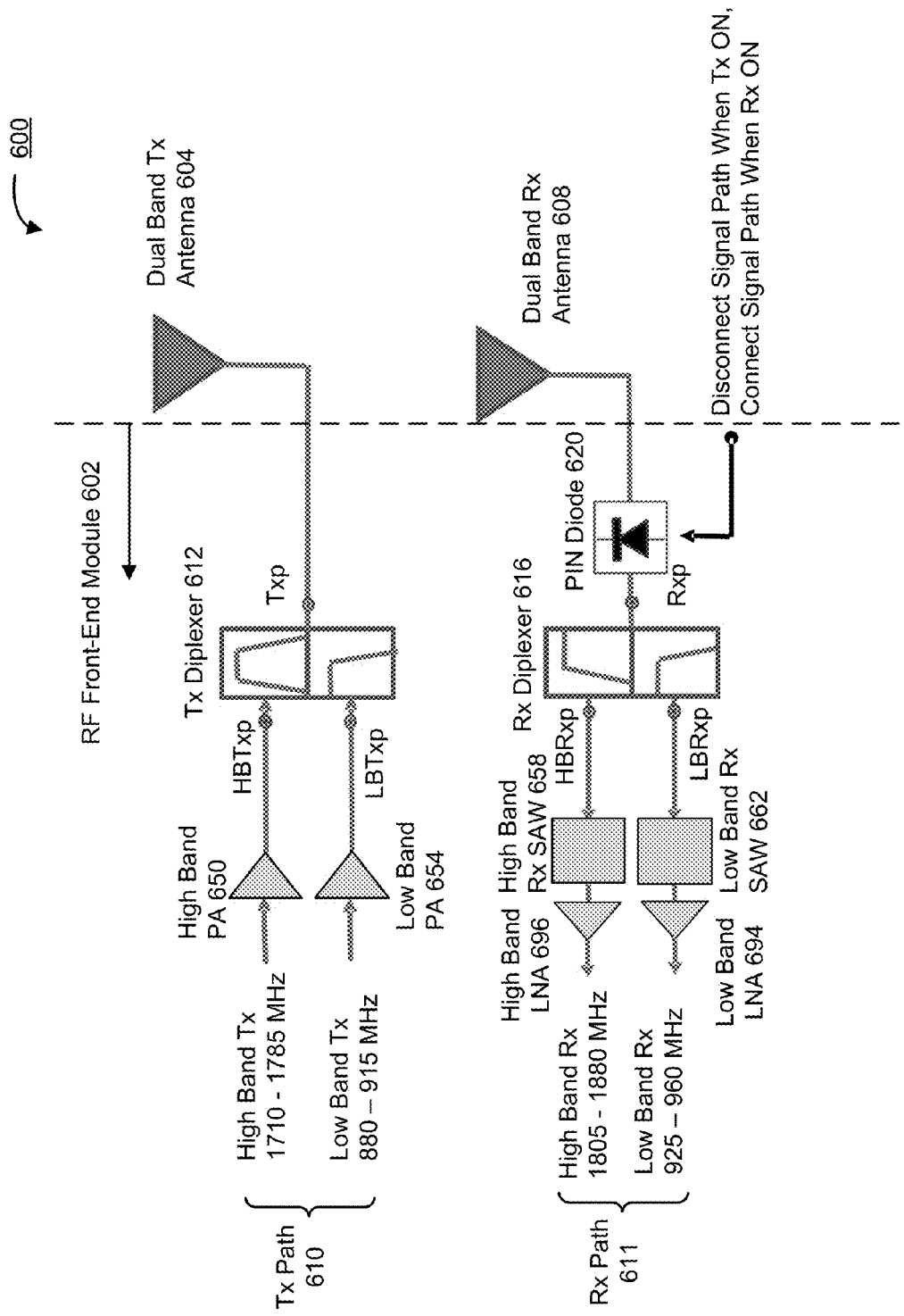
FIG. 6A illustrates, in block diagram form, a two-antenna dual-band transceiver system, according to an example embodiment.

FIG. 6A illustrates an example of a two-antenna dual-band transceiver system 600, which may support communications in a dual-band GSM900/DCS1800 as an example. The system 600 includes two dual-band antennas 604 and 608 coupled to an RF front-end module 602 that has two diplexers 612 and 616, and one PIN diode 620. The module 602 further includes the high band PA 650 and the low band PA 654 coupled to the Tx diplexer 612, the high band Rx SAW 658 and the low band Rx SAW 662 coupled to the Rx diplexer 616, and the low band LNA 694 and high band LNA 696 coupled to the low band Rx SAW 658 and high band Rx SAW 662, respectively. The two dual-band antennas 604, 608 may be designed based on MTM structures in this example. The dual-band Tx antenna 604 is tuned to support the low band Tx (880-915 MHz) and the high band Tx (1710-1785 MHz); the dual-band Rx antenna 608 is tuned to support the low band Rx (925-960 MHz) and the high band Rx (1805-1880 MHz). Two types of diplexer, the Tx diplexer 612 and the Rx diplexer 616, are coupled to the Tx path 610 and Rx path 611, respectively.

One aspect of an architecture as illustrated in FIG. 6A is the use of the dual-band Tx antenna 604 and the dual-band Rx antenna 608 respectively for the Tx and Rx bands, in combination with the diplexers 612 and 616 and the PIN diode 620 to achieve isolation between the Tx and Rx paths. The PIN diode 620 may be connected in parallel with, or in series with, the dual-band Rx antenna 608 to disconnect the Rx path when the dual-band Tx antenna 604 is transmitting the signal. Control signals from an external control circuit may control the PIN diode 620. Alternatively, the Tx/Rx on/off control available from the baseband modem in a GSM mobile phone may be commonly used for controlling the PIN diode 620 to provide an ON state (Rx path connected) and an OFF state (Rx path disconnected) in this example. Isolation better than 26 dB in the Tx band may be achieved using a low-cost commercial PIN diode.

The Tx diplexer 612 separates the Tx high band from the Tx low band; and the Rx diplexer 616 separates the Rx high band from the Rx low band. As illustrated schematically in FIG. 6A, the Tx diplexer 612 may include a LPF for the Tx low band and a BPF for the Tx high band; and the Rx diplexer 616 may include a LPF for the Rx low band and a HPF for the Rx high band. This configuration gives the following two features. First, due to the frequency pairing (low band and high band) for each of the Tx and Rx paths, it is unlikely that this configuration provides a routing path from the Tx path to the Rx SAW filters via the Tx diplexer 612 or the Rx diplexer 616, thereby relaxing the isolation consideration for the diplexers. In this case, a 15 dB band-to-band isolation may be used to isolate the high band and low band ports (between HBTxp and LBTxp for Tx; between HBRxp and LBRxp for Rx) rather than a 26 dB isolation. Second, the frequency pairing (low band and high band) for each of the Tx and Rx paths provides more isolation because the high band and the low band in each pair are separated in frequency. In one example, a stringent consideration includes 25 dB of the $2^{nd}$ harmonic rejection for the LPF in the low band of the Tx diplexer 612. By taking advantage of a relaxed out-of-band rejection consideration and a large separation in frequency between the high band and the low band, the order of the filter may be reduced, thereby simplifying the filter design. Furthermore, a low insertion loss of the Tx diplexer 612 may be achieved by using, for example, the MTM technology.

Figure 6B:
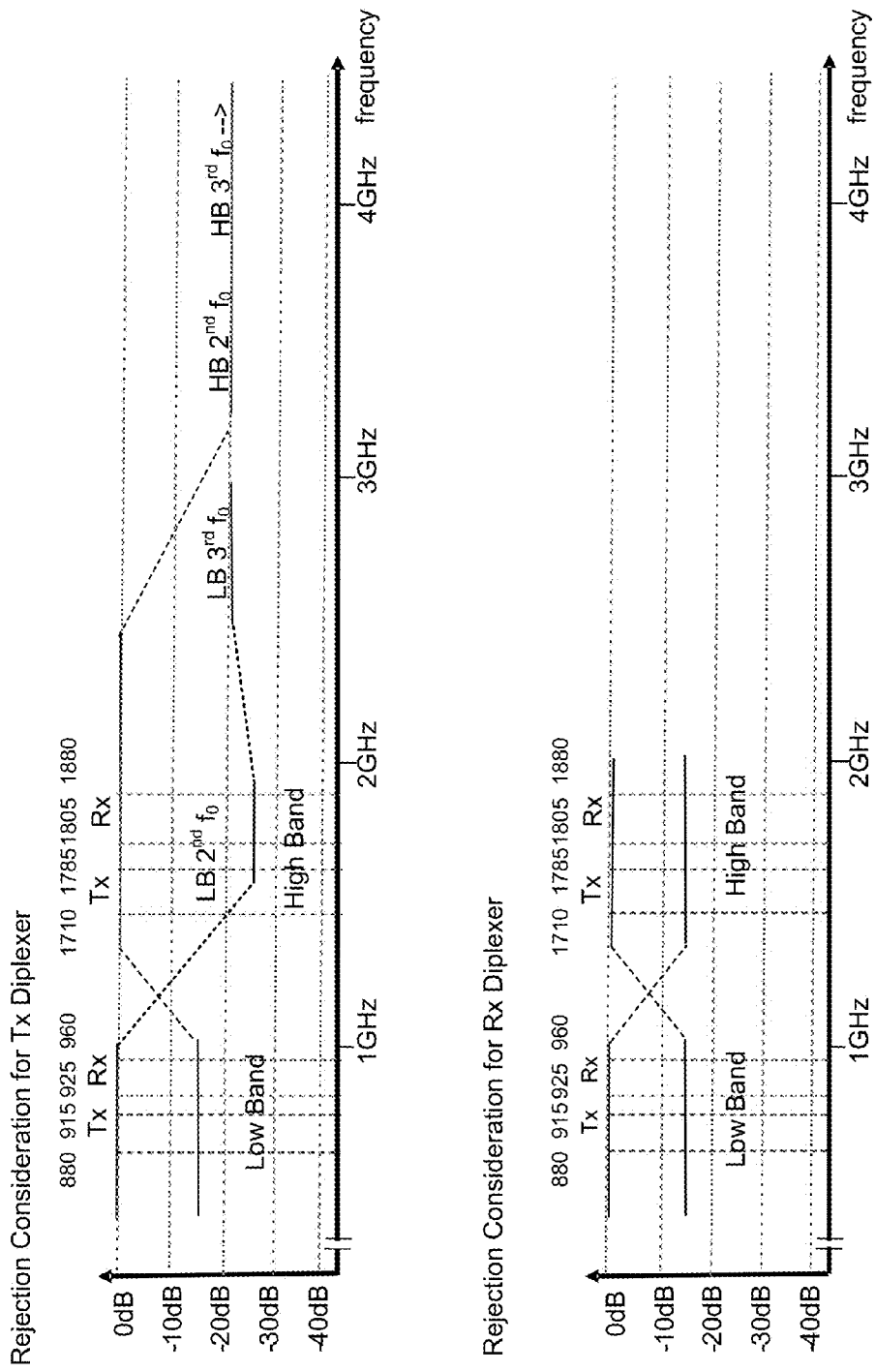
FIG. 6B illustrates rejection considerations as a function of frequency for the diplexers of FIG. 6A.

FIG. 6B plots typical rejection considerations, such as those in Table 1 based on similar estimates, as a function of frequency for the Tx diplexer 612 and for the Rx diplexer 616. These diplexers may be implemented directly on a PCB using either a conventional technology or the MTM technology. The LPF in the Tx diplexer 612 in the Tx low band path provides harmonic rejection of the low band transmitter through the ports LBTxp and Txp shown in FIG. 6A, whereas the BPF in the Tx diplexer 612 for the Tx high band path is responsible for proper harmonic rejection of the high band transmitter through the ports HBTxp and Txp shown in FIG. 6A. The Rx diplexer 616 works in the similar manner. This diplexer 616 separates the Rx high band path from the Rx low band path based on the LPF for the Rx low band and the HPF for the Rx high band. Because the Rx diplexer 616 deals with the receiver chain only, rejection of the Tx leakage power may be considered of less concern for the Rx diplexer design. Furthermore, by taking advantage of a large separation in frequency between the high and low Rx bands, the Rx diplexer 616 may be designed to achieve low insertion loss.

The use of the dual-band Tx antenna 604 and the dual-band Rx antenna 608 may lead to higher efficiency than a single dual-band Tx/Rx antenna (such as in FIGS. 1 and 2) since these two antennas may be tuned to narrower bands individually. Proper control of the adjacent antenna position and termination (open or short) may further improve radiation efficiency. For example, a secondary (adjacent) antenna may be used as a reflector to improve the main antenna efficiency. Based on a similar technique, a dual-band Rx antenna 608 may be manipulated through proper positioning and/or by terminating its ports when disconnecting through the use of the PIN diode 620 in order to improve the Tx antenna efficiency. A similar technique may be extended to a configuration having an active component (e.g., a switch, a PIN diode and the like) coupled to a single-band, dual-band or multi-band Rx antenna, in which the active component can be controlled to short the Rx antenna to the ground. As a result, the Rx antenna acts as a reflector, thereby improving the Tx antenna efficiency.

Figure 7:
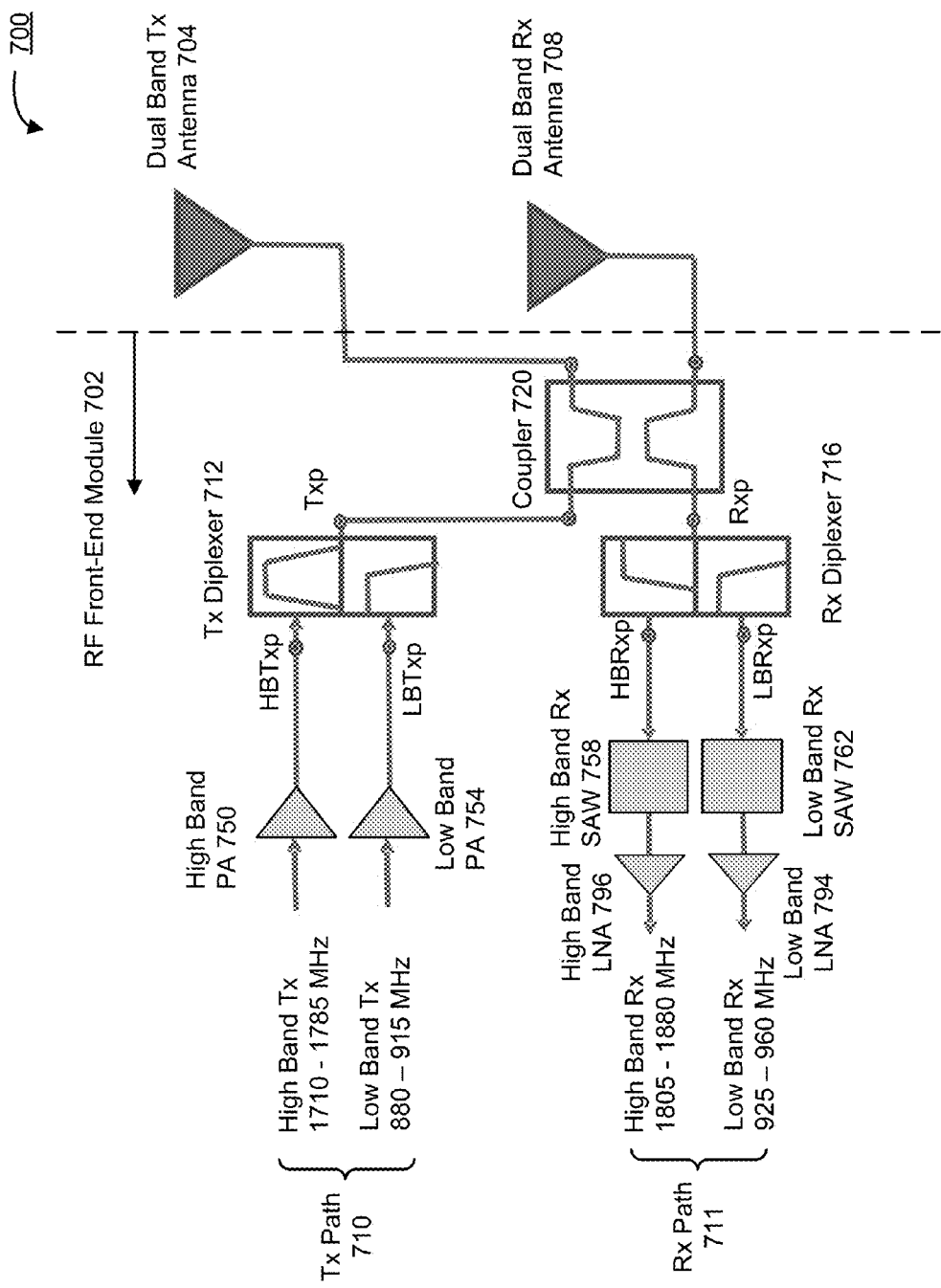
FIGS. 7-12 illustrate various example embodiments of dual-band transceiver systems.

FIG. 7 illustrates another example of a two-antenna dual-band transceiver system 700. The system 700 may support communications in a dual-band GSM900/DCS1800 system as an example. As compared to the two-antenna dual-band transceiver system 600 shown in FIG. 6A, this system 700 of FIG. 7 includes a coupler 720 coupled to the Tx and Rx paths in place of the PIN diode 620 coupled to the Rx path in FIG. 6A. The system 700 is similar to the system 600 having a Tx diplexer 712 and an Rx diplexer 716. The Tx path 710 includes a high band PA 750 and a low band PA 754. The Rx path 711 includes a high band Rx SAW filter 758 and a low band Rx SAW filter 762, and a high band LNA 796 coupled to the high band Rx SAW 758 and a low band LNA 794 coupled to the low band Rx SAW 762.

The coupler 720 works with the mechanism similar to that of the couplers 520 and 524 used in the four-antenna dual-band transceiver system 500 of FIG. 5A, in that the coupler 720 decouples the power leakage from the Tx antenna 704 to the Rx antenna 708 in both high and low bands. Basic wavelength considerations with respect to the coupler dimensions indicate that the coupling in the high band is relatively weak. Thus, the coupler 720 can be designed to isolate the antennas 704 and 708 for the low band and to act as a through transmission line in the high band. This can be done by introducing an LC network in the MTM coupler design, for example. The coupler 720 can be configured for dual-band operations based on the CRLH MTM structures. The LH portion primarily controls the low band properties, whereas the RH portion primarily controls the high band properties.

With the advent of advanced filter technology, Rx BPF technology tends to increase the maximum ratings for input power using the Bulk Acoustic Wave (BAW) or Film Bulk Acoustic Resonator (FBAR) filter technology, for example. This could lead to relaxation of the isolation considerations. Alternatively, the isolation considerations may be relaxed when MTM filters are used in place of the SAW, BAW or FBAR filters.

Figure 8:
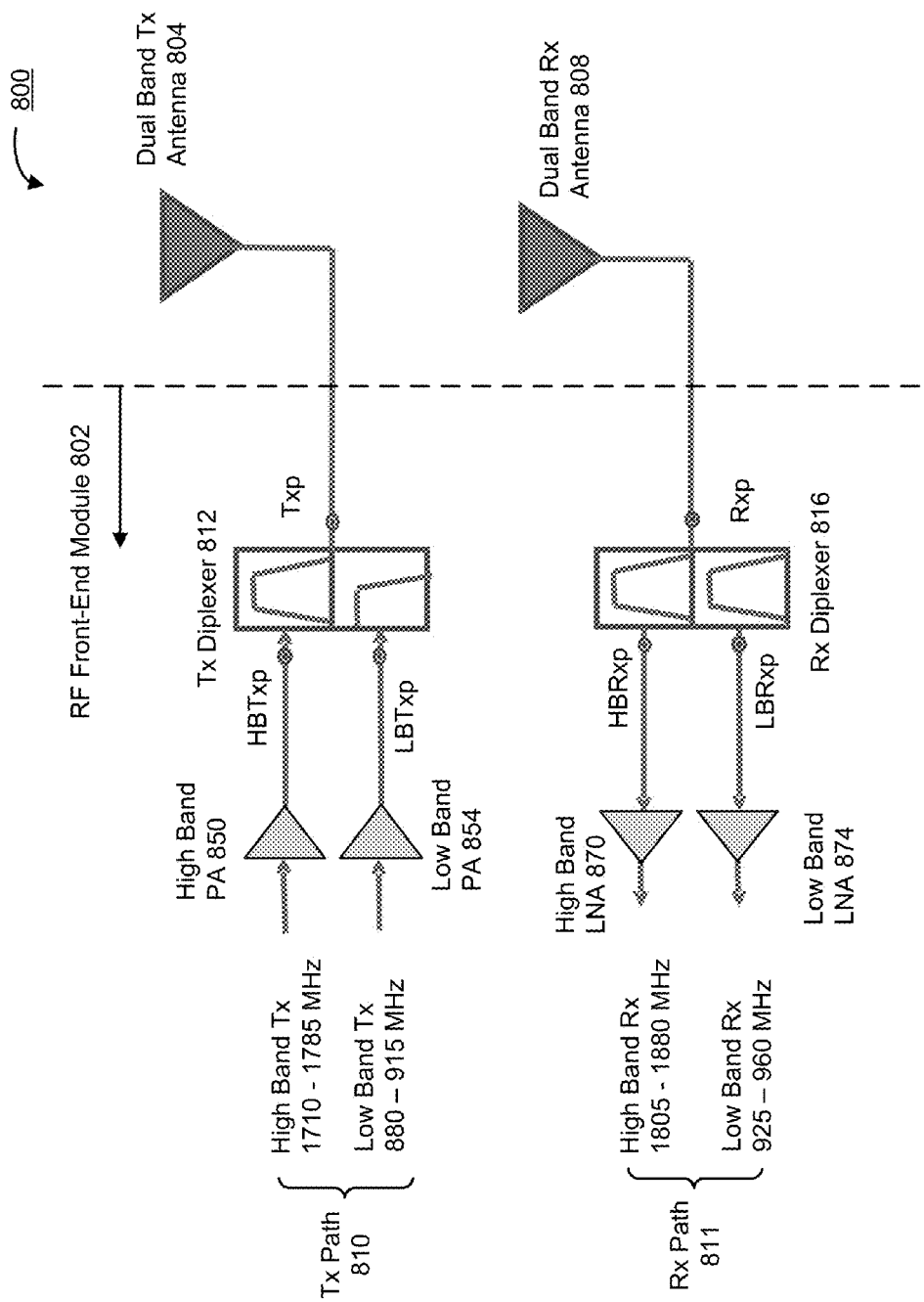

FIG. 8 illustrates another example of a two-antenna dual-band transceiver system. The system 800 may support a dual-band GSM900/DCS1800 communication system as an example. The system 800 has a Tx path 810 and a Rx path 811, wherein the Tx path 810 includes a high band PA 850 and a low band PA 854 coupled to a Tx diplexer 812. This system 800 includes a high band LNA 870 and the low band LNA 874 in the Rx path 811 without SAW filters. The high band Rx SAW 658, low band Rx SAW 662, Rx diplexer 616 and the PIN diode 620 in the architecture in FIG. 6 are replaced by one Rx diplexer 816 in FIG. 8. Due to the removal of the SAW filters, the isolation consideration between the ports Txp and Rxp is relaxed for both the Tx and Rx bands. With this relaxed isolation consideration, the BPF function of the original SAW filters can be incorporated in the Rx diplexer 816 for both the high and low bands to reject out-of-band signals in the Rx paths when the Rx antenna 808 is receiving and to reject the Tx power leakage to the Rx paths when the Tx antenna 804 is transmitting. Designing and fabrication of the Rx diplexer 816 may be based on the LTCC, multi-layer ceramics or FBAR-based technology that can provide resilience to the Tx leakage. A MTM diplexer or non-MTM diplexer can be used in this example.

Figure 9:
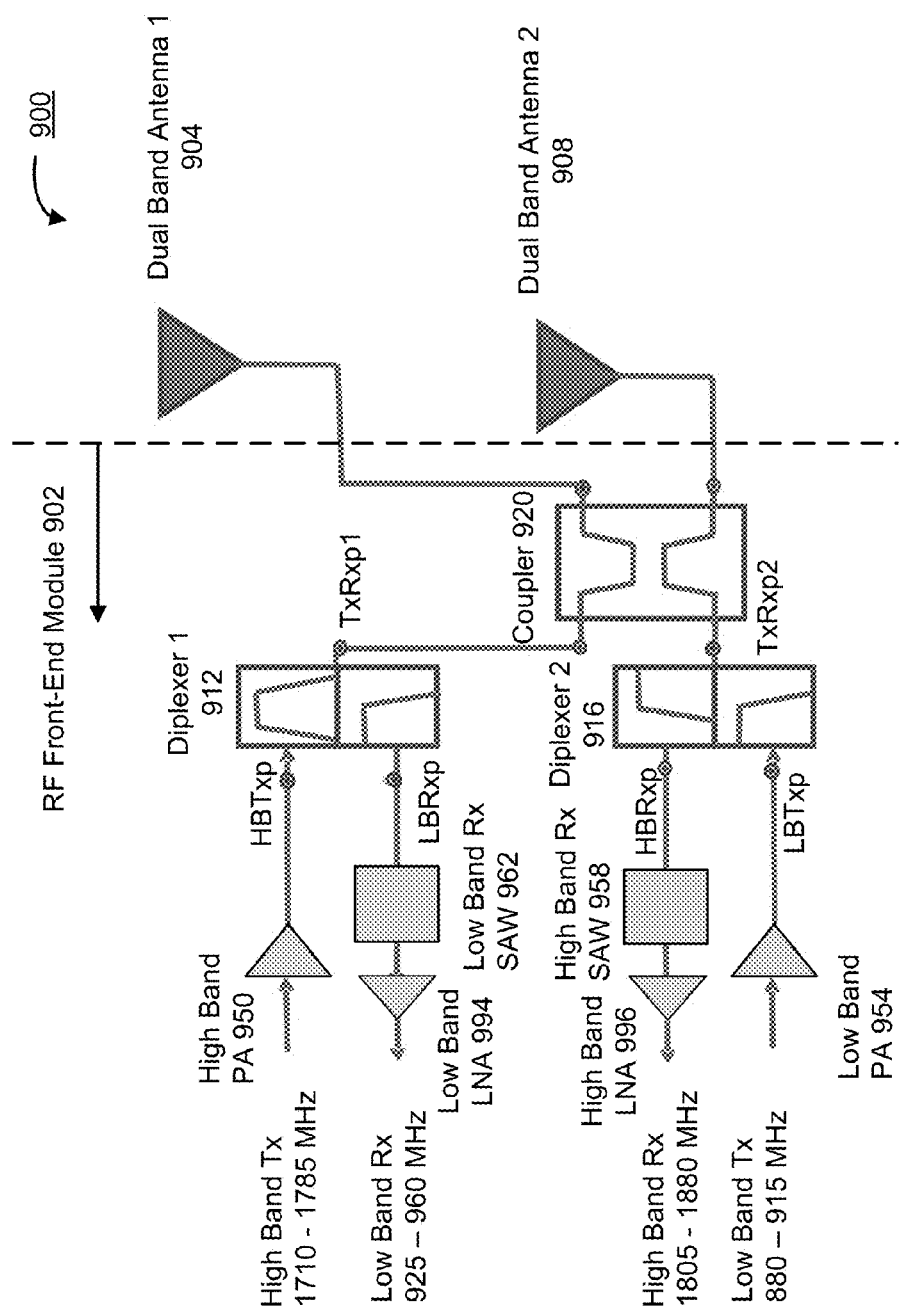

FIG. 9 illustrates another example of a two-antenna dual-band transceiver system 900. This system 900 may support a dual-band GSM900/DCS1800 communication system as an example. The system 900 includes two dual-band antennas 904 and 908 coupled to an RF front-end module 902 having two diplexers 912 and 916 and one coupler 920. The module 902 further includes the high band PA 950 and the low band Rx SAW 962 coupled to the diplexer 1 912, the low band PA 954 and the high band Rx SAW 958 coupled to the diplexer 2 916, and the low band LNA 994 and high band LNA 996 coupled to the low band Rx SAW 962 and high band Rx SAW 958, respectively. The two dual-band antennas 904 and 908 may be designed based on MTM structures in this example. The dual-band antenna 1 904 is tuned to support the low band Rx (925-960 MHz) and the high band Tx (1710-1785 MHz); the dual-band antenna 2 908 is tuned to support the high band Rx (1805-1880 MHz) and the low band Tx (880-915 MHz). This system 900 illustrated in FIG. 9 is similar to that of the two-antenna dual-band transceiver system 700 in FIG. 7, except that the diplexer 1 912 and the diplexer 2 916 are paired as high band Tx and low band Rx, and high band Rx and low band Tx, respectively. In this system, the coupler 920 experiences signal flow directions opposite to each other. For example, the Tx signal is injected at TxRxp2 and rejected at TxRxp1 for the low band, and vice versa for the high band.

Figure 10:
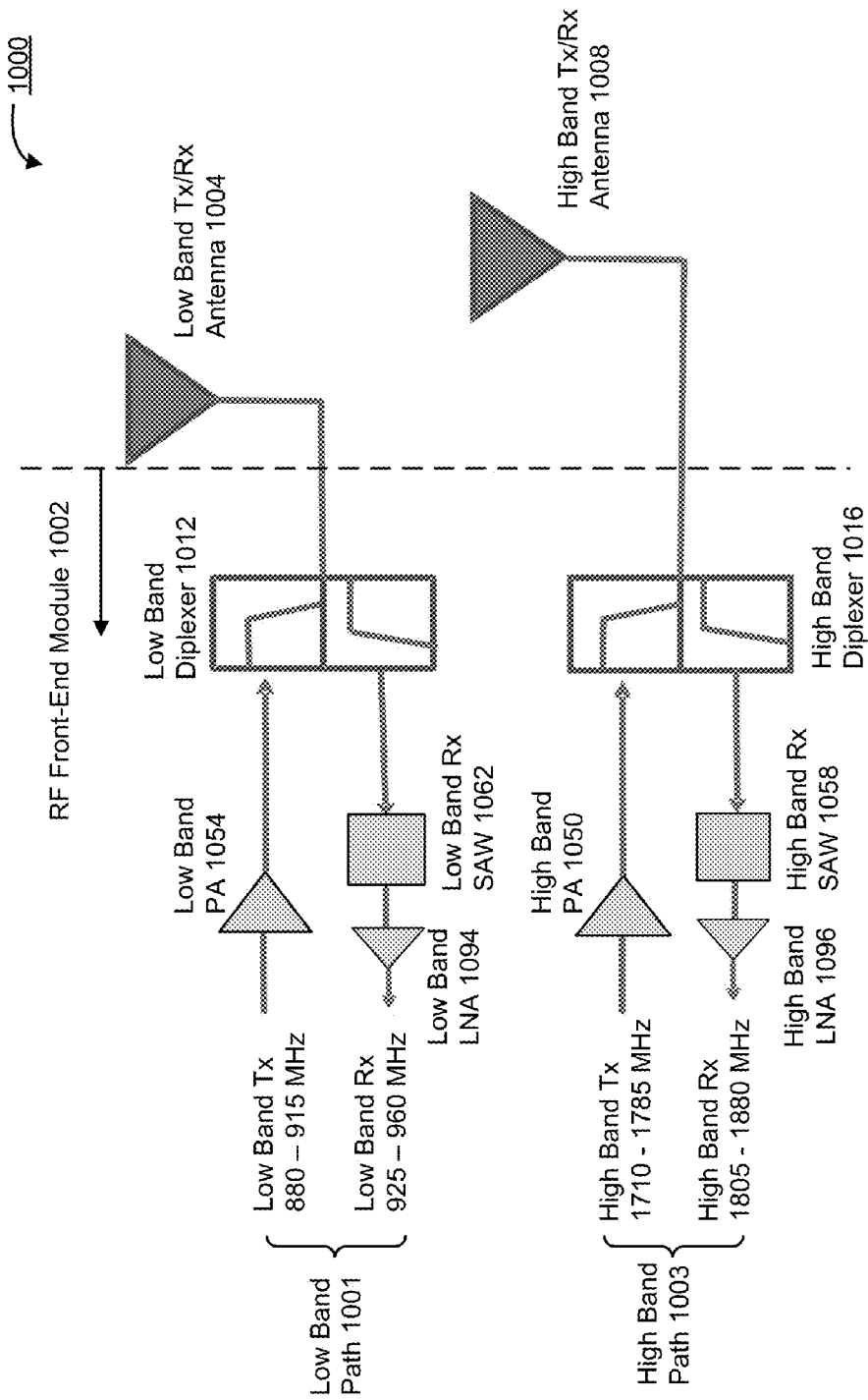

FIG. 10 illustrates another example of a two-antenna dual-band transceiver system 1000. This system 1000 may support a dual-band GSM900/DCS1800 communication system as an example. The system 1000 includes two Tx/Rx antennas 1004 and 1008 coupled to an RF front-end module 1002 that has two diplexers 1012 and 1016. The module 1002 includes a low band path 1001 and a high band path 1003, wherein the low band path 1001 includes the low band PA 1054 and the low band Rx SAW 1062 coupled to the low band diplexer 1012; and the high band path 1003 includes the high band PA 1050 and the high band Rx SAW 1058 coupled to the high band diplexer 1016. The low band LNA 1094 and high band LNA 1096 are coupled to the low band Rx SAW 1062 and high band Rx SAW 1058, respectively. The two Tx/Rx antennas 1004 and 1008 may be designed based on MTM structures in this example. The low band Tx/Rx antenna 1004 is tuned to support the Tx and Rx low bands (880-960 MHz); and the high band Tx/Rx antenna 1008 is tuned to support the Tx and Rx high bands (1710-1880 MHz). In the low band path 1001 the low band diplexer 1012 covers the Tx and Rx low bands; and in the high band path 1003 the high band diplexer 1016 covers the Tx and Rx high bands. These diplexers 1012 and 1016 are coupled to the low band Tx/Rx antenna 1004 and the high band Tx/Rx antenna 1008, respectively. Greater than 26 dB isolation between the high band and low band antennas 1004, 1008 may be obtained due to the wide separation between the two frequency bands in this example. Using a conventional diplexer technology it is typically difficult to achieve 26 dB isolation for a low band diplexer and 24 dB isolation for a high band diplexer due to their narrow band gaps, e.g., 10 and 20 MHz, respectively. Such isolation may be achieved, however, by use of the non-linear phase response of CRLH transmission lines, for example. MTM diplexers may be printed on a low loss PCB or ceramic multilayer substrate for a low cost solution with high isolation.

Figure 11:
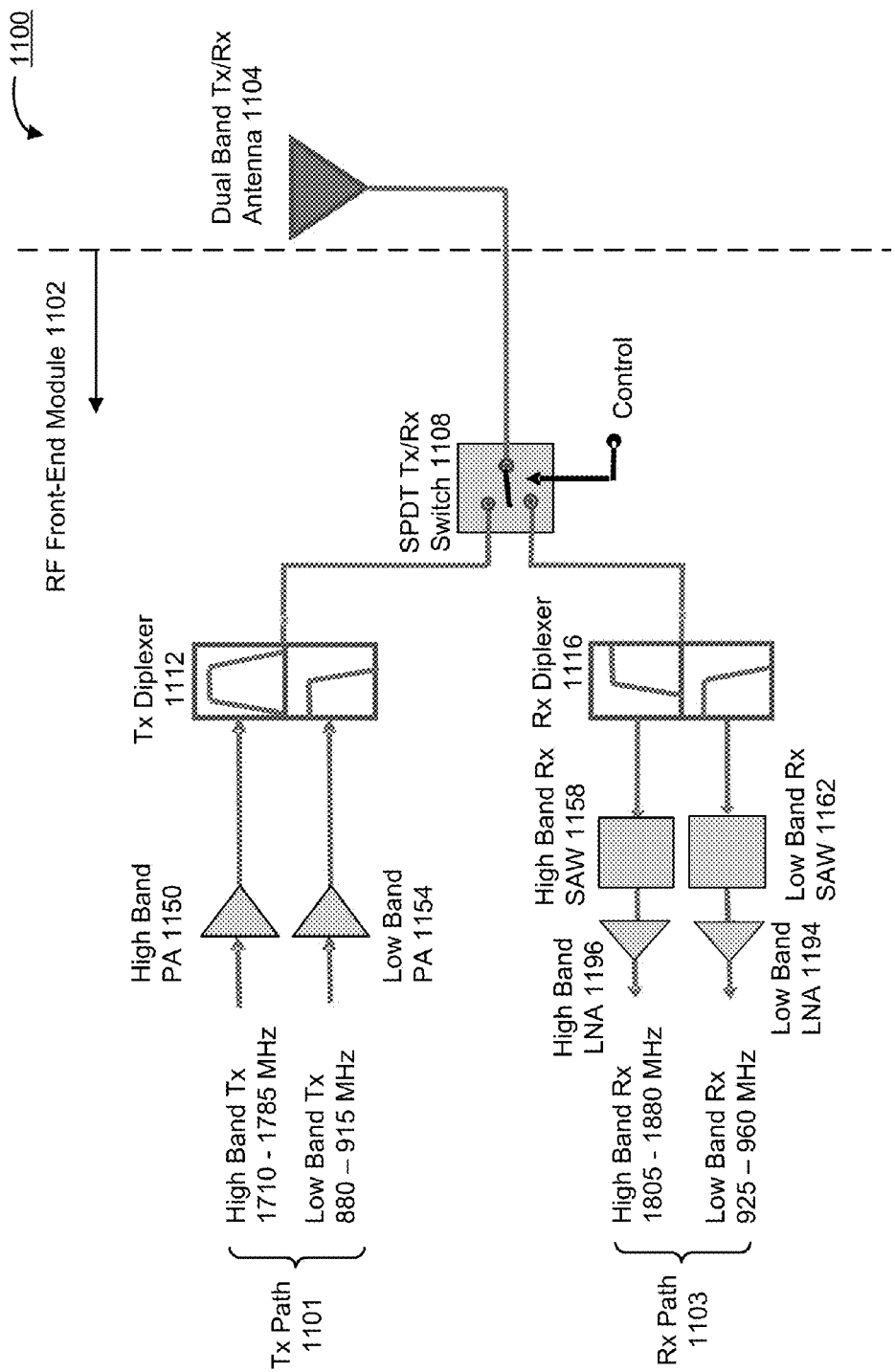

FIG. 11 illustrates an example of a one-antenna dual-band transceiver system 1100. This system 1100 may support a dual-band GSM900/DCS1800 communication system as an example. The system 1100 includes a single dual-band Tx/Rx antenna 1104 coupled to an RF front-end module 1102 that has two diplexers 1112 and 1116 and one SPDT Tx/Rx switch 1108. Similar to the two-antenna dual-band transceiver system 600 shown in FIG. 6A, the Tx diplexer 1112 (with an integrated Tx LPF) and the Rx diplexer 1116 are coupled to the Tx path 1101 and the Rx path 1103, respectively; and the module 1102 further includes the high band PA 1150 and the low band PA 1154 coupled to the Tx diplexer 1112, the high band Rx SAW 1158 and the low band Rx SAW 1162 coupled to the Rx diplexer 1116, and the low band LNA 1194 and high band LNA 1196 coupled to the low band Rx SAW 1162 and high band Rx SAW 1158, respectively. The single dual-band Tx/Rx antenna 1104 may be designed based on MTM structures and tuned to support the low band Tx (880-915 MHz), the high band Tx (1710-1785 MHz), the low band Rx (925-960 MHz) and the high band Rx (1805-1880 MHz). The SPDT Tx/Rx switch 1108 is used to switch the Tx path 1101 and Rx path 1103. Similar to the on/off control of the PIN diode 620 in FIG. 6A, the SPDT Tx/Rx switch 1108 may be controlled by control signals from an external control circuit. Alternatively, the Tx/Rx on/off control available from the baseband modem in a GSM mobile phone may be commonly used for controlling the SPDT Tx/Rx switch 1108. Compared to the conventional dual-band transceiver system shown in FIG. 1, two SPDT switches, one diplexer, and two harmonic rejection filters are replaced with one SPDT switch and two diplexers in the present example, which provides cost advantages. At least one of the two diplexers may be an MTM diplexer having a CRLH structure to further improve the performance.

Figure 12:
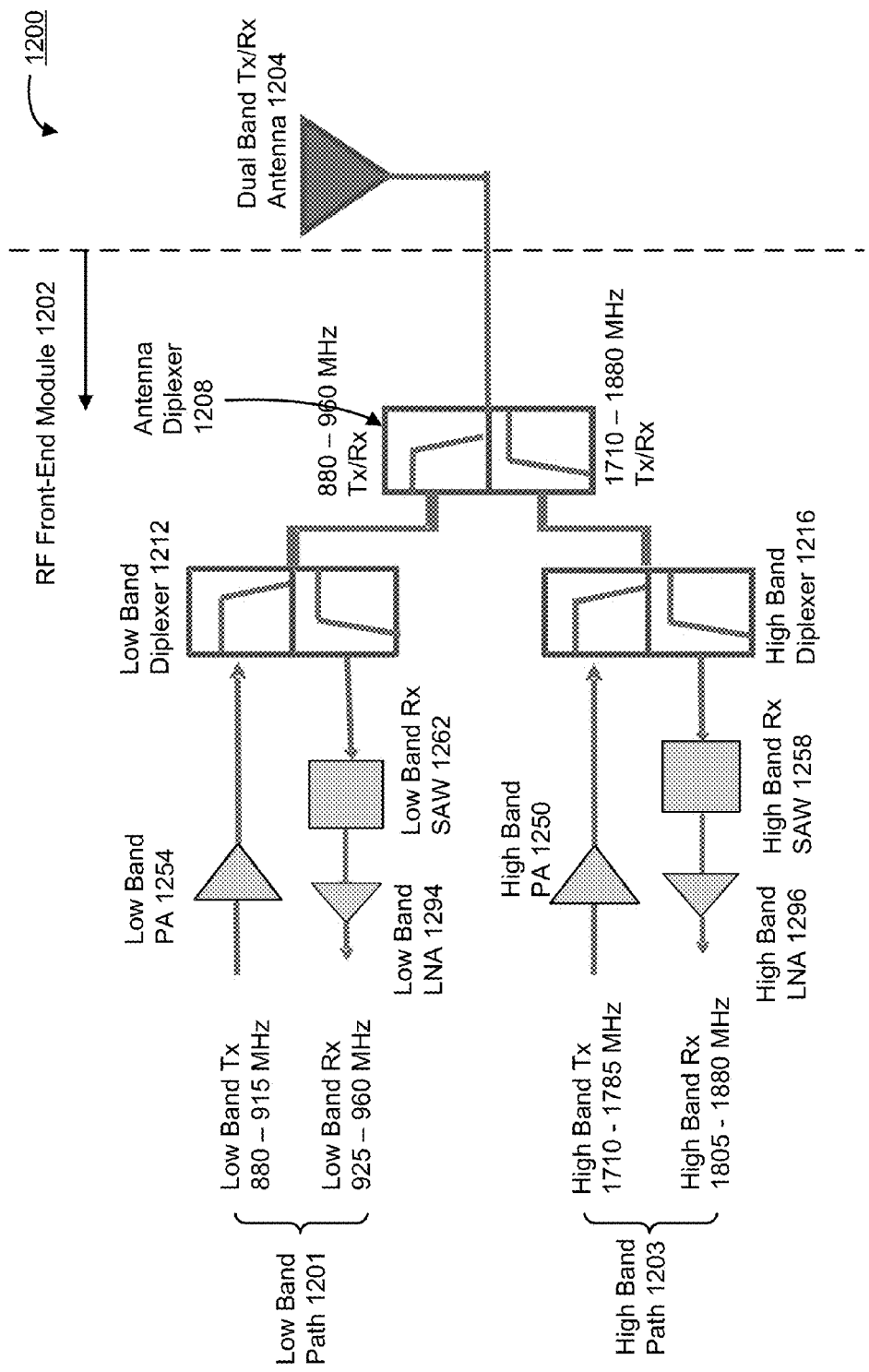

FIG. 12 illustrates another example of a one-antenna dual-band transceiver system 1200. This system 1200 may support a dual-band GSM900/DCS1800 communication system as an example. The system 1200 includes a single dual-band Tx/Rx antenna 1204 coupled to an RF front-end module 1202 that has three diplexers: an antenna diplexer 1208, a low band diplexer 1212 and a high band diplexer 1216. Similar to the architecture of system 1000 in FIG. 10, the module 1202 includes the low and high band diplexers 1212 and 1216, the low band PA 1254 and the low band Rx SAW 1262 coupled to the low band diplexer 1212, the high band PA 1250 and the high band Rx SAW 1258 coupled to the high band diplexer 1216, and the low band LNA 1294 and high band LNA 1296 coupled to the low band Rx SAW 1262 and high band Rx SAW 1258, respectively. The single dual-band Tx/Rx antenna 1204 may be designed based on MTM structures and tuned to support the low band Tx (880-915 MHz), the high band Tx (1710-1785 MHz), the low band Rx (925-960 MHz) and the high band Rx (1805-1880 MHz). This system 1200 of FIG. 12 has a similar configuration as the two-antenna dual-band transceiver system of FIG. 10, except that the single dual-band Tx/Rx antenna 1204 is used, and the antenna diplexer 1208 is additionally used to isolate the antenna ports in the high band and the low band. That is, the two antennas (i.e., the low band Tx/Rx antenna 1004 and the high band Tx/Rx antenna 1008 in FIG. 10) are replaced with one antenna (i.e., the single dual band Tx/Rx antenna 1204) and one antenna diplexer 1208. The antenna diplexer 1208 separates the high band and the low band and is coupled to the dual-band Tx/Rx antenna 1204. The low band diplexer 1212 is coupled to the antenna diplexer 1208 in the low band. Isolation of 26 dB between the Tx and Rx paths in the low band may be achieved in this example. The high band diplexer 1212 is coupled to the antenna diplexer 1208 in the high band and may have isolation of 24 dB between the Tx and Rx paths in the high band in this example. At least one of the three diplexers may be an MTM diplexer having a CRLH structure to further improve the performance.

Dual-band systems with one to four antennas are described in the above transceiver systems. Generally, communication systems can be designed to support single frequency band or multiple frequency bands. In each frequency band, a portion of the bandwidth may be used in the Tx mode and the other portion may be used in the Rx mode, separating the band into the Tx band and Rx band, respectively. One antenna may be used to support both Tx and Rx modes in each frequency band. Alternatively, separate Tx and Rx antennas may be used to support Tx and Rx modes, respectively, in one frequency band. The same system configuration can be replicated to cover multiple bands with multiple pairs of Tx and Rx antennas, each pair supporting Tx and Rx modes in each band. The system shown in FIG. 5A represents an example of a dual-band system with two pairs of Tx and Rx antennas supporting the two bands. The same configuration is replicated for the low and high bands in this example shown in FIG. 5A. Thus, the system configuration corresponding to one of the frequency bands (either high band or low band) in FIG. 5A represents a first architecture of a two-antennas-per-band transceiver system having an RF front-end module coupled to separate Tx and Rx antennas supporting the single frequency band.

In the Tx mode, the amplified power output from the PA to the antenna is much larger than the power received by the antenna in the Rx mode. As explained earlier, in order to protect the Rx circuitry, the power coupled to the Rx circuitry during the Tx operation needs to be minimized. Since the frequencies used in the Tx mode and Rx mode are close, a Tx/Rx switch is conventionally used to separate the transmit and receive circuitries while sharing the same antenna, as seen from the examples shown in FIGS. 1 and 2. In contrast, the four-antenna dual-band system shown in FIG. 5A is an example of having a Tx antenna and a Rx antenna separately for each frequency band (low band or high band) by including passive components (LPFs, HPFs, and couplers) instead of using the Tx/Rx switch to achieve adequate isolation. The same two-antennas-per-band transceiver system but with different isolation circuitry can be devised to achieve low cost, high performance communication system. Examples and implementations of such a two-antennas-per-band transceiver system having an RF front-end module coupled to separate Tx and Rx antennas supporting a single frequency band are described below. The same system configuration may be replicated to cover multiple bands with multiple pairs of Tx and Rx antennas, each pair supporting Tx and Rx modes in each band, resulting in a multi-antenna multi-band transceiver system.

Figure 13:
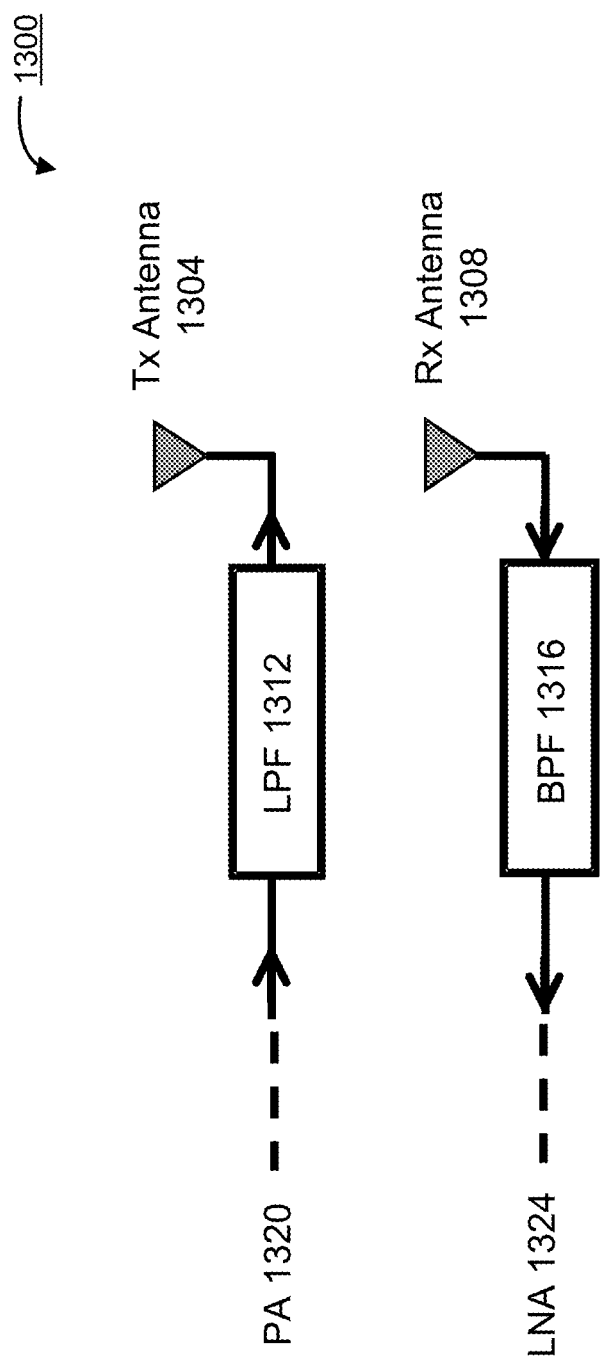
FIG. 13 illustrates, in block diagram form, the use of separate transmit and receive antennas for a single frequency band, according to an example embodiment.

FIG. 13 is a block diagram schematically illustrating a system 1300 having separate Tx and Rx antennas 1304 and 1308, which support a Tx band and an Rx band, respectively, in a single frequency band. In this example, the Tx antenna 1304 is coupled to an LPF 1312 that is coupled to a PA 1320, while the Rx antenna 1308 is coupled to a BPF 1316 that is coupled to an LNA 1324. Therefore, the Tx and Rx paths and circuitries, including the respective antennas 1304, 1308, are physically separated. As a SAW filter is one type of a BPF, in place of the Rx SAW filter 558 or 562 as shown in the example of FIG. 5A, a BPF may be used for filtering over a wider or different range of applications. The LPF 1312 may be used mainly to suppress the $2^{nd}$ and $3^{rd}$ harmonics generated by the PA 1320 as the LPF 536 or 540 in FIG. 5A does.

Figure 14:
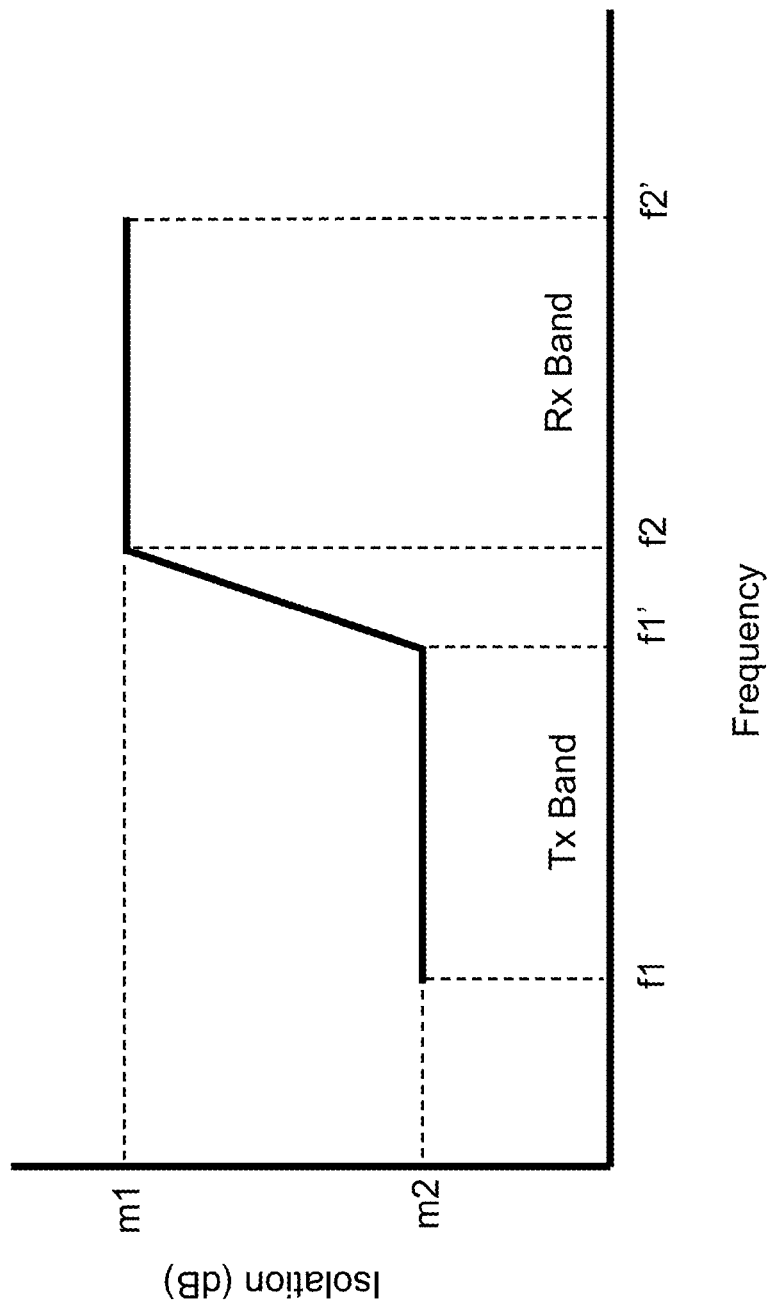
FIG. 14 illustrates a schematic plot of the isolation level generally considered for transmit and receive bands in an RF communication system.

FIG. 14 is a schematic plot of the isolation level generally considered for the Tx and Rx bands. The isolation level is represented by isolation in dB, which is desired to be higher in the Tx band than in the Rx band. As explained earlier, this is due to the transmit power being much larger than the receive power. Therefore, high isolation for the Tx band, as shown in FIG. 14, is desired to protect the receive circuitry, giving rise to the need for incorporating an isolation scheme in the system. In addition to maintaining a desired isolation level, another design goal is to optimize antenna efficiencies in both Tx and Rx antennas. One advantage of using separate Tx and Rx antennas is that each antenna design may be optimized separately based on its frequency band, the space available, the characteristics of the circuitry to which an antenna is connected, as well as various other factors.

Figure 15:
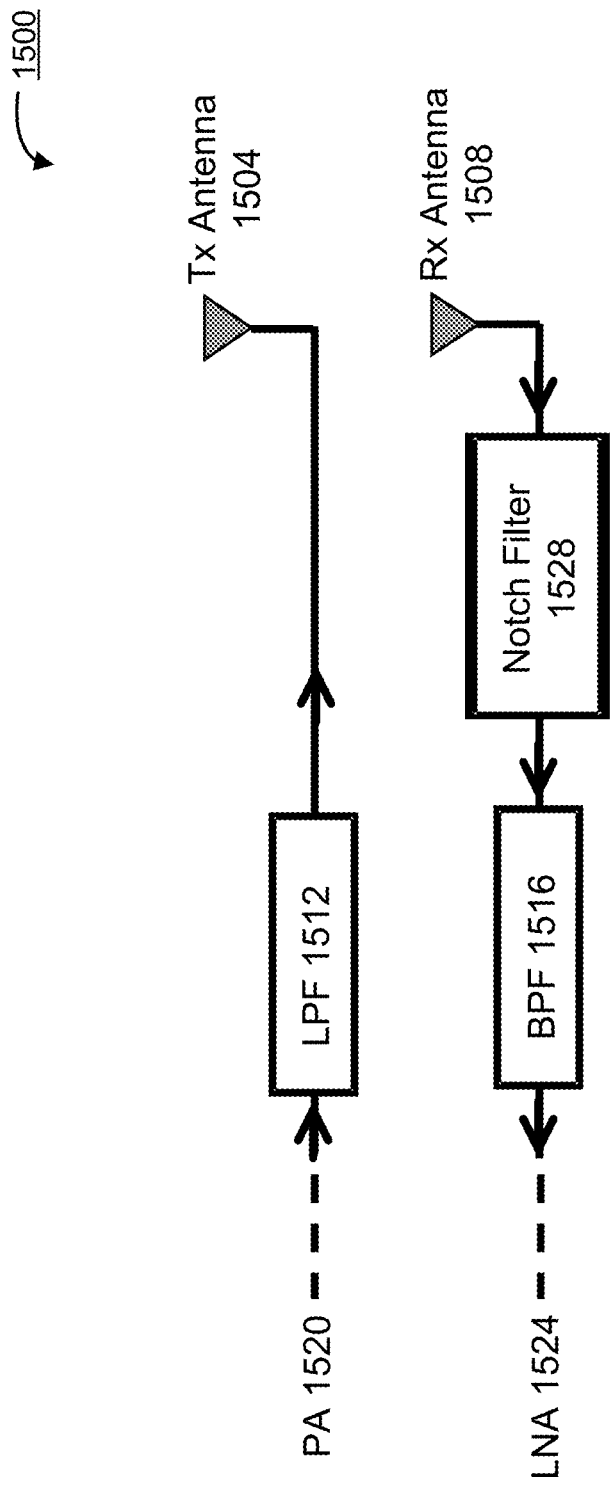
FIG. 15 illustrates, in block diagram form, a system having separate transmit and receive antennas for a single band, according to an example embodiment.

FIG. 15 illustrates a block diagram of a second architecture of a two-antennas-per-band transceiver system 1500 having an RF front-end module coupled to separate Tx and Rx antennas 1504, 1508 supporting a single frequency band. In the present example, the Tx band may range from 880 MHz to 915 MHz while the Rx band may range from 925 MHz to 960 MHz to cover the GSM band. There is a bandgap between the Tx and Rx bands of approximately 10 MHz. The system 1500 includes a notch filter 1528 between the Rx antenna 1508 and the BPF 1516 to achieve the desired isolation as specified by the isolation considerations illustrated in FIG. 14. The LPF 1512 may be used mainly to suppress the $2^{nd}$ and $3^{rd}$ harmonics generated by the PA 1520. The system 1500 architecture is similar to the first architecture of the two-antennas-per-band transceiver system 500 of FIG. 5A, except that the notch filter 1528 replaces the combination of the HPF 528 and the coupler 520 for the low band or the combination of the HPF 532 and the coupler 524 for the high band to achieve the desired isolation.

When the Tx and Rx bands are wide, the coupling between the Tx and Rx signal paths may increase, leading to performance degradation. A phase shifter may be included between the BPF 1516 and the notch filter 1528 to enhance the notch filter rejection level, thereby providing adequate isolation for wide band applications.

Figure 16A:
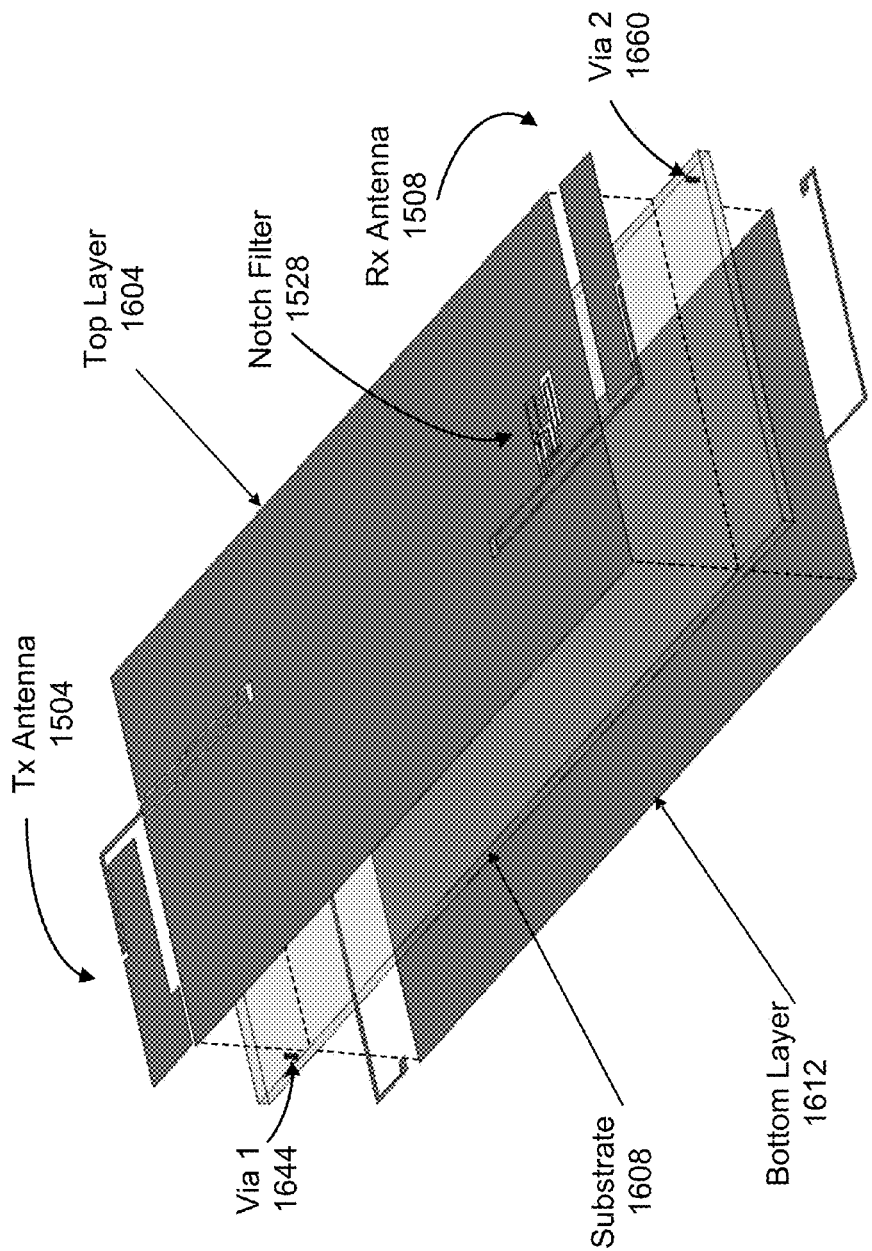
FIGS. 16A-16C illustrate an implementation example of the system of FIG. 15, illustrating a 3D view, a top view of the top layer and a top view of the bottom layer, respectively.
Figures 16B, 16C:
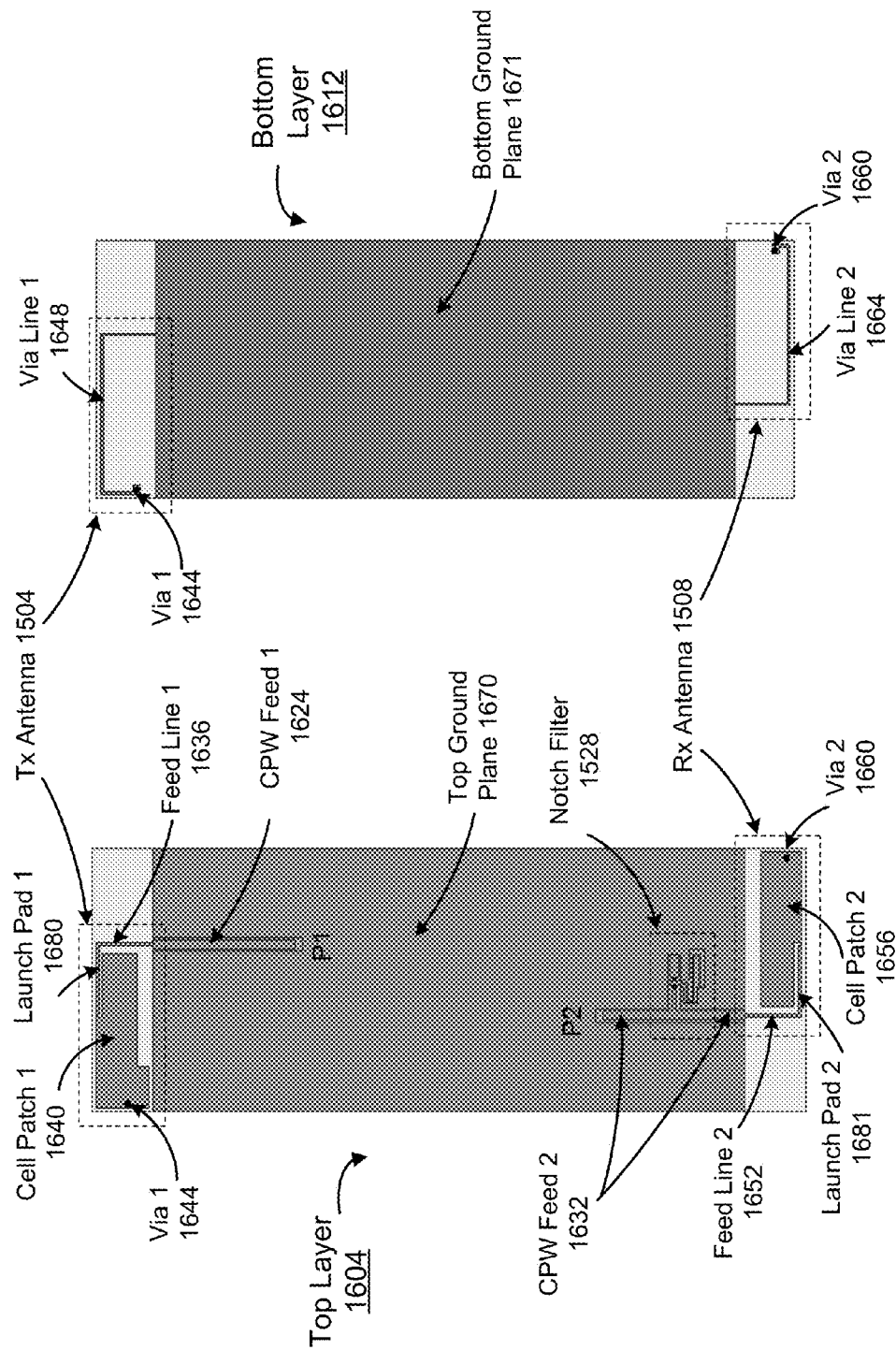

FIGS. 16A-16C illustrates an implementation example of the second architecture of the two-antennas-per-band transceiver system 1500 of FIG. 15. FIG. 16A illustrates a 3D view of a structure implementing the notch filter 1528, the Tx antenna 1504 and the Rx antenna 1508. FIG. 16B illustrates a top view of the top layer of the structure; and FIG. 16C illustrates a top view of the bottom layer of the structure. The LPF 1512 and the BPF 1516 may be externally coupled to the structure shown in FIGS. 16A-16C. This structure may be printed on a FR-4 substrate. For the sake of clarity, the top layer 1604, the substrate 1608 and the bottom layer 1612 are shown separately in the 3D view in FIG. 16A with dotted lines connecting the corresponding points and lines when they are attached to one another. In this structure, the Tx antenna 1504 is formed at one end of the substrate 1608, the Rx antenna 1508 is formed at the other end of the substrate 1608, and the notch filter 1528 is formed in the top layer 1604.

The input of the Tx antenna 1504 is coupled to the port P1 through the Coplanar Waveguide (CPW) feed 1 1624. The port P1 may be coupled to the LPF 1512 located externally to the structure shown in FIGS. 16A-16B. The notch filter 1528 is formed in the top layer 1604 and coupled to the CPW feed 2 1632 between the Rx antenna 1620 and the port P2. The port P2 may be coupled to the BPF 1516 located externally to the structure shown in FIGS. 16A-16C. Both the LPF 1512 and BPF 1516 may be off-the-shelf, commercial components. The LPF 1512 is used to suppress the harmonics generated by the PA 1520. The BPF 1516 can be a SAW filter.

The conductive parts for each antenna include a feed line, a launch pad, a cell patch, a via, and a via line. These include the feed line 1 1636, the cell patch 1 1640, the via 1 1644, and the via line 1 1648 for the Tx antenna 1616, and include the feed line 2 1652, the cell patch 2 1656, the via 2 1660, and the via line 2 1664 for the Rx antenna 1620. As much of the following explanation of antenna structure applies to both the Tx antenna 1504 and the Rx antenna 1508, the explanation combines the individual reference numerals where appropriate. One end of the feed line 1636/1652 is coupled to a CPW feed 1624/1632. The CPW feed 1624/1632 is formed in a top ground plane 1670 in the top layer 1604 that is paired with a bottom ground plane 1671, which is formed in the bottom layer 1612, below the top ground plane 1670. Alternatively, the antenna 1616/1620 may be fed with a CPW feed that does not require a ground plane on a different layer, a probed patch or a cable connector. The other end of the feed line 1636/1652 is modified to form a launch pad, the launch pad 1 1680 for the Tx antenna 1616 and the launch pad 2 1681 for the Rx antenna 1620 and directs a signal to or receives a signal from the cell patch 1640/1656 through a coupling gap.

As discussed hereinabove, the via 1644/1660 provides a conductive path or connection between the top layer 1604 and the bottom layer 1612. The via 1644/1660 is formed in the substrate 1608 to connect the cell patch 1640/1656 in the top layer 1604 to the via line 1648/1664 in the bottom layer 1612. The via line 1648/1664 is formed in the bottom layer 1612 to couple the via 1644/1660, hence and the cell patch 1640/1656, to the bottom ground plane 1671. These conductive parts and part of the substrate together form an MTM antenna structure with the CRLH properties. The shapes and dimensions of these conductive parts may be configured to provide the distributed $L_R$, $C_R$, $L_L$ and $C_L$ of the CRLH unit cell to generate frequency resonances with adequate matching to cover the Tx band ranging from 880 MHz to 915 MHz and the Rx band ranging from 925 MHz to 960 MHz, in this example. Details on the implementations and analyses of such double-layer MTM antenna structures are described in the U.S. patent application Ser. No. 12/270,410 entitled "Metamaterial Structures with Multilayer Metallization and Via," filed on Nov. 13, 2008. Alternatively, the MTM antennas may be based on single-layer or double-layer via-less structures. Details on the implementations and analyses of such MTM antenna structures are described in the U.S. patent application Ser. No. 12/250,477 entitled "Single-Layer Metallization and Via-Less Metamaterial Structures," filed on Oct. 13, 2008. In addition, non-planar (three-dimensional) MTM antenna structures may be realized based on a multi-substrate structure. The examples and implementations of such multi-substrate-based MTM structures are described in the U.S. patent application Ser. No. 12/465,571 entitled "Non-Planar Metamaterial Antenna Structures," filed on May 13, 2009. Furthermore, double or multiple-port MTM antennas may also be utilized. Details are described in the U.S. Provisional Patent Application Ser. No. 61/259,589 entitled "Multi-Port Frequency Band Coupled Antennas," filed on Nov. 9, 2009.

Figure 17:
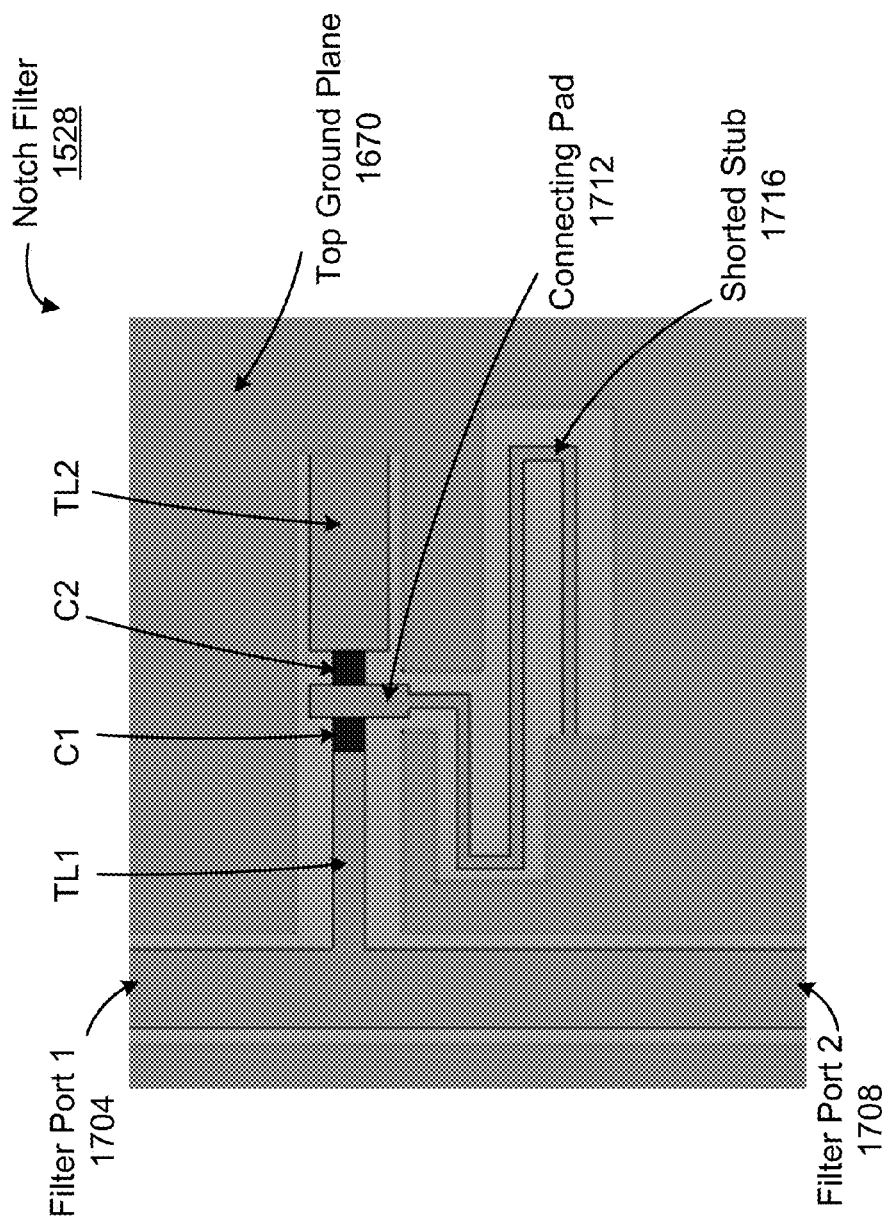
FIG. 17 illustrates a notch filter used in the implementation example of FIGS. 16A-16C.

FIG. 17 illustrates details of the structure of the notch filter 1528 used in the above implementation illustrated in FIGS. 16A-16C. The notch filter 1528 is a two-port device with a filter port 1 1704 and a filter port 2 1708 coupled to the CPW feed 2 1632. This notch filter 1628 is formed in the top layer 1604 having the top ground plane 1670, and includes two series capacitors C1 and C2 coupled by a connecting pad 1712, which is coupled to a shorted stub 1716. One transmission line TL 1 couples the CPW feed 2 1652 to C1, and another transmission line TL2 couples C2 to the top ground plane 1670 in this example. That is, the distal end of the TL2 is shorted to the ground. Alternatively, the distal end of the TL2 may be left open. Each of the capacitors C1 and C2 provides an LH series capacitance $C_L$. TL1 and TL2 provide RH properties represented by an RH series inductance $L_R$ and an RH shunt capacitance $C_R$, as illustrated in FIG. 3F. The shorted stub 1716 provides an LH shunt inductance $L_L$. Thus, the notch filter 1628 embodies the CRLH properties that enhance filtering performance at selected frequencies. Details on the implementations and analyses of such frequency selector devices are described in the U.S. Provisional Patent Application Ser. No. 61/153,398 entitled "A Metamaterial Power Amplifier System and Method for Generating Highly Efficient and Linear Multi-Band Power Amplifiers," filed on Feb. 18, 2009.

Figure 18:
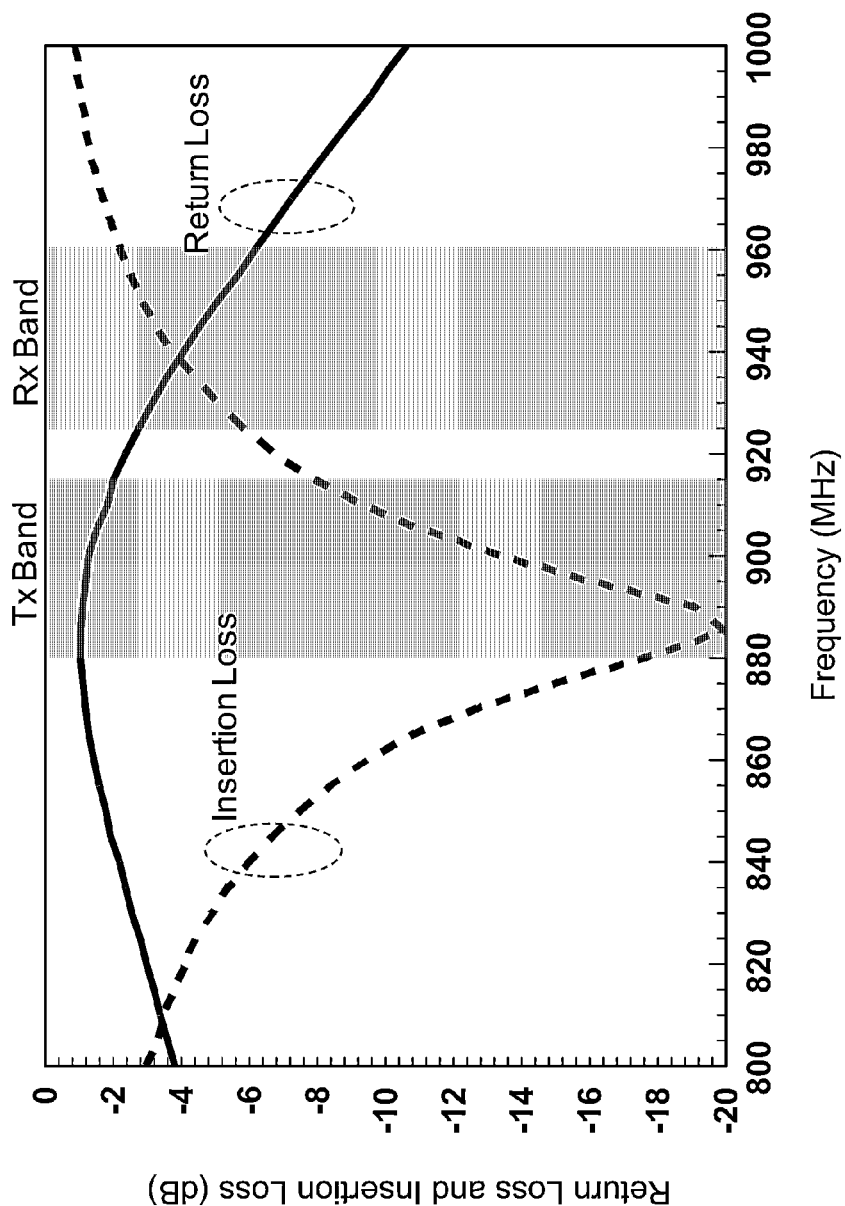
FIG. 18 plots return loss and insertion loss of a notch filter of FIG. 17.

FIG. 18 plots the return loss and insertion loss of the notch filter 1528 shown in FIG. 17. The shapes and dimensions of the conductive parts as well as the lumped element values can be configured to have the dip in insertion loss in the Tx band, as demonstrated in FIG. 18. Thus, this notch filter 1528 may effectively block the transmission in the Tx band and pass the signal in the Rx band.

Figure 19:
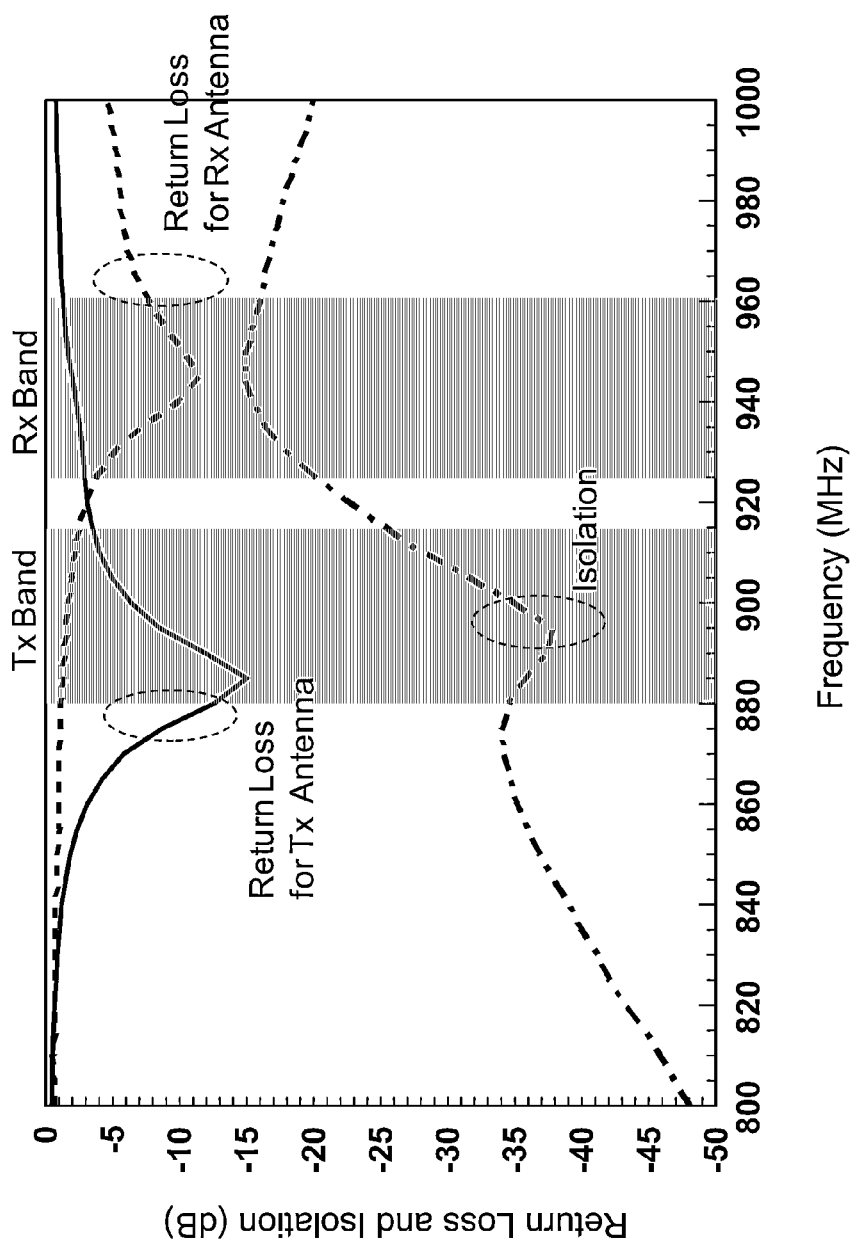
FIG. 19 plots return loss and isolation of the implementation example illustrated in FIGS. 16A-16C and 17.

FIG. 19 plots the return loss and isolation of the implementation example shown in FIGS. 16A-16C and 17. The return loss for the Tx antenna and the return loss for the Rx antenna are plotted separately. The isolation indicates the separation in dB of the two antennas. As illustrated, the Tx frequency band is identified between 880 MHz and 915 MHz, while the Rx frequency band is identified between 925 MHz and 960 MHz, in the present example. Alternate examples may have alternate frequency band assignments. The Tx frequency band and the Rx frequency band are indicated by shading. The plot indicates that the isolation level in the Tx band is much higher than the isolation level in the Rx band. Thus, the Rx circuitry during the Tx operation may be effectively protected owing to the isolation realized by the notch filter 1528.

The above implementation of the second architecture by use of the notch filter 1528 allows for a desired level of isolation, given that the notch filter 1528 provides large signal suppression in the Tx band. However, due to a small bandgap between the Tx and Rx bands, such large signal suppression in the Tx band may increase the insertion loss in the Rx band under certain conditions, thereby reducing the radiation power of the Rx antenna.

Figure 20:
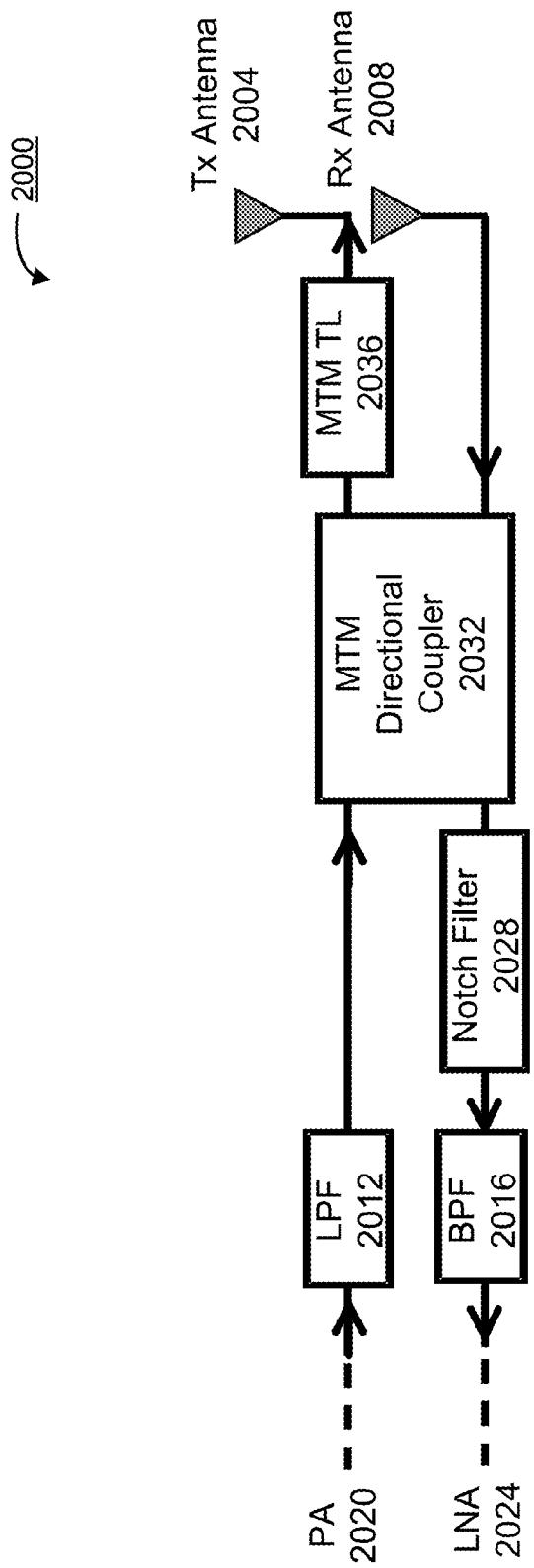
FIG. 20 illustrates, in block diagram form, a system having separate transmit and receive antennas for a single band, according to an example embodiment.

FIG. 20 illustrates a block diagram of a third architecture of a two-antennas-per-band transceiver system 2000 having an RF front-end module coupled to separate Tx antenna 2004 and Rx antenna 2008 supporting a single frequency band. The Tx frequency band may range from 880 MHz to 915 MHz while the Rx band may range from 925 MHz to 960 MHz to cover the GSM band, for example. The insertion loss may be reduced in the third architecture in FIG. 20 as compared to the second architecture in FIG. 15 by utilizing additional components. In the present example, the ranges of the Tx and Rx bands and the bandgap between these bands are consistent with the previous example of FIG. 15. The isolation consideration of FIG. 14 may be achieved by using an MTM directional coupler 2032, an MTM transmission line 2036 and a notch filter 2028. The MTM directional coupler 2032 may be configured to provide substantial isolation for a portion of the Tx band, and the notch filter 2028 may be configured to provide substantial isolation in the remaining portion of the Tx band. This third architecture may achieve a similar isolation level as the second architecture while reducing the insertion loss between the BPF 2016 and the Rx antenna 2008.

When the Tx and Rx bands are wide, the Tx and Rx bands approach each other and the bandgap between the bands decreases. Thus, the coupling between the Tx and Rx signal paths may increase, leading to performance degradation. A phase shifter may be included between the BPF 2016 and the notch filter 2028 to enhance the notch filter rejection level, thereby providing adequate isolation for wide band applications.

Figure 21A:
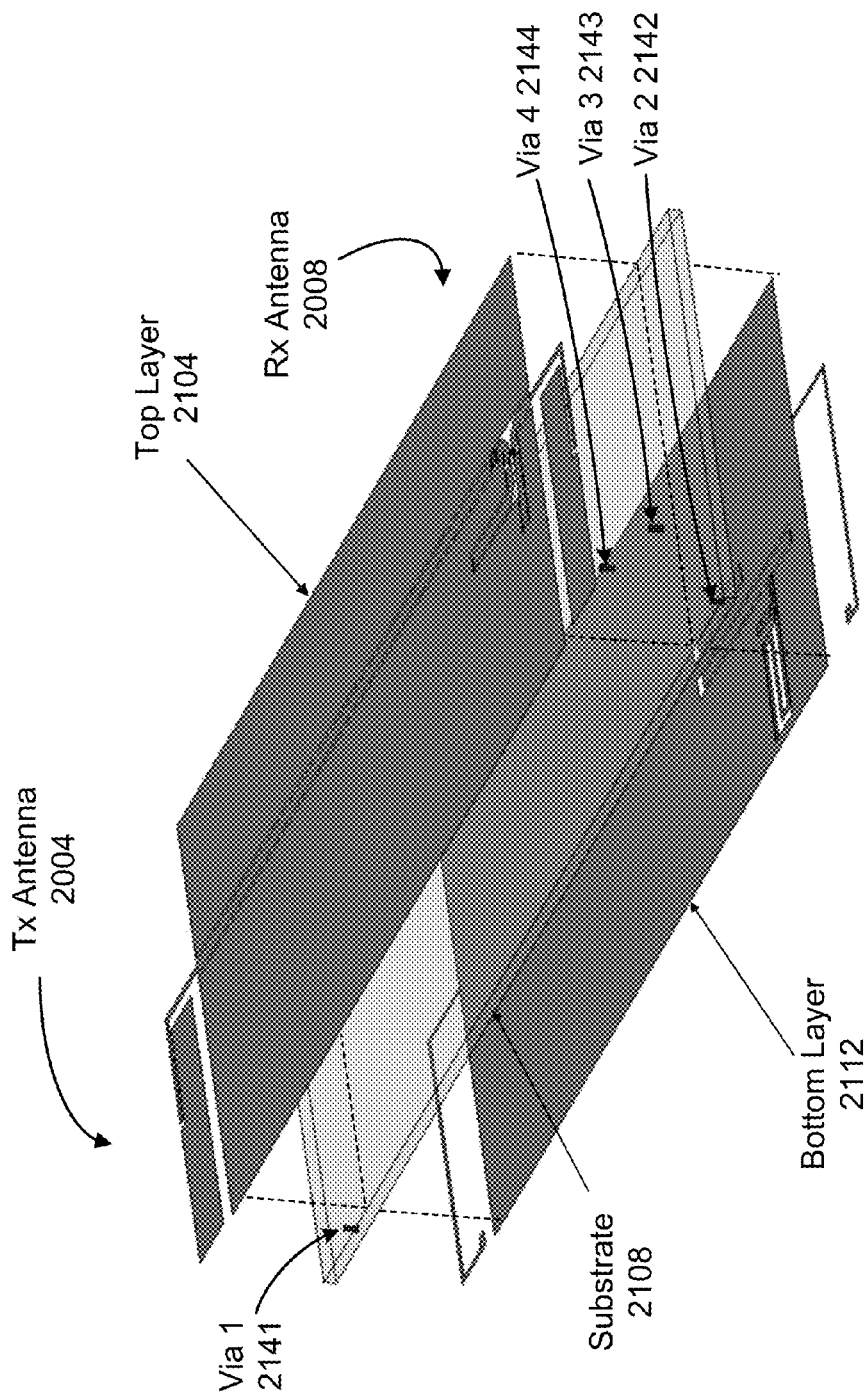

FIGS. 21A-21C illustrates an implementation example of the third architecture of the two-antennas-per-band transceiver system 2000 of FIG. 20, illustrating the 3D view, top view of the top layer and top view of the bottom layer, respectively. The structure shown in FIGS. 21A-21C implements the Tx antenna 2004, the Rx antenna 2008, the notch filter 2028, the MTM TL 2036, and the MTM directional coupler 2032. The LPF 2012 and the BPF 2016 may be externally coupled to the structure shown in FIGS. 21A-21C. This structure may be printed on a FR-4 substrate. For the sake of clarity, the top layer 2104, the substrate 2108 and the bottom layer 2112 are shown separately in the 3D view in FIG. 21A with dotted lines connecting the corresponding points and lines when they are attached to one another. In this structure, the Tx antenna 2004 is formed at one end of the substrate 2108, and the Rx antenna 2008 is formed at the other end of the substrate 2108. As illustrated, vias 2141, 2142, 2143, 2144 provide conductive connections between layers.

The CPW feeds 1 2136, 2 2137, and 3 2138 are formed in the top ground plane 2191; and the CPW feeds 4 2139 and 5 2140 are formed in the bottom ground plane 2192. The MTM TL 2036 and the MTM directional coupler 2032 are formed in the top layer 2104, whereas the notch filter 2028 is formed in the bottom layer 2112. The MTM directional coupler 2032 is a four-port device having two input ports and two output ports. The input of the Tx antenna 2004 is coupled to one end of the MTM TL 2036 through the CPW feed 1 2136. The other end of the MTM TL 2036 is coupled to one of the input ports of the MTM directional coupler 2032. The input of the Rx antenna 2008 is coupled directly to the other input port of the MTM directional coupler 2032. One of the output ports of the MTM directional coupler 2032 is coupled to the via 3 2143 through the CPW feed 3 2138, and the other output port is coupled to the via 4 2144 through the CPW feed 2 2137. The via 3 2143 and the via 4 2144 are formed in the substrate 2108, and the CPW feed 4 2139 and the CPW feed 5 2140 are formed in the bottom layer 2112. The CPW feeds 3 2138 and 4 2139 are connected by the via 3 2143, and the CPW feeds 2 2137 and 5 2140 are connected by the via 4 2144. The notch filter 2132 is a two-port device with filter ports 1 and 2 coupled to the CPW feed 4 2139 in the bottom layer 2112, thus being coupled to the output of the MTM directional coupler 2032 in the Rx path. The ports P1 and P2 are formed in the bottom layer 2112 in this example. The port P1 may be coupled to the LPF 2012, and the port P2 may be coupled to the BPF 2016. Both the LPF 2012 and BPF 2016 may be off-the-shelf, commercial components. The LPF 2012 is used to suppress the harmonics generated by the PA. The BPF 2016 may be a SAW filter.

The conductive parts for each antenna include a feed line, a launch pad, a cell patch, a via, and a via line, as denoted as the feed line 1 2150, the cell patch 1 2154, the via 1 2141, and the via line 1 2158 for the Tx antenna 2116; and the feed line 2 2160, the cell patch 2 2164, the via 2 2142, and the via line 2 2168 for the Rx antenna 2120. These conductive parts and part of the substrate 2108 together form an MTM antenna structure with the CRLH properties. In each antenna, the distal end of each feed line is modified to form a launch pad (the launch pad 1 2180 for the Tx antenna 2004 and the launch pad 2 2181 for the Rx antenna 2008), and directs a signal to or receives a signal from the cell patch through a coupling gap. Minor modifications are made to the shapes and dimensions of these conductive parts in each antenna as compared to the implementation example of the second architecture of the system 1600 of FIGS. 16A-16C to obtain desired or specified matching over the Tx and Rx bands.

Figure 22:
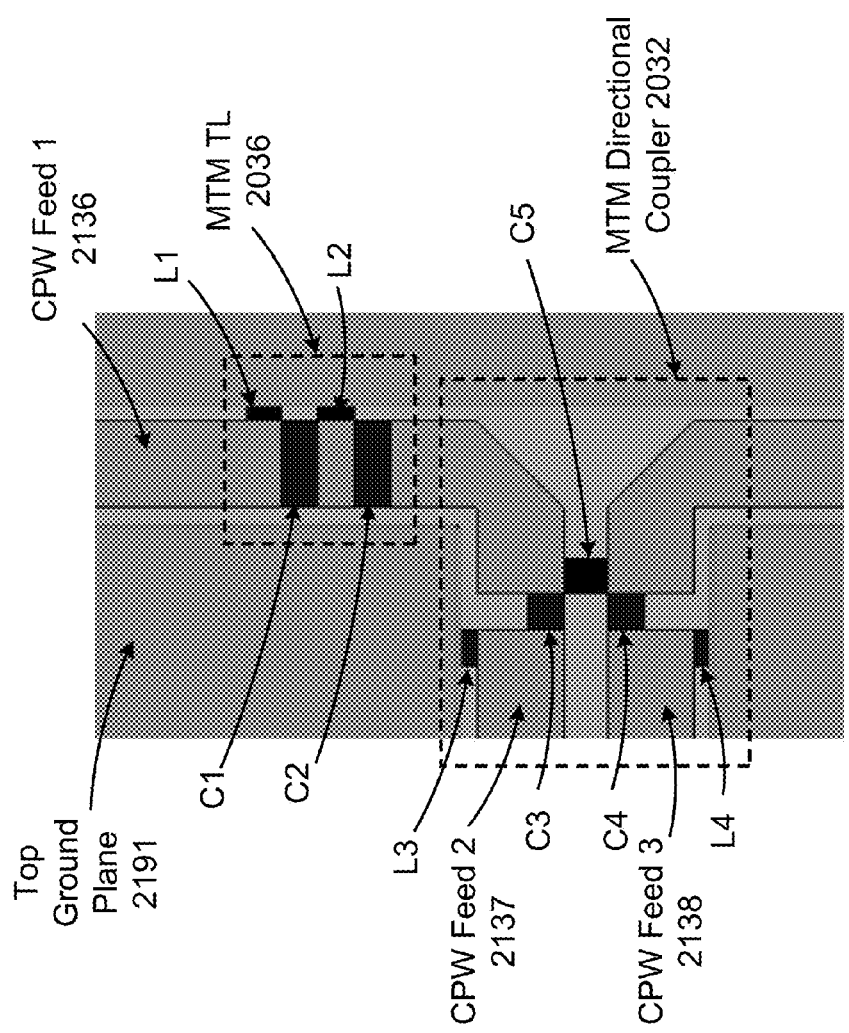
FIG. 22 illustrates an MTM transmission line and an MTM directional coupler in the implementation example of FIGS. 21A-21C.

FIG. 22 illustrates details of the MTM TL 2036 and MTM directional coupler 2032 in the implementation example of the third architecture illustrated in FIGS. 21A-21C. The MTM TL 2036 has two capacitors C1 and C2 and two inductors L1 and L2. Each of the C1 and C2 may be configured to have an LH series capacitance $C_L$, and each of the L1 and L2 may be configured to have an LH shunt inductance $L_L$. By taking into consideration that the CPW feed 1 2136 provides the RH property with an equivalent circuit model comprising an RH shunt capacitance $C_R$ and a RH series inductance $L_R$, as shown in FIG. 3F, the present MTM TL 2124 may be viewed as having two CRLH unit cells. The MTM directional coupler 2032 includes three capacitors C3, C4 and C5, and two inductors L3 and L4. Each of the C3 and C4 may be configured to have an LH series capacitance $C_L$ with a mutual capacitance Cm between the two paths. Each of the L3 and L4 may be configured to have an LH shunt inductance $L_L$. Thus this MTM directional coupler 2032 may be viewed as having a coupled CRLH unit cell. Details on the implementations and analyses of MTM directional couplers are described in the U.S. patent application Ser. No. 12/340,657 entitled "Multi-Metamaterial-Antenna Systems with Directional Couplers," filed on Dec. 20, 2008.

Figure 23:
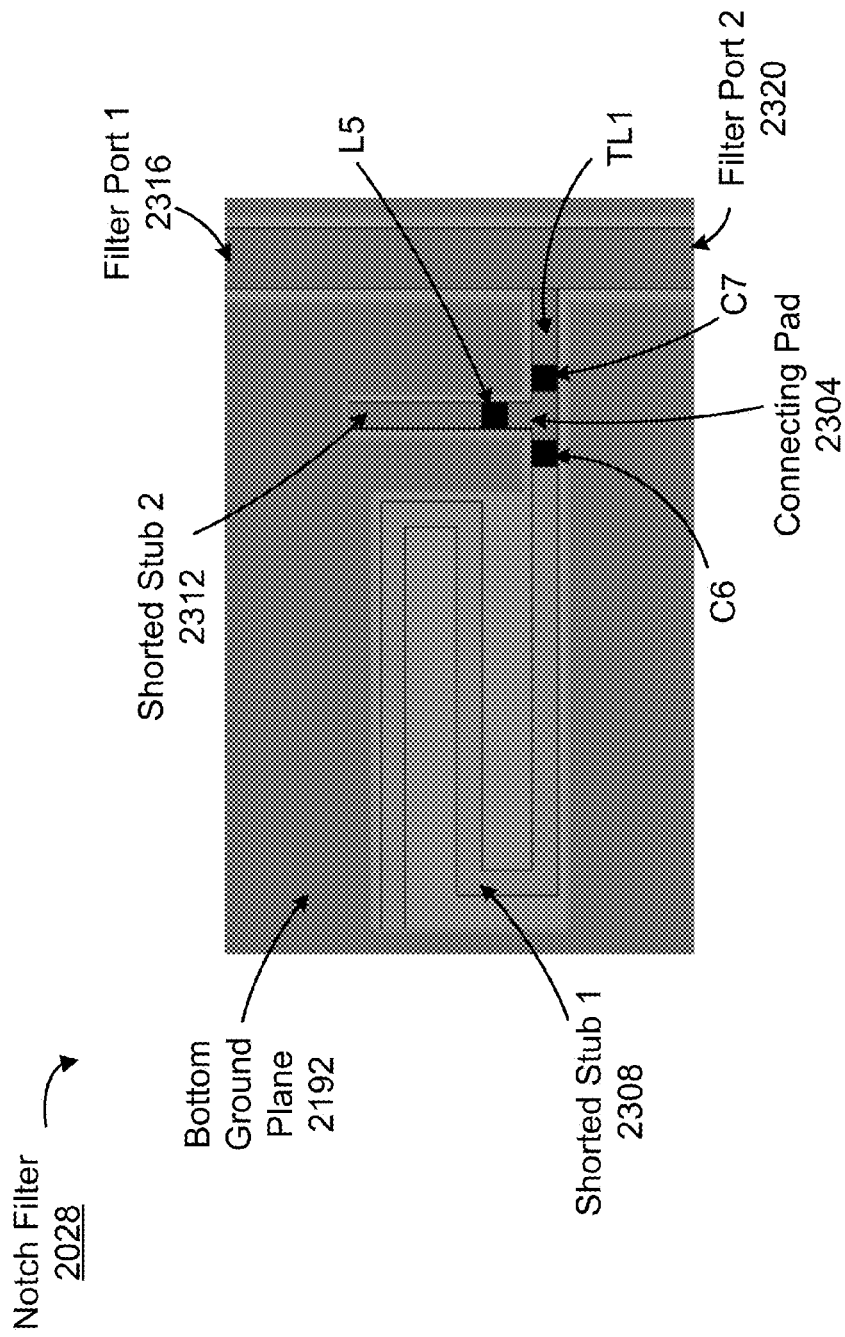
FIG. 23 illustrates a notch filter used in the implementation example of FIGS. 21A-21C.

FIG. 23 illustrates details of the notch filter structure 2028 used in the implementation example of the third architecture illustrated in FIGS. 21A-21C. The notch filter 2028 is formed in the bottom layer 2112, having the filter port 1 2316 and the filter port 2 2320 coupled to the CPW feed 4 2139 and including two series capacitors C6 and C7 connected by a connecting pad 2304. This notch filter 2028 in FIG. 23 has a structure similar to that illustrated in FIG. 17, except that TL2 is replaced with a longer meandered shorted stub 1 2308, and an inductor L5 is added to shorten the path length of the shorted stub 2 2312. Each of the C6 and C7 can be configured to have an LH series capacitance $C_L$. Each of the TL1 and the shorted stub 1 2308 provides RH properties represented by an RH series inductance $L_R$ and an RH shunt capacitance $C_R$ as illustrated in FIG. 3F. The shorted stub 2 2312 with L5 provides an LH shunt inductance $L_L$.

In the above implementation example, the isolation consideration for a portion of the Tx band may involve controlling the phase of the MTM TL 2036 (FIG. 22) and the coupling level of the MTM directional coupler 2032 (FIG. 22). The isolation consideration for the remaining portion of the Tx band may involve using the notch filter 2028 (FIG. 23).

Figure 24:
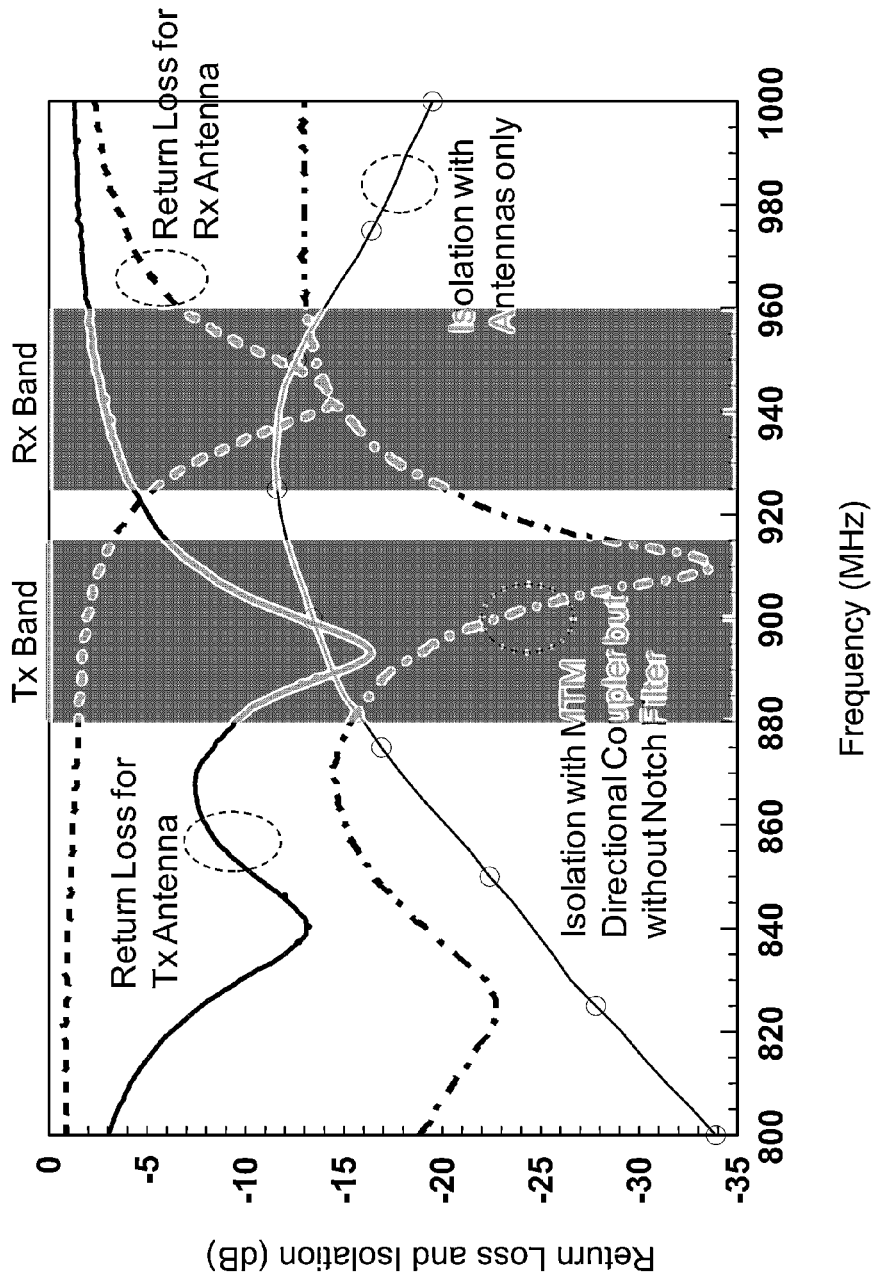
FIG. 24 plots return loss and isolation of the implementation example of FIGS. 21-23 without the notch filter.

FIG. 24 plots the return loss and isolation of the implementation example of the third architecture in FIGS. 21-23 excluding the notch filter 2028 from the structure. The plots indicate that the isolation is significantly improved due to the inclusion of the MTM directional coupler 2032 and MTM TL 2036 as compared to the case of having the Tx and Rx antennas without these elements. As illustrated in the plots, isolation of −26 dB or more may be obtained in the frequency range from 903 MHz to 915 MHz, which is a portion of the Tx band. Due to the isolation improvement owing to the use of the MTM directional coupler 2032 and MTM TL 2036, the consideration for the notch filter 2028 to reduce the coupling in the frequency range from 880 MHz to 903 MHz to a predetermined level becomes easier to meet than the implementation example of the second architecture illustrated in FIGS. 16-17, which has no MTM directional coupler.

Figure 25:
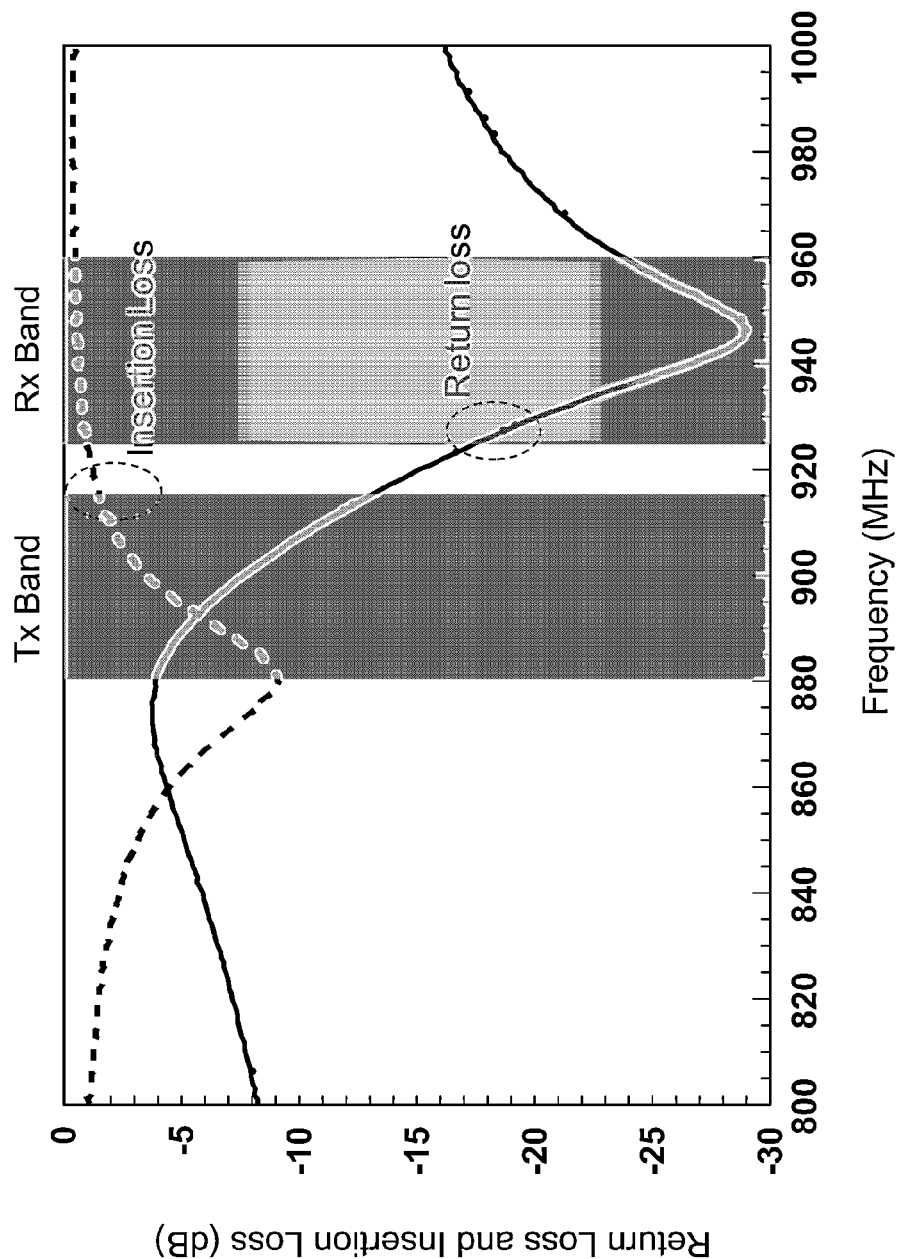
FIG. 25 plots return loss and insertion loss of the notch filter.

FIG. 25 plots the return loss and insertion loss of the notch filter 2028 illustrated in FIG. 23. The plots indicate that the insertion loss in the Rx band may be lower than −0.9 dB, and approximately −9 dB isolation may be obtained at 880 MHz. The low insertion loss in the Rx band is achieved due to less suppression of the Tx band as compared to the insertion loss in FIG. 18 for the implementation example of the second architecture illustrated in FIGS. 16-17.

Figure 26:
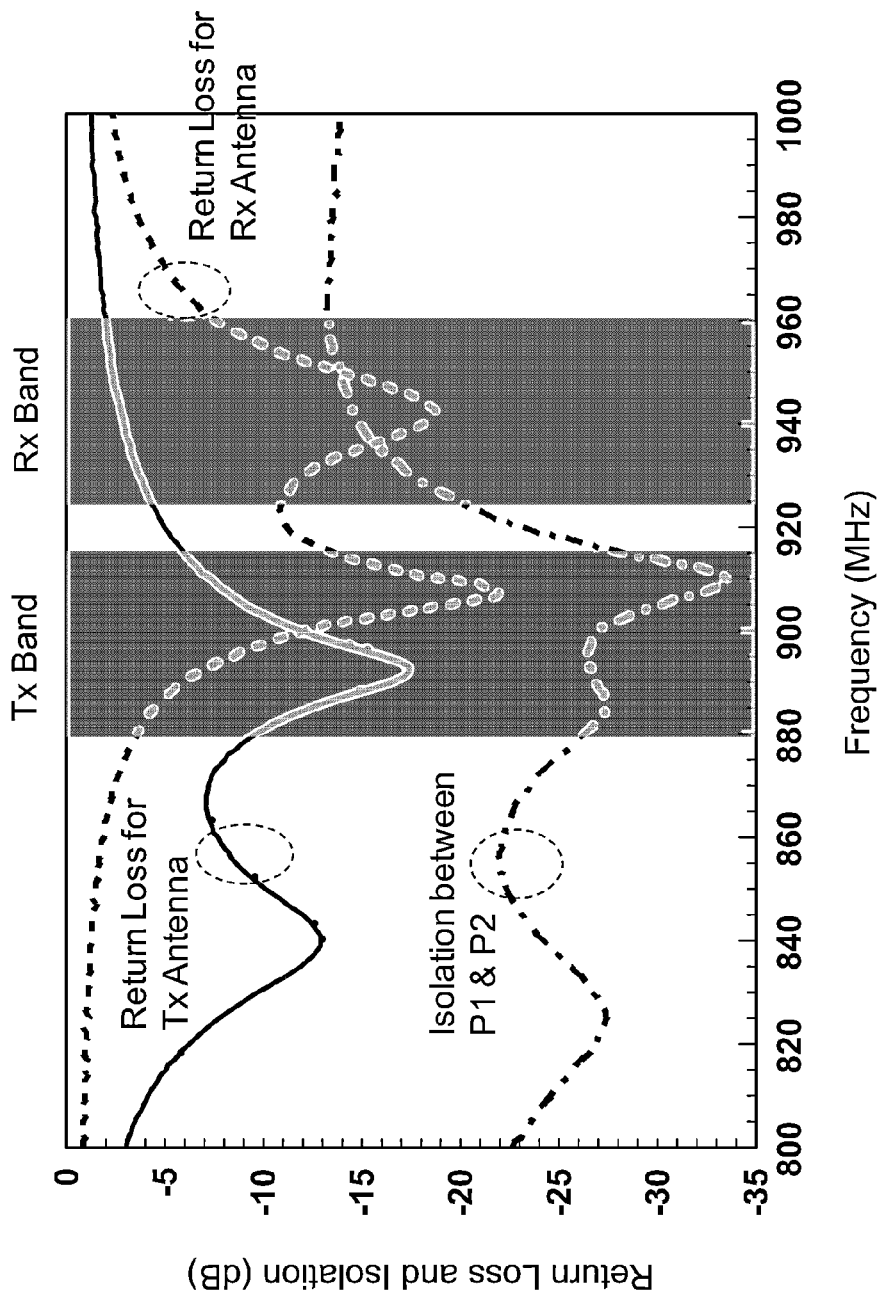
FIG. 26 plots return loss and isolation of the combination of an MTM directional coupler, an MTM transmission line and a notch filter.

FIG. 26 plots the return loss and isolation with the combination of the MTM directional coupler 2036, the MTM TL 2032 and the notch filter 2028. The plots indicate that the isolation of −26 dB or more can be achieved across the entire Tx band without compromising the antenna radiation power.

Figure 27:
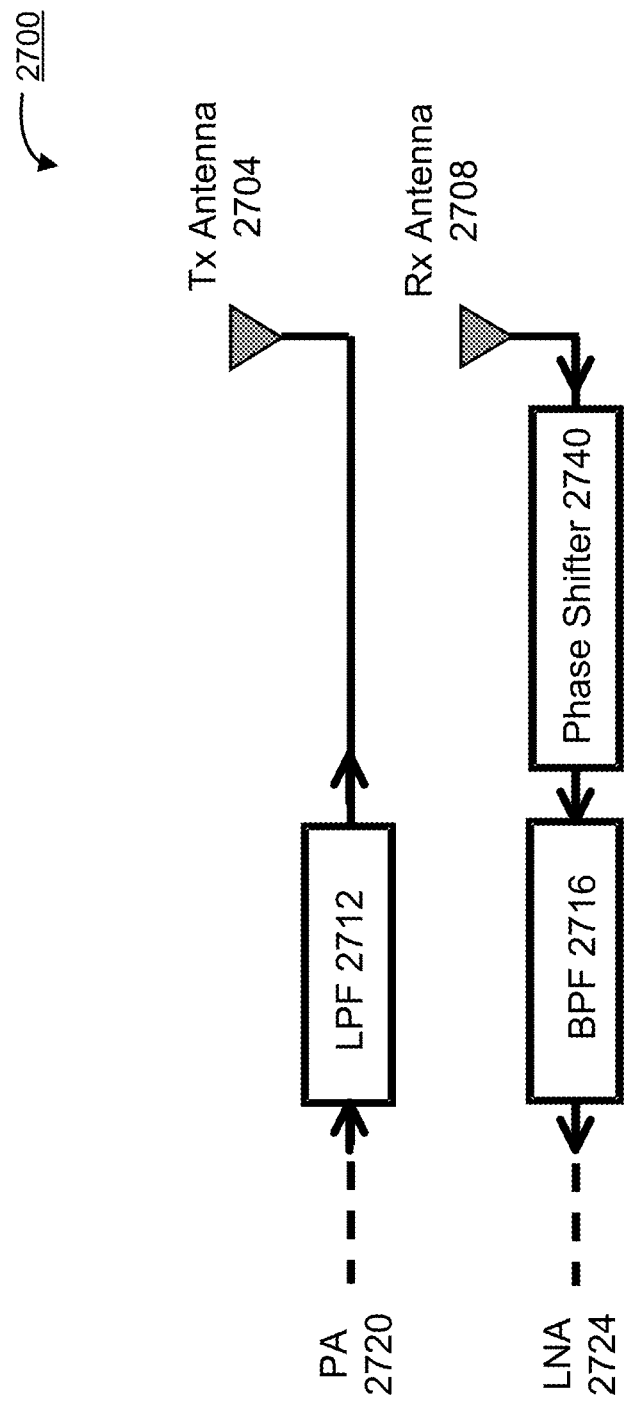
FIG. 27 illustrates, in block diagram form, a system having separate transmit and receive antennas for a single band, according to an example embodiment.

FIG. 27 illustrates a block diagram of a fourth architecture of a two-antennas-per-band transceiver system 2700 having an RF front-end module coupled to separate Tx and Rx antennas 2704, 2708 supporting a single band. The Tx band ranges from 880 MHz to 915 MHz while the Rx band ranges from 925 MHz to 960 MHz to cover the GSM band, for example. This fourth architecture includes a phase shifter 2740 between the Rx antenna 2708 and the BPF 2716 to provide the required isolation in the Tx band. Further, the module includes an LPF 2712 coupled to a PA 2720.

FIG. 28A illustrates the input impedance of the Rx antenna 2708, and FIG. 28B illustrates the input impedance with respect to the point of looking toward the phase shifter 2740 and the BPF 2716. Smith charts are used to illustrate how the impedances of the Rx antenna 2708, the phase shifter 2740 and the BPF 2716 may be manipulated to impact isolation. In the illustrated example, the phase shifter 2740 acts like a 50Ω transmission line in the Rx mode, but acts like an impedance transformer in the Tx mode. In the Rx mode, the BPF 2716, the phase shifter 2740 and the Rx antenna 2708 may have a same impedance in the Rx band to ensure optimum power transfer from the Rx antenna 2708 to the Rx circuitry. In the Tx mode, the large impedance mismatch between the Rx antenna 2708 and the phase shifter 2740 plus the BPF 2716 in the Tx band may effectively prevent the Rx antenna 2708 from receiving signals in the Tx band and further may prevent propagation of the signals into the Rx circuitry.

In some applications such as a time division duplex (TDD) system with separate Tx and Rx antennas, the transmit circuitry and receive circuitry operate during different time intervals for the same Tx and Rx bands. For instance, in the Tx mode, the PA is in the on-state and has impedance of about 50Ω, while the LNA is in the off-state and has impedance different from 50Ω. In the Rx mode, the LNA is in the on-state and has impedance of about 50Ω, while the PA is in the off-state and has impedance different from 50Ω. Therefore, the Tx and Rx antennas are terminated by different impedances when operating in the Tx and Rx modes. The isolation between the transmit and receive circuitries may be adjusted through the on/off-state impedance change of the transmit/receive circuitry as explained above based on the Smith Charts in FIGS. 28A and 28B. Specifically, in the Tx mode when the LNA is off providing a non-50Ω impedance and the Rx antenna is matched to 50Ω, a phase shifter, a coupler or a combination of both may be used in the Rx path to provide a large mismatch between the input impedance of the Rx antenna and the input impedance with respect to the point of looking toward the BPF and the phase shifter, the BPF and the coupler, or the BPF and the combination of both. Therefore, adequate isolation may be provided for the TDD case based on the impedance change scheme using passive components. A typical system impedance of 50Ω is used as an example in the above, but the system impedance may be other values, and the architectures and analyses presented here are applicable to other impedance situations as well.

FIGS. 29A and 29B show an implementation example of the fourth architecture of the system 2700 of FIG. 27, illustrating the top view of the top layer 2910 and top view of the bottom layer 2925, respectively. This structure implements the Tx antenna 2704, the Rx antenna 2708 and the phase shifter 2708. The LPF 2712 and the BPF 2716 may be externally coupled to the structure. This structure may be printed on a FR-4 substrate. In this example, the Tx antenna 2704 is formed at one end of the substrate, and the Rx antenna 2708 is formed at the other end of the substrate. A top ground plane 2901 and a bottom ground plane 2902 are formed in the top and bottom layers 2910, 2925 on the substrate, respectively. The Tx and Rx antennas 2904 and 2908 are configured to be the same as those in the second example. However, the antenna designs can be varied depending on the tuning and matching conditions, space constraints, and other considerations. The phase shifter 2740 is formed in the top layer 2910. The input of the Tx antenna 2704 is coupled to the CPW feed 1 2916. The input of the Rx antenna 2708 is coupled to the CPW feed 2 2920 through the phase shifter 2740. The ports P1 and P2 are formed in the top layer 2910 in this example. The port P1 may be coupled to the LPF 2712, and the port P2 may be coupled to the BPF 2716. Both the LPF 2712 and BPF 2716 may be off-the-shelf, commercial components. The LPF 2712 may be used to suppress the harmonics generated by the PA 2720. The BPF 2716 may be a SAW filter.

Figure 30:
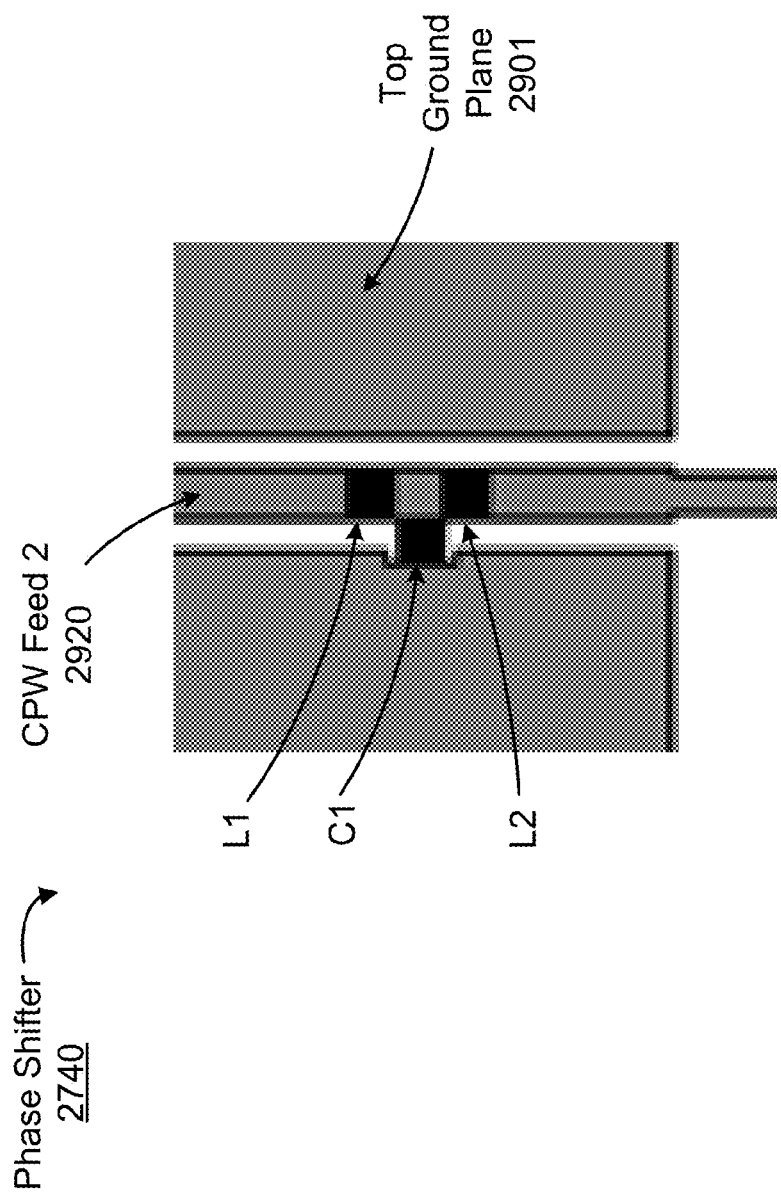
FIG. 30 illustrates a phase shifter in the implementation example of FIGS. 29A and 29B.

FIG. 30 illustrates details of the phase shifter structure 2740 in the present implementation example. The phase shifter 2740 is realized by using a T network with two series inductors L1 and L2 and one shunt capacitor C1 in this example. The inductors and capacitor may be either lumped elements or distributed elements. Another T network with two series capacitors and one shunt inductor may also be used. A π network, comprising two shunt inductors and one series capacitor or one series inductor and two shunt capacitors, may also be used instead of the T network.

Figure 31:
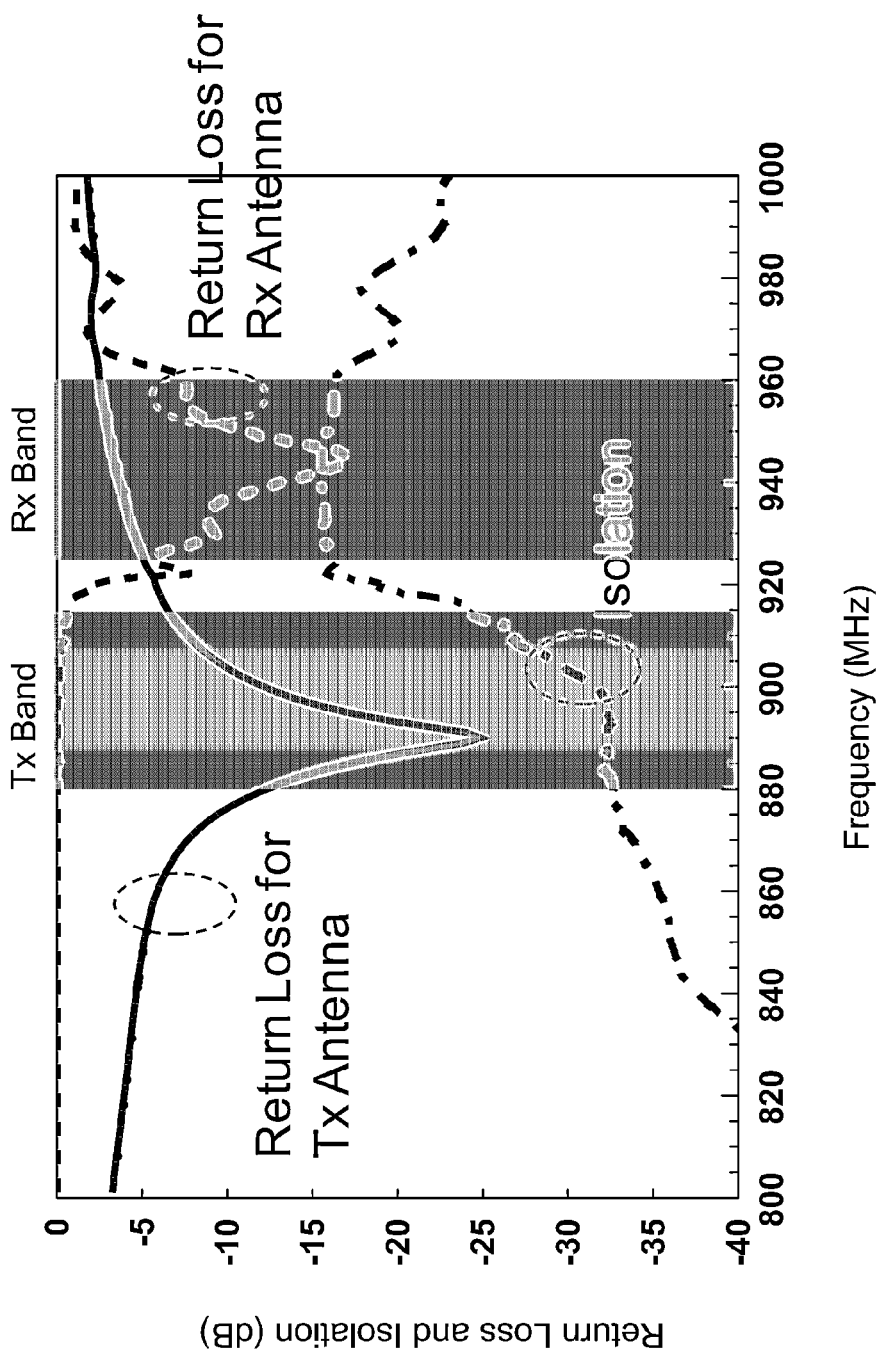
FIG. 31 plots return losses and isolation of the implementation example of FIGS. 29A and 29B with the phase shifter of FIG. 30.

FIG. 31 plots the return loss and isolation of the implementation example of FIGS. 29A and 29B with the phase shifter 2740 illustrated in FIG. 30. The plots indicate that the isolation of −24 dB or more may be achieved across the entire Tx band.

In the Rx mode, the Rx antenna efficiency may be affected by the Tx antenna even when the Tx circuitry is in the off-state, or not transmitting. The Tx antenna may act like a loading element to the Rx antenna to either increase or decrease the Rx antenna efficiency. Therefore, the Rx antenna efficiency may be increased by designing the proper termination of the Tx antenna.

Figure 32:
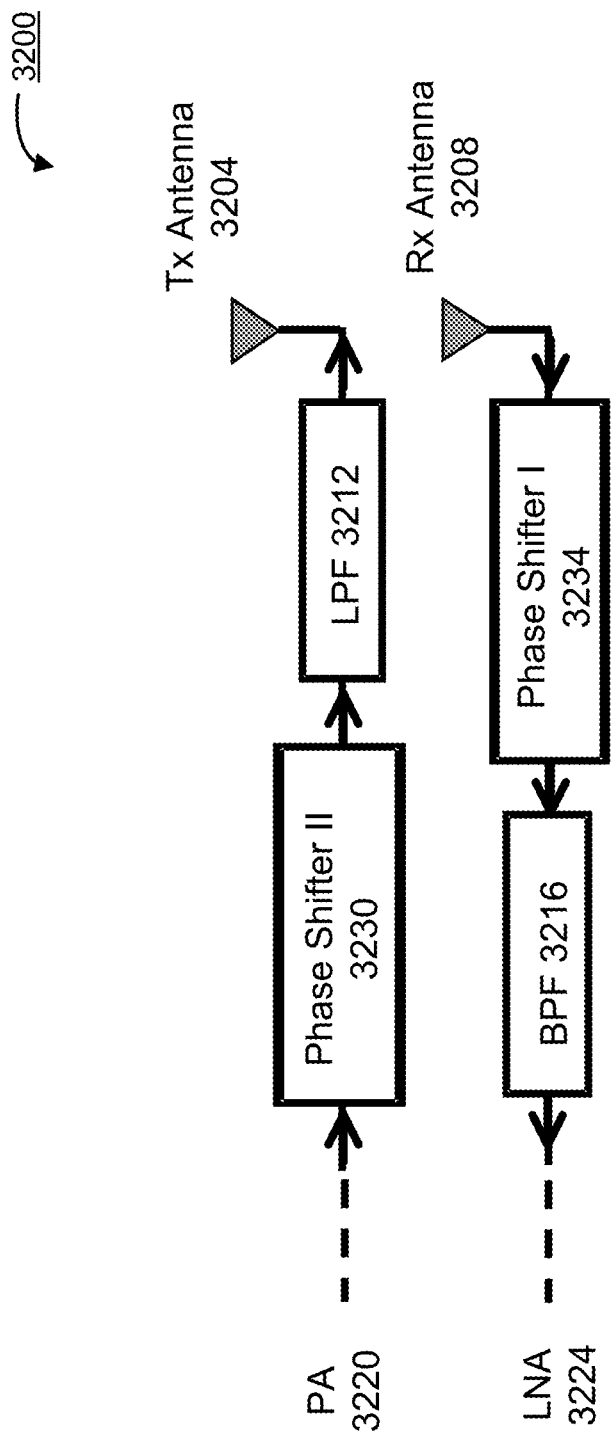
FIG. 32 illustrates, in block diagram form, a system having separate transmit and receive antennas for a single band, according to an example embodiment.

FIG. 32 illustrates a block diagram of a fifth architecture of a two-antennas-per-band transceiver system 3200 having an RF front-end module coupled to separate Tx and Rx antennas 3204, 3208 supporting a single band. The Tx band may range from 880 MHz to 915 MHz while the Rx band may range from 925 MHz to 960 MHz to cover the GSM band, for example. A phase shifter II 3230 is added between the LPF 3212 and the PA 3220 in the Tx path. This is additional to the phase shifter 2740 in the Rx path in the fourth architecture of system 2700 shown in FIG. 27. The phase shifter 2740 in FIG. 27 is labeled as a phase shifter 13234 in the fifth architecture in FIG. 32. In the Tx mode, the phase shifter II 3230 transforms the input impedance of the LPF 3212 plus the Tx antenna 3204 to the optimal point where the PA 3220 has the optimal output power. In the Rx mode, the phase shifter II 3230 transforms the input impedance of the LPF 3212 and the PA 3220 (in off-state) to the optimal point where the Tx antenna 3204 is properly terminated. Thus, the Rx antenna 3208 can achieve optimal radiation efficiency. A phase shifter may be added between the LPF 3212 and the PA 3220 in the second architecture of system 1500 of FIG. 15, in the third architecture of system 2000 of FIG. 20, or any other architectures to improve the Rx antenna efficiency and the PA output power. Either T network or π network designs may be used to realize a phase shifter, such as the phase shifter II 3230, having components in either the lumped element form or distributed element form.

A phase shifter, a notch filter, or a combination of both may be included in the Rx path so as to be coupled to a BPF to provide adequate isolation. The transceiver system may be configured for single-band, dual-band or multiband operations. For dual-band and multiband cases, the phase shifter, the notch filter or the combination of both may be included in any one or more of the band paths in the Rx path. In a dual-band example, the phase shifter, the notch filter or the combination of both may be included in the high-band Rx path, the low-band Rx path, or both the high-band and low-band Rx paths.

It should be noted that the antennas, filters, diplexers, couplers, and other components used in the system architectures presented herein may be MTM-based or non-MTM-based provided that desired isolation levels and antenna efficiencies are achieved.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the disclosed implementations and other implementations may be made based on what is described and illustrated.

What is claimed is:

1. A communication front-end system, comprising:
a first circuit configured to process a first RF signal in a first frequency range to transmit the first RF signal from a plurality of antennas;
a second circuit configured to process a second RF signal in a second frequency range, the second RF signal being received at the plurality of antennas; and
an isolation circuit that is coupled to the plurality of antennas, the first circuit and the second circuit, the isolation circuit configured to provide electromagnetic isolation between the first circuit and the second circuit;

the first frequency range includes a first band and a second band, which is higher in frequency than the first band;

the second frequency range includes a third band and a fourth band, which is higher in frequency than the third band;

the first circuit comprises a first power amplifier that processes the first RF signal in the first band and a second power amplifier that processes the first RF signal in the second band; and the second circuit comprises a first low noise amplifier that processes the second RF signal in the third band and a second low noise amplifier that processes the second RF signal in the fourth band.

2. The system of claim 1, further comprising:
a plurality of antennas supporting a first frequency range and the second frequency range.

3. The system as in claim 2, wherein the plurality of antennas comprises at least one metamaterial (MTM) antenna having a composite right and left handed (CRLH) structure.

4. The system as in claim 2, wherein
the isolation circuit comprises at least one MTM passive component having a CRLH structure.

5. The system as in claim 4, wherein
the MTM passive component is a MTM filter.

6. The system as in claim 4, wherein
the MTM passive component is a MTM diplexer.

7. The system as in claim 4, wherein
the MTM passive component is a MTM coupler.

8. The system as in claim 4, wherein
the MTM passive component is a MTM transmission line.

9. The system as in claim 2,
wherein the plurality of antennas comprises:
   a first antenna supporting the first and second bands; and
   a second antenna supporting the third and fourth bands,
and wherein the isolation circuit comprises:
   a first diplexer coupled to the first and second power amplifiers and to the first antenna, the first diplexer providing band pass filtering and low pass filtering;
   a first band pass filter coupled to the first low noise amplifier;
   a second band pass filter coupled to the second low noise filter;
   a second diplexer coupled to the first and second band pass filters, the second diplexer providing high pass filtering and low pass filtering; and
   a switch coupled to the second diplexer and to the second antenna, wherein when the second antenna is receiving the second RF signal the switch is configured to connect a signal path and when the first antenna is transmitting the first RF signal the switch is configured to disconnect the signal path.

10. The system as in claim 2,
wherein the plurality of antennas comprises:
   a first antenna supporting the first and second bands; and
   a second antenna supporting the third and fourth bands,
and wherein the isolation circuit comprises:
   a first diplexer coupled to the first and second power amplifiers, the first diplexer providing band pass filtering and low pass filtering;
   a first band pass filter coupled to the first low noise amplifier;
   a second band pass filter coupled to the second low noise amplifier;
   a second diplexer coupled to the first and second band pass filters, the second diplexer providing high pass filtering and low pass filtering; and
   a coupler that is coupled to the first and second diplexers and to the first and second antennas.

11. The system as in claim 2,
wherein the plurality of antennas comprises:
   a first antenna supporting the first and second bands; and
   a second antenna supporting the third and fourth bands,
and wherein the isolation circuit comprises:
   a first diplexer coupled to the first and second power amplifiers and to the first antenna, the first diplexer providing band pass filtering and low pass filtering;
   a second diplexer coupled to the first and second low noise amplifiers and to the second antenna, the second diplexer providing first band pass filtering and second band pass filtering, the second diplexer being configured to have resilience to a transmit power leakage.

12. The system as in claim 2,
wherein the plurality of antennas comprises:
   a first antenna supporting the second and third bands; and
   a second antenna supporting the first and fourth bands,
and wherein the isolation circuit comprises:
   a first band pass filter coupled to the first low noise amplifier;
   a second band pass filter coupled to the second low noise amplifier;
   a first diplexer coupled to the first band pass filter and to the second power amplifier, the first diplexer providing band pass filtering and low pass filtering;
   a second diplexer coupled to the first power amplifier and to the second band pass filter, the second diplexer providing high pass filtering and low pass filtering; and
   a coupler coupled to the first and second diplexers and to the first and second antennas.

13. The system as in claim 2,
wherein the plurality of antennas comprises:
   a first antenna supporting the first and third bands; and
   a second antenna supporting the second and fourth bands,
and wherein the isolation circuit comprises:
   a first band pass filter coupled to the first low noise amplifier;
   a second band pass filter coupled to the second low noise amplifier;
   a first diplexer coupled to the first power amplifier, the first band pass filter and the first antenna, the first diplexer providing low pass filtering and high pass filtering; and
a second diplexer coupled to the second power amplifier, the second band pass filter and the second antenna, the second diplexer providing low pass filtering and high pass filtering.

14. An antenna system, comprising:
a first circuit configured to process a first RF signal in a first frequency range to transmit the first RF signal from a plurality of antennas;
a second circuit configured to process a second RF signal in a second frequency range, the second RF signal being received at the plurality of antennas; and
an isolation circuit that is coupled to the plurality of antennas, the first circuit and the second circuit, the isolation circuit configured to provide electromagnetic isolation between the first circuit and the second circuit;
a plurality of antennas supporting the first frequency range and the second frequency range;
the first frequency range includes a first band,
the second frequency range includes a second band, the first circuit comprises a first power amplifier that processes the first RF signal in the first band, the second circuit comprises a first low noise amplifier that processes the second RF signal in the second band, the plurality of antennas comprises:
  a first antenna supporting the first band; and
  a second antenna supporting the second band, and the isolation circuit comprises:
  a low pass filter coupled to the first power amplifier; and
  a band pass filter coupled to the first low noise amplifier.

15. The antenna system as in claim 14, wherein a bandgap between the first band and the second band is about 10 MHz.

16. The antennas system as in claim 14, wherein the band pass filter is a Surface Acoustic Wave (SAW) filter.

17. The antenna system as in claim 14, wherein the low pass filter is configured to suppress harmonics generated by the first power amplifier.

18. The antenna system as in claim 14, wherein at least one of the first and second antennas is a MTM antenna having a CRLH structure.

19. The antenna system as in claim 14, wherein the isolation circuit further comprises:
  a high pass filter coupled to the band pass filter; and
  a coupler coupled to the low pass filter, the high pass filter and the first and second antennas.

20. The antenna system as in claim 14, wherein the isolation circuit further comprises:
  a notch filter coupled to the band pass filter and the second antenna.

21. The antenna system as in claim 20, wherein the notch filter has a CRLH structure.

22. The antenna system as in claim 20, wherein
  the antenna system comprises a substrate structure supporting one or more metallization layers;
  the first antenna is formed at a first end of the substrate structure;
  the second antenna is formed at a second end of the substrate structure;
  the notch filter is formed in one of the one or more metallization layers and is coupled to the second antenna through a Coplanar Waveguide (CPW) feed.

23. The antenna system as in claim 14, wherein the isolation circuit further comprises:
  a notch filter coupled to the band pass filter;
  a coupler coupled to the low pass filter, the notch filter and the second antenna; and
  a transmission line coupled to the coupler and the first antenna.

24. The antenna system as in claim 23, wherein the notch filter is a MTM notch filter having a CRLH structure.

25. The antenna system as in claim 23, wherein the coupler is a MTM directional coupler having a CRLH structure.

26. The antenna system as in claim 23, wherein the transmission line is a MTM transmission line having a CRLH structure.

27. The antenna system as in claim 23, wherein
  the antenna system comprises a substrate structure supporting one or more metallization layers including a first metallization layer and a second metallization layer;
  the first antenna is formed at a first end of the substrate structure;
  the second antenna is formed at a second end of the substrate structure;
  the coupler and the transmission line are formed in the first metallization and coupled through a portion of a CPW feed; and the notch filter is formed in the second metallization layers and is coupled to the coupler through another portion of the CPW feed and a conductive via connecting the first and second metallization layer.

28. The antenna system as in claim 14, wherein the isolation circuit further comprises:
  a phase shifter coupled to the band pass filter and the second antenna.

29. The antenna system as in claim 14, wherein the first circuit further comprises:
  a phase shifter coupled to the first power amplifier, the phase shifter being configured to increase efficiency of the second antenna and output power.

30. The antenna system as in claim 28 or 29, wherein the phase shifter comprises a pi network.

31. The antenna system as in claim 28 or 29, wherein the phase shifter comprises a T network.

32. The antenna system as in claim 20, wherein the isolation circuit further comprises:
  a phase shifter coupled to the notch filter and the band pass filter.

33. The antenna system as in claim 23, wherein the isolation circuit further comprises:
  a phase shifter coupled to the notch filter and the band pass filter.

34. An antenna system, comprising:
  a first circuit configured to process a first RF signal in a first frequency range to transmit the first RF signal from a plurality of antennas;
  a second circuit configured to process a second RF signal in a second frequency range, the second RF signal being received at the plurality of antennas; and
  an isolation circuit that is coupled to the plurality of antennas, the first circuit and the second circuit, the isolation circuit configured to provide electromagnetic isolation between the first circuit and the second circuit;
  the first frequency range includes one or more first frequency bands;
  the second frequency range includes one or more second frequency bands;
  the plurality of antennas comprises a first antenna supporting the one or more first frequency bands and a second antenna supporting the one or more second frequency bands; and
  the isolation circuit comprises an active component coupled to the second antenna,
wherein the active component is controlled to short the second antenna to ground to increase efficiency of the first antenna.

35. An antenna system, wherein comprising:
  a first circuit configured to process a first RF signal in a first frequency range to transmit the first RF signal from a plurality of antennas;
  a second circuit configured to process a second RF signal in a second frequency range, the second RF signal being received at the plurality of antennas; and
  an isolation circuit that is coupled to the plurality of antennas, the first circuit and the second circuit, the isolation circuit configured to provide electromagnetic isolation between the first circuit and the second circuit;
  the first circuit and the second circuit operate during different time intervals;
  the first frequency range and the second frequency range are substantially the same;
  the plurality of antennas comprise a first antenna supporting the first frequency range and a second antenna supporting the second frequency range; and the isolation circuit comprises a phase shifter, a coupler, or a combination of a phase shifter and a coupler, which is coupled to the second circuit, wherein the phase shifter, the coupler or the combination of the phase shifter and the coupler is configured to provide a large impedance mismatch to the second antenna.

36. An antenna system, comprising:
a first circuit configured to process a first RF signal in a first frequency range to transmit the first RF signal from a plurality of antennas;
a second circuit configured to process a second RF signal in a second frequency range, the second RF signal being received at the plurality of antennas; and
an isolation circuit that is coupled to the plurality of antennas, the first circuit and the second circuit, the isolation circuit configured to provide electromagnetic isolation between the first circuit and the second circuit;
the first frequency range includes one or more first frequency bands;
the second frequency range includes one or more second frequency bands;
the plurality of antennas comprises a first antenna supporting the one or more first frequency bands and a second antenna supporting the one or more second frequency bands; and
the isolation circuit comprises:
one or more band pass filters coupled to the second circuit and associated with the one or more second frequency bands, respectively; and
at least one phase shifter, at least one notch filter, or at least one combination of a phase shifter and a notch filter, each of which is coupled to one of the one or more band pass filters.

37. An antenna system comprising:
a first antenna supporting a first frequency band;
a second antenna supporting a second frequency band;
a first circuit that processes a first RF signal in the first frequency band to transmit the first RF signal from the first antenna;
a second circuit that processes a second RF signal in the second frequency band, the second RF signal being received at the second antenna;
a first isolation circuit that is coupled to the first and second antennas, the first circuit and the second circuit, and provides isolation between the first circuit and the second circuit;
a third antenna supporting a third frequency band; a fourth antenna supporting a fourth frequency band;
a third circuit that processes a third RF signal in the third frequency band to transmit the third RF signal from the third antenna;
a fourth circuit that processes a fourth RF signal in the fourth frequency band, the fourth RF signal being received at the fourth antenna;
a second isolation circuit that is coupled to the third and fourth antennas, the third circuit and the fourth circuit, and provides isolation between the third circuit and the fourth circuit.

38. The antenna system as in claim 37, wherein the first, second, third and fourth antennas comprise at least one MTM antenna having a CRLH structure.

39. The antenna system as in claim 37, wherein the first and second isolation circuits comprise at least one MTM passive component having a CRLH structure.

40. The antenna system as in claim 39, wherein the MTM passive component is a MTM filter.

41. The antenna system as in claim 39, wherein the MTM passive component is a MTM diplexer.

42. The antenna system as in claim 39, wherein the MTM passive component is a MTM coupler.

43. The antenna system as in claim 39, wherein the MTM passive component is a MTM transmission line.

44. An antenna system comprising:
an antenna supporting a first frequency range and a second frequency range;
a first circuit that processes a first RF signal in the first frequency range to transmit the first RF signal from the antenna;
a second circuit that processes a second RF signal in the second frequency range, the second RF signal being received at the antenna;
and an isolation circuit that is coupled to the antenna, the first circuit and the second circuit, the isolation circuit providing electromagnetic isolation between the first circuit and the second circuit and comprising at least one passive component having a CRLH structure;
the first frequency range includes a first band and a second band that is higher in frequency than the first band;
the second frequency range includes a third band and a fourth band that is higher in frequency than the third band;
the first circuit comprises a first power amplifier that processes the first RF signal in the first band and a second power amplifier that processes the first RF signal in the second band;
the second circuit comprises a first low noise amplifier that processes the second RF signal in the third band and a second low noise amplifier that processes the second RF signal in the fourth band;
the isolation circuit comprises:
a first band pass filter coupled to the first low noise amplifier;
a second band pass filter coupled to the second low noise amplifier;
a first diplexer that is coupled to the first and second power amplifiers and provides low pass filtering and band pass filtering;
a second diplexer that is coupled to the first and second band pass filters and provides low pass filtering and high pass filtering; and
a switch that is coupled to the first and second diplexers and the antenna and configured to connect a path associated with the first and second bands when the antenna is transmitting the first RF signal and connect a path associated with the third and fourth bands when the antenna is receiving the second RF signal,
and wherein
at least one of the first diplexer and the second diplexer has a CRLH structure.

45. The antenna system as in claim 44, wherein the antenna is an MTM antenna having a CRLH structure.

46. An antenna system comprising:
an antenna supporting a first frequency range and a second frequency range;
a first circuit that processes a first RF signal in the first frequency range to transmit the first RF signal from the antenna;
a second circuit that processes a second RF signal in the second frequency range, the second RF signal being received at the antenna;
and an isolation circuit that is coupled to the antenna, the first circuit and the second circuit, the isolation circuit providing electromagnetic isolation between the first circuit and the second circuit and comprising at least one passive component having a CRLH structure;

the first frequency range includes a first band and a second band that is higher in frequency than the first band;

the second frequency range includes a third band and a fourth band that is higher in frequency than the third band;

the first circuit comprises a first power amplifier that processes the first RF signal in the first band and a second power amplifier that processes the first RF signal in the second band;

the second circuit comprises a first low noise amplifier that processes the second RF signal in the third band and a second low noise amplifier that processes the second RF signal in the fourth band; and the isolation circuit comprises:
- a first band pass filter coupled to the first low noise amplifier;
- a second band pass filter coupled to the second low noise amplifier;
- a first diplexer that is coupled to the first power amplifier and the first band pass filter and provides low pass filtering and high pass filtering;
- a second diplexer that is coupled to the second power amplifier and the second band pass filter and provides low pass filtering and high pass filtering; and
- a third diplexer that is coupled to the first and second diplexers and the antenna and provides low pass filtering and high pass filtering, and wherein
at least one of the first diplexer, the second diplexer and the third diplexer has a CRLH structure.

* * * * *